United States Patent
Nagai et al.

(10) Patent No.: US 7,944,530 B2
(45) Date of Patent: May 17, 2011

(54) OPTICAL FILM, POLARIZING PLATE AND LIQUID CRYSTAL DISPLAY DEVICE INCLUDING AN OPTICALLY ANISOTROPIC LAYER FORMED FROM A MIXTURE INCLUDING TWO OR MORE LIQUID CRYSTAL COMPOUNDS

(75) Inventors: Michio Nagai, Minami-Ashigara (JP); Akira Ikeda, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 83 days.

(21) Appl. No.: 12/093,416

(22) PCT Filed: Nov. 14, 2006

(86) PCT No.: PCT/JP2006/323059
§ 371 (c)(1),
(2), (4) Date: May 12, 2008

(87) PCT Pub. No.: WO2007/055425
PCT Pub. Date: May 18, 2007

(65) Prior Publication Data
US 2009/0096961 A1    Apr. 16, 2009

(30) Foreign Application Priority Data

Nov. 14, 2005  (JP) .................................. 2005-329262

(51) Int. Cl.
G02F 1/1335    (2006.01)
C09K 19/52    (2006.01)
C09K 19/00    (2006.01)

(52) U.S. Cl. ..................... 349/117; 252/299.01; 428/1.3

(58) Field of Classification Search ............. 252/299.62, 252/299.01; 428/1.1, 1.3, 1.31; 349/117
See application file for complete search history.

(56) References Cited

U.S. PATENT DOCUMENTS

| | | | |
|---|---|---|---|
| 4,583,825 A | 4/1986 | Buzak | |
| 5,410,422 A | 4/1995 | Bos | |
| 5,583,679 A | 12/1996 | Ito et al. | |
| 5,646,703 A | 7/1997 | Kamada et al. | |
| 5,718,838 A * | 2/1998 | Okazaki | 252/299.1 |
| 5,774,197 A | 6/1998 | Nakamura | |
| 5,883,685 A | 3/1999 | Mazaki et al. | |
| 6,064,457 A | 5/2000 | Aminaka | |

(Continued)

FOREIGN PATENT DOCUMENTS

DE    39 11 620 A1    10/1990

(Continued)

OTHER PUBLICATIONS

English language machine translation of Ito (JP 2000-235184 A), Accessed 2009.*

(Continued)

*Primary Examiner* — Brian M. Healy
*Assistant Examiner* — Michael Inadomi
(74) *Attorney, Agent, or Firm* — Buchanan Ingersoll & Rooney PC

(57) ABSTRACT

An optical film, which is an optically compensatory film that comprises: at least two optically anisotropic layers comprising a first optically anisotropic layer and a second optically anisotropic layer, wherein the first optically anisotropic layer is formed by mixing two or more liquid crystal compounds having different structures with each other.

3 Claims, 4 Drawing Sheets

U.S. PATENT DOCUMENTS

| | | |
|---|---|---|
| 6,671,017 B2 | 12/2003 | Lyu et al. |
| 7,006,173 B1* | 2/2006 | Hiyama et al. ............ 349/96 |
| 2004/0201797 A1* | 10/2004 | Wu et al. .................. 349/96 |
| 2005/0056811 A1* | 3/2005 | Nishikawa et al. ...... 252/299.01 |
| 2005/0200801 A1* | 9/2005 | Watanabe ................ 349/194 |

FOREIGN PATENT DOCUMENTS

| | | |
|---|---|---|
| JP | 6-214116 A | 8/1994 |
| JP | 9-197397 A | 7/1997 |
| JP | 11-316378 A | 11/1999 |
| JP | 3056997 B2 | 6/2000 |
| JP | 2000-235184 A | 8/2000 |
| JP | 2002-040429 A | 2/2002 |
| JP | 2004-309597 A | 11/2004 |
| JP | 2005-122155 A | 5/2005 |
| JP | 2005-316234 A | 11/2005 |
| WO | WO 96/37804 A1 | 11/1996 |

OTHER PUBLICATIONS

English language machine translation of Futamura et al. (JP 2004-309597 A), Accessed 2009.*

Form PCT/ISA/210 (International Search Report) dated Feb. 20, 2007.

Form PCT/ISA/237 (Written Opinion of the International Searching Authority) dated Feb. 20, 2007.

* cited by examiner

OPTICAL FILM, POLARIZING PLATE AND LIQUID CRYSTAL DISPLAY DEVICE INCLUDING AN OPTICALLY ANISOTROPIC LAYER FORMED FROM A MIXTURE INCLUDING TWO OR MORE LIQUID CRYSTAL COMPOUNDS

TECHNICAL FIELD

The present invention relates to an optical film, a polarizing plate and a liquid crystal display device comprising same.

BACKGROUND ART

As compared with CRT (cathode ray tube), a liquid crystal display device (LCD) is advantageous in that it has a small size and a light mass and consumes a low electric power. The liquid crystal display device comprises a liquid crystal cell and a pair of polarizing plates disposed on the respective side of the liquid crystal cell. The liquid crystal cell comprises rod-shaped liquid crystal molecules, two sheets of substrates for enclosing the rod-shaped liquid crystal molecules therein and an electrode layer for applying a voltage to the rod-shaped liquid crystal molecules. In order to align the rod-shaped liquid crystal molecules thus enclosed in the liquid crystal cell, the two sheets of substrates each have an alignment film provided thereon. In order to decolor the image displayed on the liquid crystal cell, it is normally often practiced to provide an optically-compensatory sheet (retarder plate) interposed between the liquid crystal cell and the polarizing plate. The laminate of the polarizing plate (polarizing film) and the optically-compensatory sheet acts as an elliptical polarizing plate. The optically-compensatory sheet may be rendered capable of expanding the viewing angle of the liquid crystal cell. A stretched birefringence film has heretofore been used as an optically-compensatory sheet.

It has also been proposed that an optically-compensatory sheet having an optically anisotropic layer containing a discotic compound be used instead of stretched birefringence film (see, e.g., JP-A-6-214116, U.S. Pat. Nos. 5,583,679, 5,646,703 and German Patent Application Disclosure No. 3911620). The optically anisotropic layer is formed by aligning a discotic liquid crystal compound, and then fixing the discotic liquid crystal compound thus aligned. A discotic liquid crystal compound normally has a high birefringence. A discotic liquid crystal compound can be aligned in various forms. Accordingly, a discotic liquid crystal compound can be used to produce an optically-compensatory sheet having optical properties that have never been obtained with the prior art stretched birefringence films.

A liquid crystal display device has been proposed comprising a bend-aligned liquid crystal cell having rod-shaped liquid crystal molecules aligned in directions which are opposite from upper to lower side of the liquid crystal cell (symmetrically) (see, e.g., U.S. Pat. Nos. 4,583,825 and 5,410,422). Since the rod-shaped liquid crystal molecules are symmetrically aligned in directions which are opposite from upper to lower side of the liquid crystal cell, the bend-aligned liquid crystal cell has a self optical compensating function. Therefore, this liquid crystal mode is also called OCB (optically compensatory bend) liquid crystal mode. The bend-aligned liquid crystal display device is advantageous in that it exhibits a high response.

As compared with ordinary liquid crystal modes (TN mode, STN mode), the bend alignment mode is characterized by a great viewing angle and a high response. However, the bend alignment mode needs to be further improved as compared with CRT. In order to further improve the bend-aligned liquid crystal display devices, it can be proposed that an optically-compensatory sheet be used as in the ordinary liquid crystal modes. However, the prior art optically-compensatory sheet comprising a stretched birefringence film leaves something to be desired when used in the bend-aligned liquid crystal display device. As previously mentioned, it has been proposed that an optically-compensatory sheet having an optically anisotropic layer containing a discotic liquid crystal compound be used instead of stretched birefringence film. Further, a bend-aligned liquid crystal display device comprising an optically-compensatory sheet containing a discotic liquid crystal compound has been also proposed (see, e.g., JP-A-9-197397 and International Disclosure No. 96/37804). The use of the optically compensatory film containing a discotic liquid crystal compound makes it possible to remarkably improve the viewing angle of the bend-aligned liquid crystal display device.

However, it has been pointed out that the bend-aligned mode liquid crystal display device comprising an optically compensatory sheet containing a discotic liquid crystal compound is subject to leakage of light having a specific wavelength and hence coloration in displayed image (see, e.g., JP-A-11-316378). It is disclosed that this coloration is attributed to the wavelength dependence of transmittance of an ellipsoidal polarizing plate (laminate of polarizing plate and optically compensatory sheet).

It is reported that when the optically anisotropic layer and the polarizing film are disposed such that the angle of the average direction of regular projection of the line normal to the disc surface of the discotic liquid crystal compound toward the optically anisotropic layer with respect to the in-plane transmission axis of the polarizing film is 45°, the maximum optical compensation effect on the bend-aligned mode liquid crystal cell can be exerted. Various methods have been proposed to eliminate tin change and prevent gradation inversion of a bend-aligned liquid crystal device comprising an optically-compensatory sheet containing a discotic liquid crystal compound (see, e.g., Japanese Patent 3056997 and JP-A-2002-40429).

DISCLOSURE OF THE INVENTION

As mentioned above, even when an optically compensatory sheet (The terms "optically compensatory sheet" and "optically compensatory film" are used synonymously with each other herein) containing a discotic liquid crystal compound is used in a bend-aligned liquid crystal device, the occurrence of gradation inversion can be difficultly prevented while satisfying the contrast properties, viewing angle properties and tint of the bend-aligned liquid crystal device.

An aim of the invention is to provide an optical film and a polarizing plate capable of properly making optical compensation of a liquid crystal cell, particularly of bend-aligned mode. Another aim of the invention is to provide a liquid crystal display device having excellent viewing angle properties capable of displaying a good image having a high contrast, no tint problems during black display and no gradation inversion.

As a result of the inventors' extensive studies, it was found that due to the difference between the wavelength dependence of anisotropy of the liquid crystal molecules used in the liquid crystal cell and the wavelength dependence of anisotropy of the optically compensatory sheet containing a discotic liquid crystal compound, a bend-aligned mode liquid crystal display device according to the constitution is normally subject to leakage of light in short wavelength (blue).

In view of above, the inventors found, as a method of allowing the wavelength dispersion of the liquid crystal molecules and the optically compensatory sheet used in the liquid crystal cell to coincide with each other, the formation of an optically anisotropic layer of the optically compensatory sheet by mixing two or more liquid crystal compounds having different structures with each other. By this finding, the aforementioned problems can be solved. In particular, tint during black display can be improved.

The aims of the invention are accomplished by the following constitutions [1] to [9].

[1] An optical film, which comprises:

at least two optically anisotropic layers comprising a first optically anisotropic layer and a second optically anisotropic layer, wherein the first optically anisotropic layer is formed by mixing two or more liquid crystal compounds having different structures with each other.

[2] The optical film as described in [1] above, wherein the first optically anisotropic layer satisfies numerical expression (1):

$$Re(450)/Re(650)<1.25 \qquad (1)$$

wherein Re (450) and Re (650) represent in-plane retardation values (unit: nm) of the first optically anisotropic layer at a wavelength of 450 nm and 650 nm, respectively.

[3] The optical film as described in [1] or [2] above, wherein at least one of the two or more liquid crystal compounds constituting the first optically anisotropic layer is a discotic liquid crystal compound.

[4] The optical film as described in any of [1] to [3] above, wherein at least one of the two or more liquid crystal compounds is a trisubstituted benzene skeleton discotic liquid crystal compound.

[5] The optical film as described in any of [1] to [4] above, wherein at least one of the two or more liquid crystal compounds is a triphenylene skeleton discotic liquid crystal compound.

[6] The optical film as described in any of [1] to [5] above, wherein the second optically anisotropic layer comprises a cellulose acylate film.

[7] A polarizing plate, which comprises:

a polarizing film; and at least two protective films disposed on the both sides of the polarizing film, wherein at least one of the at least two protective films is an optical film as described in any of [1] to [6] above.

[8] A liquid crystal display device, which comprises:

a liquid crystal cell; and a polarizing plate as described in [7] above.

[9] The liquid crystal display device as described in [8] above, which is of OCB mode.

BEST MODE FOR CARRYING OUT THE INVENTION

Figure 1:
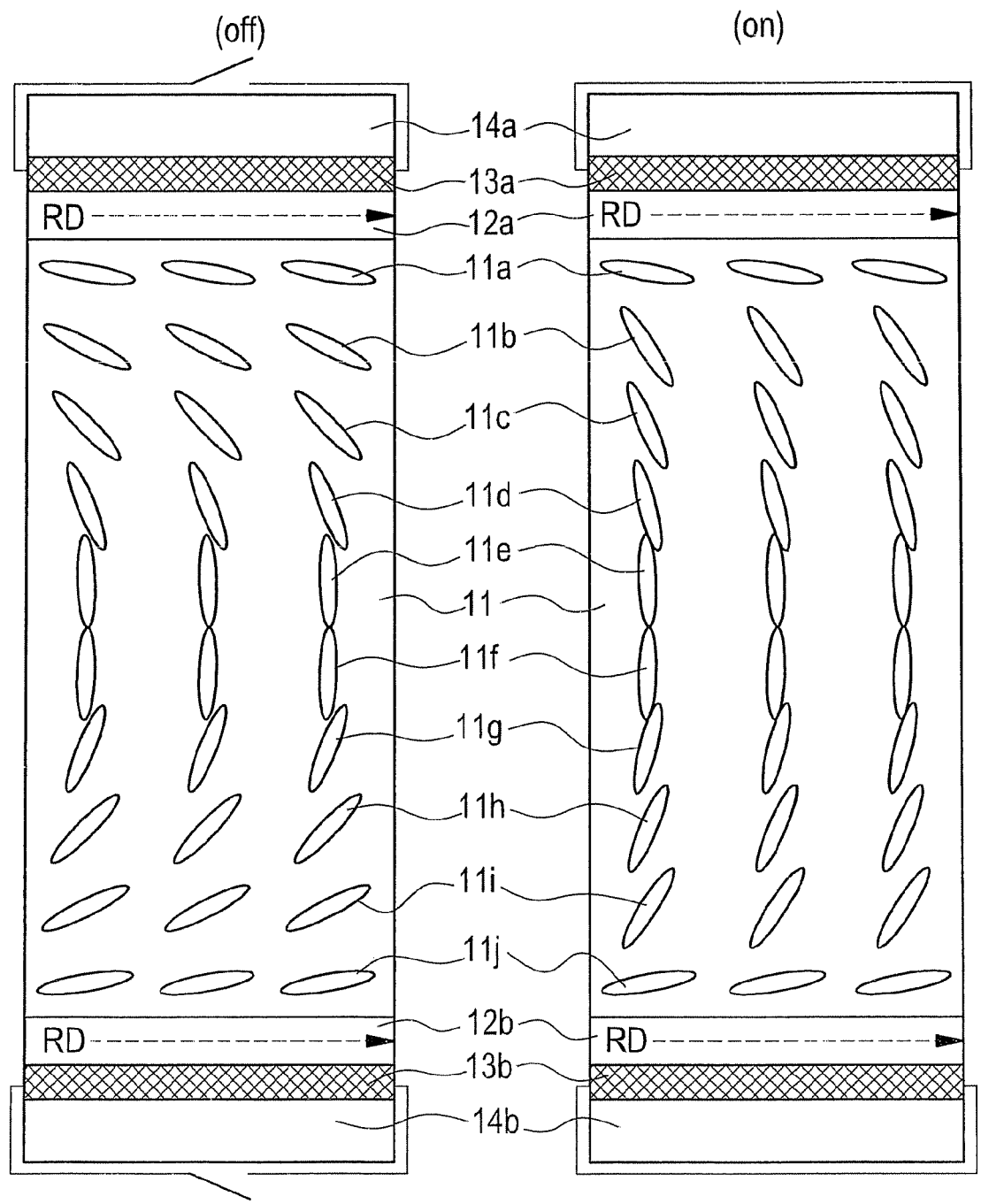
FIG. 1 is a sectional view diagrammatically illustrating the alignment of a liquid crystal compound in a bend-aligned liquid crystal cell.

The invention will be further described hereinafter.

The term "Re (λ)" as used herein is meant to indicate in-plane retardation at a wavelength λ. Re(λ) is a value measured when light having a wavelength λ nm is incident in the direction normal to the film using "KOBRA 21ADH" (produced by Ouji Scientific Instruments Co. Ltd.). Rth (λ) is calculated by "KOBRA 21ADH" on the basis of retardation values measured in the total three directions, i.e., Re(λ), retardation value measured by the incidence of light having a wavelength λ nm in the direction inclined at an angle of +40° from the direction normal to the film with the in-plane slow axis (judged by "KOBRA 21 ADH") as an inclined axis (rotary axis), retardation value measured by the incidence of light having a wavelength λ nm in the direction inclined at an angle of −40° from the direction normal to the film, hypothetical average refractive index and inputted film thickness. As a hypothetical average refractive index there may be used one disclosed in "Polymer Handbook", John Wiley & Sons, Inc. and various catalogues of optical films. For the cellulose acylate films having an unknown average refractive index, an Abbe refractometer may be used. The average refractive index of main optical films are exemplified below. Cellulose acylate (1.48), cycloolefin polymer (1.52), polycarbonate (1.59), polymethylene methacrylate (1.49), polystyrene (1.59). By inputting the hypothetic average refractive indexes and film thicknesses, KOBRA 21ADH calculates $n_x$, $n_y$ and $n_z$. From nx, ny and nz thus calculated is then calculated Nz=(nx−nz)/(nx−ny).

In the invention, the retardation value is measured at a wavelength of 550 nm unless otherwise specified.

(Liquid Crystal Display Device)

FIG. 1 depicts a sectional view diagrammatically illustrating the orientation of liquid crystal compounds in a bend-aligned liquid crystal cell. As shown in FIG. 1, a bend-aligned liquid crystal cell (10) has a liquid crystal compound (11) enclosed between an upper substrate (14a) and a lower substrate (14b). The liquid crystal compound (11) to be used in the bend-aligned liquid crystal cell normally has a positive dielectric anisotropy. The upper substrate (14a) and the lower substrate (14b) of the liquid crystal cell have alignment films (12a, 12b) and electrode layers (13a, 13b), respectively. The alignment films each are capable of aligning the rod-shaped liquid crystal molecules (11a to 11j). RD indicates the rubbing direction of the alignment film. The electrode layers each are capable of applying a voltage to the rod-shaped liquid crystal molecules (11a to 11j).

When the voltage applied to the bend-aligned liquid crystal cell is low, the rod-shaped liquid crystal molecules (11a to 11e) disposed on the upper substrate (14a) side of the liquid crystal cell and the rod-shaped liquid crystal molecules (11f to 11j) disposed on the lower substrate (14b) side of the liquid crystal cell are aligned in the opposing directions (aligned symmetrically) as shown by the part (off) in FIG. 1. The rod-shaped liquid crystal molecules (11a, 11b, 11i, 11j) disposed in the vicinity of the substrates (14a, 14b) are aligned substantially horizontally and the rod-shaped liquid crystal molecules (11d to 11g) disposed at the central part of the liquid crystal cell are aligned substantially vertically.

When the voltage applied to the bend-aligned liquid crystal cell is high, the rod-shaped liquid crystal molecules (11a, 11j) disposed in the vicinity of the substrates (14a, 14b) remain aligned substantially horizontally as shown by the part (on) in FIG. 1. The rod-shaped liquid crystal molecules (11e, 11f) disposed at the central part of the liquid crystal cell remain aligned substantially vertically. The rod-shaped liquid crystal molecules the alignment of which change with the rise of voltage are those disposed between the substrates and the central part of the liquid crystal cell (11b, 11c, 11d, 11g, 11h, 11i). These rod-shaped liquid crystal molecules are aligned more vertically than in off state. However, the rod-shaped liquid crystal molecules (11a to 11e) disposed on the upper substrate (14a) side of the liquid crystal cell and the rod-shaped liquid crystal molecules (11f to 11j) disposed on the lower substrate (14b) side of the liquid crystal cell remain aligned in opposing directions (aligned symmetrically) as in off state.

Figure 2:
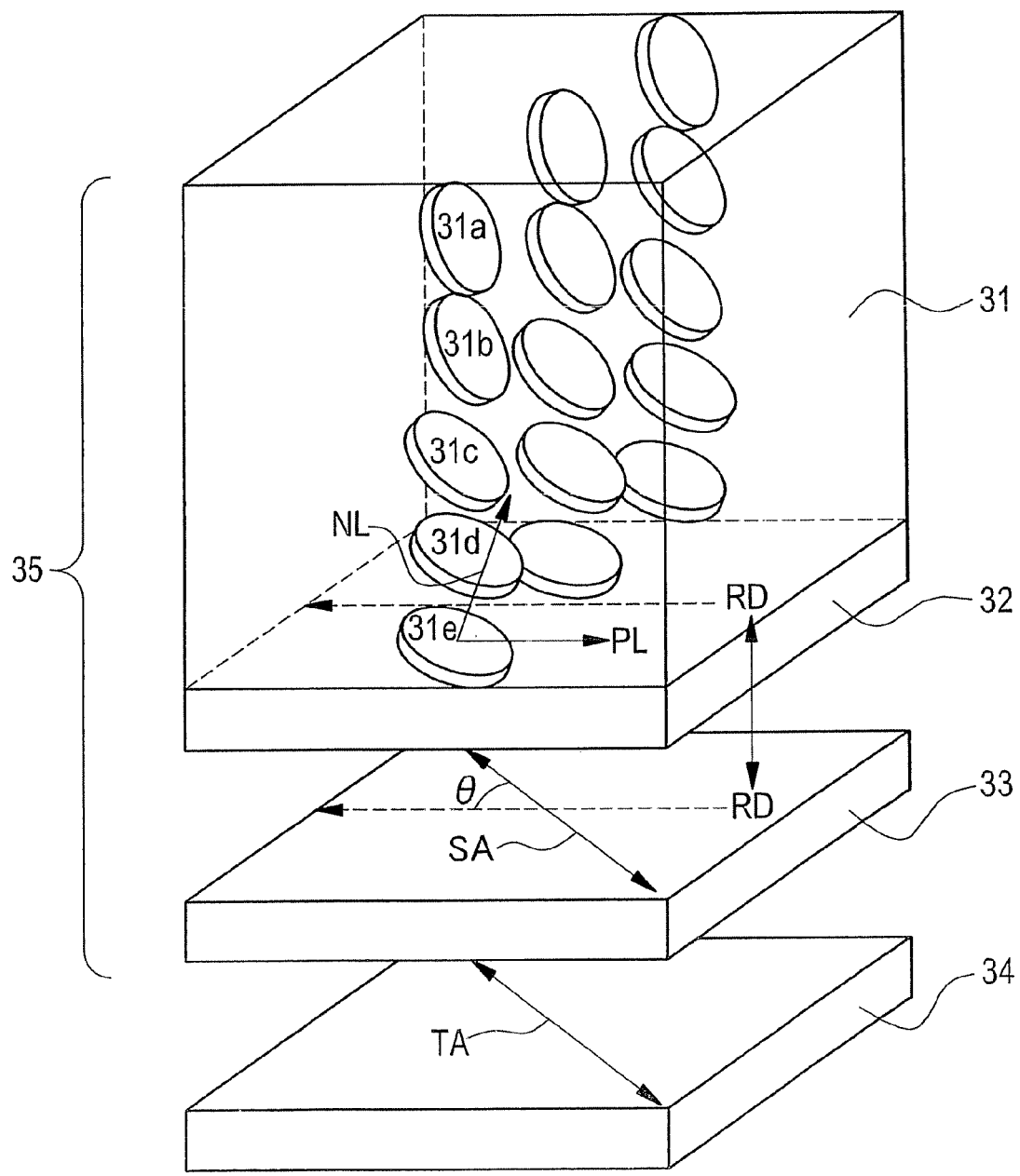
FIG. 2 is a diagrammatic view illustrating a polarizing plate according to an aspect of the invention.

FIG. 2 depicts an example of diagrammatic view illustrating a polarizing plate according to the invention. FIG. 2 depicts an example in which an optically anisotropic layer 1 is constituted by mixing two or more discotic liquid crystal compounds having different structures with each other. The polarizing plate shown in FIG. 2 is composed of a laminate of an optically anisotropic layer 1 (31) containing discotic liquid crystal compounds (31a to 31e), an optically anisotropic layer 2 (33) comprising at least one sheet of cellulose acylate film and a polarizing film (34). The polarizing plate shown in FIG. 2 has an alignment film (32) provided interposed between the optically anisotropic layer 1 (31) and the optically anisotropic layer 2 (33). The discotic liquid crystal compounds (31a to 31e) constituting the optically anisotropic layer 1 (31) are planar molecules. The discotic liquid crystal compounds (31a to 31e) each have only one plane, i.e., disc surface in its molecule. The disc surface is tilted with respect to the surface of the optically anisotropic layer 2 (33). The angle (angle of inclination) of the disc surface with respect to the surface of the optically anisotropic layer 2 rises with the rise of the distance from the discotic liquid crystal compound and the alignment film. The average angle of inclination preferably falls within the range of from 15° to 50°. When the angle of inclination varies, the capability of enlarging the view angle of the polarizing plate can be remarkably enhanced as shown in FIG. 2. The polarizing plate the inclination angle of which can be varied is also capable of preventing the reversion, gradation change or coloration of displayed image. The average of direction (PL) of line normal to the disc surface (NL) of the discotic liquid crystal compounds (31a to 31e) regularly projected on the second optically anisotropic layer (33) is not parallel to the rubbing direction (RD) of the alignment film (32).

A preferred function of the invention is to predetermine the angle of the average of direction of the line normal to the disc surface of discotic compounds regularly projected on the optically anisotropic layer 2 with respect to the in-plane slow axis (SA) of the optically anisotropic layer 2 (33) to substantially 45°. Therefore, if suffices if the angle (θ) of the rubbing direction (RD) of the alignment film (32) with respect to the in-plane slow (SA) of the optically anisotropic layer 2 is adjusted to substantially 45° at the step of producing the polarizing plate. In the invention, the optically anisotropic layer 2 and the polarizing film are disposed in such an arrangement that the in-plane slow axis (SA) of the optically anisotropic layer 2 and the in-plane transmission axis (TA) of the polarizing film (34) are disposed parallel or perpendicular to each other. The polarizing plate shown in FIG. 2 has two sheets of optically anisotropic layers 2 disposed parallel to each other. Principally speaking, the in-plane slow axis (SA) of the optically anisotropic layer 2 (33) corresponds to the stretching direction of the optically anisotropic layer 2. Principally speaking, the in-plane transmission axis (TA) of the polarizing film (34) corresponds to the direction perpendicular to the stretching direction of the polarizing film.

Figure 3:
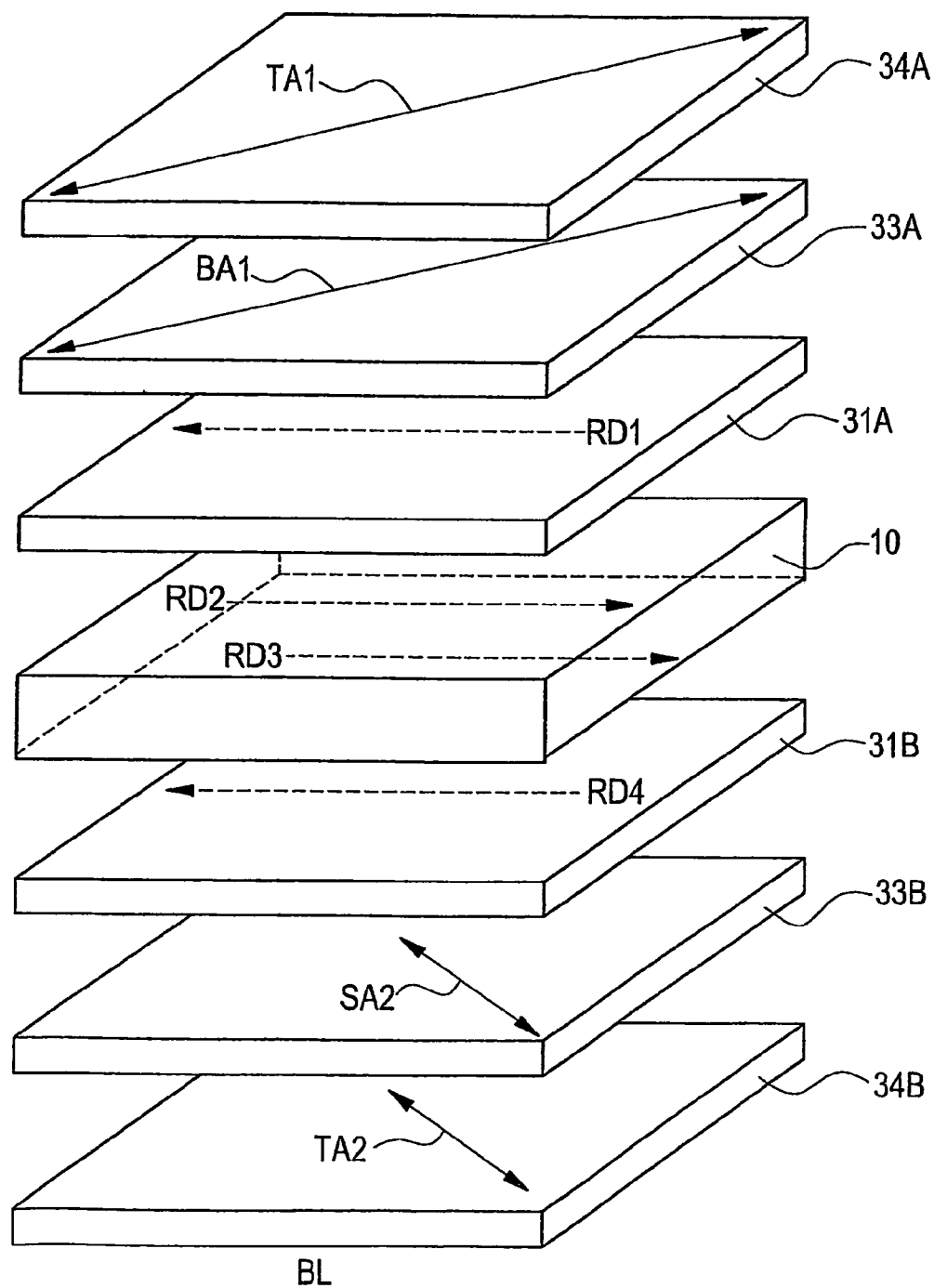
FIG. 3 is a diagrammatic view illustrating a bend-aligned liquid crystal display device according to an aspect of the invention.

FIG. 3 is a diagrammatic view illustrating a bend-aligned liquid crystal display device according to the invention. The liquid crystal display device shown in FIG. 3 comprises a bend-aligned liquid crystal cell (10), a pair of polarizing plates (31A to 34A, 31B to 34B) disposed on the respective side of the liquid crystal cell and a back light (BL). The bend-aligned liquid crystal cell (10) corresponds to the liquid crystal cell shown in FIG. 1. The upper and lower rubbing directions (RD2, RD3) of the liquid crystal cell (10) extend in the same direction (parallel). The polarizing plate has optically anisotropic layers 1 (31A, 31B), optically anisotropic layers 2 (33A, 33B) and polarizing films (34A, 34B) laminated in this order as viewed from the liquid crystal cell (10) side thereof. The rubbing directions (RD1, RD4) of the discotic liquid crystal compound of the optically anisotropic layers 1 (31A, 31B) are not parallel to the rubbing directions (RD2, RD3) of the discotic liquid crystal compound. As previously mentioned, the rubbing directions (RD1, RD4) of the discotic liquid crystal compound are not parallel to the average of direction of the line normal to the disc surface regularly projected on the optically anisotropic layer 2. The in-plane slow axes (SA1, SA2) of the optically anisotropic layers 2 (33A, 33B) and the in-plane transmission axes (TA1, TA2) of the polarizing films (34A, 34B) are disposed at substantially 45° with respect to the rubbing directions (RD1, RD4) of the discotic liquid crystal compound on the same plane. The two sheets of polarizing films (34A, 34B) are disposed in crossed Nicols such that the in-plane transmission axes (TA1, TA2) are perpendicular to each other.

(Optically Anisotropic Layer 1)

The optical film of the invention is an optically compensatory film having at least two optically anisotropic layers.

The optically anisotropic layer 1 of the invention is formed by a plurality of liquid crystal compounds having different structures. The optically anisotropic layer 1 may be formed directly on the surface of the optically anisotropic layer 2 or on an alignment film formed on the optically anisotropic layer 2. The term "different structures" as used herein is meant to indicate different absorption wavelengths.

As the liquid crystal compound to be used in the formation of the optically anisotropic layer 1 there may be used a discotic liquid crystal compound and a rod-shaped liquid crystal compound. The retardation value of the optically anisotropic layer 1 as measured in the direction of line normal to the surface of the film is preferably from 20 nm to 40 nm, more preferably from 25 nm to 40 nm.

The optically anisotropic layer 1 is preferably designed to compensate for the liquid crystal compound in the liquid crystal cell when the liquid crystal display device performs black display. For the details of alignment of liquid crystal compounds in liquid crystal cell, reference can be made to IDW'00, FMC7-2, pp. 411-414.

The discotic liquid crystal compound and a rod-shaped liquid crystal compound may be a polymer liquid crystal or low molecular liquid crystal. A low molecular liquid crystal which has been crosslinked and no longer exhibits liquid crystal properties may be used.

Hereafter, liquid crystal compounds used in the invention are described in detail.

(Discotic Liquid Crystal Compound)

Examples of the discotic liquid crystal compound include benzene derivatives disclosed in C. Destrade et al's study report, "Mol. Cryst.", vol. 71, page 111 (1981), truxene derivatives disclosed in C. Destrade and et al's study report, "Mol. Cryst.", vol. 122, page 141 (1985), and "Physics lett", A, vol. 78, page 82 (1990), cyclohexane derivatives disclosed in B. Kohne et al's study report, "Angew. Chem.", vol. 96, page 70 (1984), and azacrown-based or phenyl acetylene-based macrocycles disclosed in J. M. Lehn et al's study report, "J. Chem. Commut.", page 1,794 (1985), J. Zhang et al's study report, "J. Am. Chem. Soc.", vol. 116, page 2,655 (1994).

Examples of the aforementioned discotic liquid crystal compounds include liquid crystal compounds comprising a nucleus disposed at the center of the molecule and straight-chain alkyl groups, alkoxy groups or substituted benzoyloxy groups disposed radially on the nucleus as side chains of the nucleus. In the invention, as a discotic liquid crystal compound, liquid crystal compounds having a trisubstituted benzene skeleton or triphenylene skeleton are preferably included. The discotic liquid crystal compound is preferably a compound the molecules or molecule aggregate of which have a rotary symmetry and thus can be aligned as desired.

In the case where the optically anisotropic layer 1 is formed by a discotic liquid crystal compound, the compound which is finally incorporated in the optically anisotropic layer 1 no longer needs to show liquid crystal properties. For example, in the case where the low molecular discotic liquid crystal compound has a group which reacts when heated or irradiated with light so that when heated or irradiated with light, the resulting reaction of the group causes the low molecular discotic liquid crystal compound to undergo polymerization or crosslinking to form an optically anisotropic layer 1, the compound incorporated in the optically anisotropic layer 1 may no longer maintain its liquid crystal properties. For the preferred examples of the discotic liquid crystal compounds, reference can be made to JP-A-8-50206. For the details of polymerization of discotic liquid crystal compound, reference can be made to JP-A-8-27284.

In order to fix the discotic liquid crystal compound by polymerization, it is necessary that polymerizable groups be connected to the disc-shaped core of the discotic liquid crystal compound as substituents. However, when polymerizable groups are directly connected to the disc-shaped core, it is difficult to keep the discotic liquid crystal molecules aligned as desired in the polymerization reaction. It is therefore preferred that connecting groups be incorporated in between the disc-shaped core and the polymerizable groups. The discotic liquid crystal compound having a polymerizable group is preferably a compound represented by the following formula (DI).

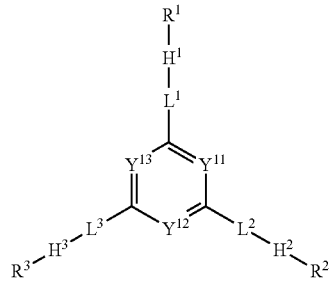

Formula (DI)

In the formula (DI), $Y^{11}$, $Y^{12}$ and $Y^{13}$ each independently represent a methine or nitrogen atom.

When $Y^{11}$, $Y^{12}$ and $Y^{13}$ each are a methine, the hydrogen atoms in the methine may be substituted by a substituent. The term "methine" as used herein is meant to indicate an atomic group obtained by removing three hydrogen atoms from methane.

Preferred examples of the substituents on the carbon atoms in the methine include alkyl groups, alkoxy groups, aryloxy groups, acyl groups, alkoxycarbonyl groups, acyloxy groups, acylamino groups, alkoxycarbonylamino groups, alkylthio groups, arylthio groups, halogen atoms, and cyano groups. More desirable among these substituents are alkyl groups, alkoxy groups, alkoxycarbonyl groups, acyloxy groups, halogen atoms, and cyano groups. Most desirable among these substituents are $C_1$-$C_{12}$ alkyl groups, $C_1$-$C_{12}$ alkoxy groups, $C_2$-$C_{12}$ alkoxycarbonyl groups, $C_2$-$C_{12}$ acyloxy groups, halogen atoms, and cyano groups.

$Y^{11}$, $Y^{12}$ and $Y^{13}$ each are more preferably a methine. Most preferably, the methine is unsubstituted.

In the formula (DI), $L^1$, $L^2$ and $L^3$ each independently represent a single bond or divalent connecting group. The divalent connecting groups represented by $L^1$, $L^2$ and $L^3$ each are independently a divalent connecting group selected from the group consisting of —O—, —S—, —C(=O)—, —NR$^7$—, —CH=CH—, —C≡C—, divalent cyclic group and combination thereof. $R^7$ is a $C_1$-$C_7$ alkyl group or hydrogen atom, preferably a $C_1$-$C_4$ alkyl group or hydrogen atom, more preferably a methyl group, ethyl group or hydrogen atom, most preferably a hydrogen atom.

The divalent cyclic groups represented by $L^1$, $L^2$ and $L^3$ each are a divalent connecting having at least one cyclic structure (hereinafter occasionally referred to as "cyclic group"). The cyclic group is preferably a 5-, 6-or 7-membered ring, more preferably a 5-or 6-membered ring, most preferably a 6-membered ring. The ring contained in the cyclic group may be a condensed ring. However, a monocycle is preferred to condensed ring. The ring contained in the cyclic group may be any of aromatic ring, aliphatic ring and heterocyclic group. Preferred examples of the aromatic ring include benzene ring and naphthalene ring. Preferred examples of the aliphatic ring include cyclohexane ring. Examples of the heterocyclic group include pyridine ring and pyrimidine ring. Preferred among these cyclic groups are aromatic ring and heterocyclic group. Hereinafter, the divalent cyclic group in the invention is more preferably a divalent connecting group composed of cyclic structure (containing substituents) alone.

Preferred among divalent cyclic groups having benzene ring represented by $L^1$, $L^2$ and $L^3$ is 1,4-phenylene group. Preferred examples of cyclic group having naphthalene ring include naphthalene-1,5-diil and naphthalene-2,6-diil. The cyclic group having cyclohexane ring is preferably 1,4-cyclohexylene. The cyclic group having pyridine ring is preferably pyridine-2,5-diil. The cyclic group having pyrimidine ring is preferably pyrimidine-2,5-diil.

The divalent cyclic groups represented by $L^1$, $L^2$ and $L^3$ each may have substituents. Examples of the substituents include halogen atoms, cyano groups, nitro groups, $C_1$-$C_{16}$ alkyl groups, $C_2$-$C_{16}$ alkenyl groups, $C_2$-$C_{16}$ alkynyl groups, $C_1$-$C_{16}$ halogen-substituted alkyl groups, $C_1$-$C_{16}$ alkoxy groups, $C_2$-$C_{16}$ acyl groups, $C_1$-$C_{16}$ alkylthio groups, $C_2$-$C_{16}$ acyloxy groups, $C_2$-$C_{16}$ alkoxycarbonyl groups, carbamoyl groups, $C_2$-$C_{16}$ alkyl-substituted carbamoyl groups, and $C_2$-$C_{16}$ acylamino groups.

Preferred examples of $L^1$, $L^2$ and $L^3$ include *—O—CO—, *—CO—O—, *—CH=CH—, *—C≡C—, *-divalent cyclic group-, *—O—CO-divalent cyclic group-, *—CO—O-divalent cyclic group-, *—CH=CH-divalent cyclic group-, *—C≡C-divalent cyclic group-, *-divalent cyclic group-O—CO—, *-divalent cyclic group-CO—O—, *-divalent cyclic group-CH=CH—, and *-divalent cyclic group-C≡C—. Particularly preferred among these groups are single bond, *—CH=CH—, *—C≡C—, *-divalent cyclic group-O—CO—, *—CH=CH-divalent cyclic group-, and *—C≡C-divalent cyclic group-. Mostly preferred among these groups is single bond. The symbol * indicates the position at which the moiety is connected to the 6-membered ring containing $Y^{11}$, $Y^{12}$ and $Y^{13}$ in the formula (DI).

$H^1$, $H^2$ and $H^3$ each independently represent one represented by the following formula (DI-A) or (DI-B).

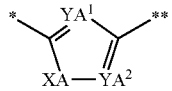

Formula (DI-A)

In the formula (DI-A), $YA^1$ and $YA^2$ each independently represent a methine or nitrogen atom. At least one of $YA^1$ and $YA^2$ is preferably a nitrogen atom. More preferably, both $YA^1$ and $YA^2$ are each a nitrogen atom. XA represents an oxygen atom, sulfur atom, methylene or imino, preferably oxygen atom. The symbol * indicates the position at which the moiety is connected to $L^1$ to $L^3$ in the formula (DI). The symbol ** indicates the position at which the moiety is connected to $R^1$ to $R^3$ in the formula (DI). The term "imino" as used herein is meant to indicate one represented by —NH—.

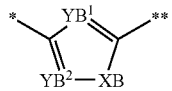

Formula (DI-B)

In the formula (DI-B), $YB^1$ and $YB^2$ each independently represent a methine or nitrogen atom. At least one of $YB^1$ and $YB^2$ is preferably a nitrogen atom. More preferably, both $YB^1$ and $YB^2$ are each a nitrogen atom. XB represents an oxygen atom, sulfur atom, methylene or imino, preferably oxygen atom. The symbol * indicates the position at which the moiety is connected to $L^1$ to $L^3$ in the formula (DI). The symbol ** indicates the position at which the moiety is connected to $R^1$ to $R^3$ in the formula (DI).

$R^1$, $R^2$ and $R^3$ each independently represent one represented by the following formula (DI-R).

(DI-R)

In the formula (DI-R), * indicates the position at which the moiety is connected to $H^1$ to $H^3$ in the formula (DI).

$L^{21}$ represents a single bond or divalent connecting group. The divalent connecting group represented by $L^{21}$ is preferably a divalent connecting group selected from the group consisting of —O—, —S—, —C(=O)—, —NR$^7$—, —CH=CH—, —C≡C— and combination thereof. $R^7$ is a $C_1$-$C_7$ alkyl group or hydrogen atom, preferably a $C_1$-$C_4$ alkyl group or hydrogen atom, more preferably a methyl, ethyl group or hydrogen atom, most preferably hydrogen atom.

$L^{21}$ is preferably any of single bond, *—O—CO—, *—CO—O—, *—CH=CH— and *—C≡C— (The symbol *** indicates * side in the formula (DI-R)), more preferably single bond.

$Q^2$ represents a divalent group having at least one cyclic structure (cyclic group). Such a cyclic group preferably has a 5-, 6- or 7-membered ring, more preferably a 5- or 6-membered ring, even more preferably a 6-membered ring. The cyclic structure contained in the aforementioned cyclic group may be a condensed ring. However, monocycle is preferred to condensed ring. The ring contained in the cyclic group may be any of aromatic ring, aliphatic ring and heterocyclic group. Preferred examples of the aromatic ring include benzene ring and naphthalene ring. Preferred examples of the aliphatic ring include cyclohexane ring. Examples of the heterocyclic group include pyridine ring and pyrimidine ring.

Among the groups represented by $Q^2$, the cyclic group having benzene ring is preferably 1,4-phenylene. Preferred examples of cyclic group having naphthalene ring include naphthalene-1,5-diil and naphthalene-2,6-diil. The cyclic group having cyclohexane ring is preferably 1,4-cyclohexylene. The cyclic group having pyridine ring is preferably pyridine-2,5-diil. The cyclic group having pyrimidine ring is preferably pyrimidine-2,5-diil. Particularly preferred among these groups are 1,4-phenylene and 1,4-cyclohexylene.

$Q^2$ may have substituents. Examples of the substituents include halogen atoms (fluorine, chlorine, bromine, iodine), cyano groups, nitro groups, $C_1$-$C_{16}$ alkyl groups, $C_2$-$C_{16}$ alkenyl groups, $C_2$-$C_{16}$ alkynyl groups, $C_1$-$C_{16}$ halogen-substituted alkyl groups, $C_1$-$C_{16}$ alkoxy groups, $C_2$-$C_{16}$ acyl groups, $C_1$-$C_{16}$ alkylthio groups, $C_2$-$C_{16}$ acyloxy groups, $C_2$-$C_{16}$ alkoxycarbonyl groups, carbamoyl groups, $C_2$-$C_{16}$ alkyl-substituted carbamoyl group, and $C_2$-$C_{16}$ acylamino groups. Preferred among these substituents are halogen atoms, cyano groups, $C_1$-$C_6$ alkyl groups and $C_1$-$C_6$ halogen-substituted alkyl groups. More desirable among these substituents are halogen atoms, $C_1$-$C_4$ alkyl groups and $C_1$-$C_4$ halogen-substituted alkyl groups. Even more desirable among these substituents are halogen atoms, $C_1$-$C_3$ alkyl groups and trifluoromethyl groups.

The suffix $n^1$ indicates an integer of from 0 to 4. The suffix $n^1$ is preferably an integer of from 1 to 3, more preferably 1 or 2.

$L^{22}$ represents —O—, —O—CO—, —CO—O—, —O—CO—O—, **—S—, *—N(R)—, —CH$_2$—, —CH=CH— or —C≡C— in which the symbol  indicates the position at which the moiety is connected to $Q^2$ side.

$L^{22}$ is preferably —O—, —O—CO—, —CO—O—, —O—CO—O—, —CH$_2$—, —CH=CH— or —C≡C—, more preferably —O—, —O—CO—, —O—CO—O— or **—CH$_2$—. R represents a $C_1$-$C_5$ alkyl group.

$L^{23}$ represents a divalent connecting group selected from the group consisting of —O—, —S—, —C(=O)—, —NH—, —CH$_2$—, —CH=CH—, —C≡C— and combination thereof. The hydrogen atom in —NH—, —CH$_2$— and —CH=CH— may be substituted by substituents. Preferred examples of the substituents include halogen atoms, cyano groups, nitro groups, $C_1$-$C_6$ alkyl groups, $C_1$-$C_6$ halogen-substituted alkyl groups, $C_1$-$C_6$ alkoxy groups, $C_2$-$C_6$ acyl groups, $C_1$-$C_6$ alkylthio groups, $C_2$-$C_6$ acyloxy groups, $C_2$-$C_6$ alkoxycarbonyl groups, carbamoyl groups, $C_2$-$C_6$ alkyl-substituted carbamoyl group, and $C_2$-$C_6$ acylamino groups. Preferred among these substituents are halogen atoms and $C_1$-$C_6$ alkyl groups.

$L^{23}$ is preferably selected from the group consisting of —O—, —C(=O)—, —CH$_2$—, —CH=CH—, —C≡C— and combination thereof. $L^{23}$ preferably has from 1 to 20 carbon atoms, more preferably from 2 to 14 carbon atoms. Further, $L^{23}$ preferably has from 1 to 16 —CH$_2$-groups, more preferably from 2 to 12 —CH$_2$— groups.

Q1 represents a polymerizable group or hydrogen atom. In the case where the liquid crystal compound to be used in the invention is used in the optically compensatory sheet or other materials the retardation of which is preferably not subject to thermal change, $Q^1$ is preferably a polymerizable group. The polymerization reaction is preferably addition polymerization (including ring-opening polymerization) or condensation polymerization. In other words, the polymerizable group is preferably a functional group that can undergo addition polymerization or condensation polymerization reaction. Examples of these polymerizable groups will be given below.

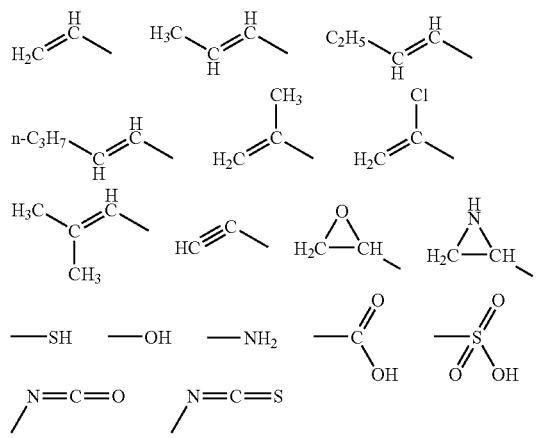

Further, the polymerizable group is particularly preferably a functional group that can undergo addition polymerization reaction. Such a polymerizable group is preferably a polymerizable ethylenically unsaturated group or ring-opening polymerizable group.

Examples of the polymerizable ethylenically unsaturated group include those represented by the following formulae (M-1) to (M-6).

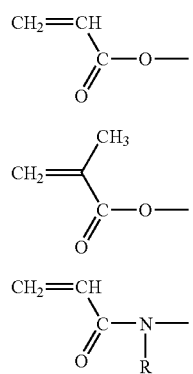

(M-1)

(M-2)

(M-3)

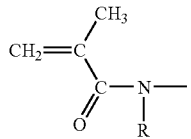

(M-4)

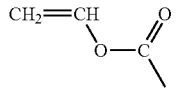

(M-5)

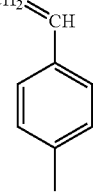

(M-6)

In the formulae (M-3) and (M-4), R represents a hydrogen atom or alkyl group, preferably a hydrogen atom or methyl group.

Preferred among the formulae (M-1) to (M-6) is (M-1) or (M-2). (M-1) is more desirable.

The ring-opening polymerizable group is preferably a cyclic ether group, more preferably an epoxy group or oxetanyl group, most preferably an epoxy group.

The liquid crystal compound to be used in the invention is particularly preferably a liquid crystal compound represented by the following formula (DII).

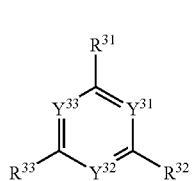

Formula (DII)

In the formula (DII), $Y^{31}$, $Y^{32}$ and $Y^{33}$ each independently represent a methine or hydrogen atom and have the same meaning as $Y^{11}$, $Y^{12}$ and $Y^{13}$ in the formula (DI), respectively, including their preferred range.

In the formula (DII), $R^{31}$, $R^{32}$ and $R^{33}$ each independently represent one represented by the following formula (DII-R).

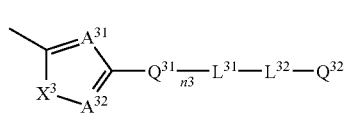

Formula (DII-R)

In the formula (DII-R), $A^{31}$ and $A^{32}$ each independently represent a methine or nitrogen atom. At least one of $A^{31}$ and $A^{32}$ is preferably a nitrogen atom. More preferably, both $A^{31}$ and $A^{32}$ are each a nitrogen atom. $X^3$ represents an oxygen atom, sulfur atom, methylene or imino, preferably oxygen atom.

Q31 represents a divalent connecting group having a 6-membered cyclic structure (hereinafter occasionally referred to as "6-membered cyclic group"). The 6-membered ring may be a condensed ring. However, a monocycle is preferred to condensed ring. The ring contained in the 6-membered cyclic group may be any of aromatic ring, aliphatic ring and heterocyclic group. Preferred examples of the aromatic ring include benzene ring and naphthalene ring. Preferred examples of the aliphatic ring include cyclohexane ring. Examples of the heterocyclic group include pyridine ring and pyrimidine ring.

Preferred examples of the 6-membered cyclic group having benzene ring represented by $Q^{31}$ include 1,4-phenylene and 1,3-phenylene. Preferred examples of cyclic group having naphthalene ring include naphthalene-1,5-diil and naphthalene-2,6-diil. The cyclic group having cyclohexane ring is preferably 1,4-cyclohexylene. The cyclic group having pyridine ring is preferably pyridine-2,5-diil. The cyclic group having pyrimidine ring is preferably pyrimidine-2,5-diil. Particularly preferred among these groups are 1,4-phenylene and 1,3-phenylene.

The cyclic structure represented by $Q^{31}$ may have substituents. Examples of the substituents include halogen atoms (fluorine, chlorine, bromine, iodine), cyano groups, nitro groups, $C_1$-$C_{16}$ alkyl groups, $C_2$-$C_{16}$ alkenyl groups, $C_2$-$C_{16}$ alkynyl groups, $C_1$-$C_{16}$ halogen-substituted alkyl groups, $C_1$-$C_{16}$ alkoxy groups, $C_2$-$C_{16}$ acyl groups, $C_1$-$C_{16}$ alkylthio groups, $C_2$-$C_{16}$ acyloxy groups, $C_2$-$C_{16}$ alkoxycarbonyl groups, carbamoyl groups, $C_2$-$C_{16}$ alkyl-substituted carbamoyl group, and $C_2$-$C_{16}$ acylamino groups. Preferred among these substituents on the 6-membered cyclic group are halogen atoms, cyano groups, $C_1$-$C_6$ alkyl groups, and $C_1$-$C_6$ halogen-substituted alkyl groups. More desirable among these substituents are halogen atoms, $C_1$-$C_4$ alkyl groups, and $C_1$-$C_4$ halogen-substituted alkyl groups. Even more desirable among these substituents are halogen atoms, $C_1$-$C_3$ alkyl groups and trifluoromethyl groups.

The suffix $n^3$ represents an integer of from 1 to 3, preferably 1 or 2.

$L^{31}$ represents *—O—, *—O—CO—, *—CO—O—, *—O—CO—O—, *—S—, *—N(R)—, *—CH$_2$—, *—CH=CH— or *—C≡C— (in which R represents a $C_1$-$C_5$ alkyl group). The symbol * indicates the position at which the moiety is connected to $Q^{31}$ side. $L^{31}$ has the same meaning as $L^{22}$ in the formula (DI-R), including their preferred range.

$L^{32}$ represents a divalent connecting group selected from the group consisting of —O—, —S—, —C(=O)—, —NH—, —CH$_2$—, —CH=CH—, —C≡C—, and combination thereof. In some detail, $L^{32}$ has the same meaning as $L^{23}$ in the formula (DI-R), including their preferred range.

$Q^{32}$ in the formula (DII-R) represents a polymerizable group or hydrogen atom. In some detail, $Q^{32}$ has the same meaning as Q1 in the formula (DI-R), including their preferred range.

Specific examples of the liquid crystal compounds represented by the formulae (DI) and (DII) will be given below, but the invention is not limited thereto. JP-A-11-316378 discloses various discotic liquid crystal compounds which can be used in combination with the following liquid crystal compounds.

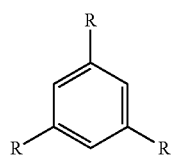

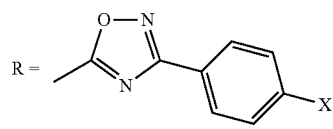

| X = | | |
|---|---|---|
| —OC$_4$H$_9$ | | D-1 |
| —OC$_5$H$_{11}$ | | D-2 |
| —OC$_6$H$_{13}$ | | D-3 |
| —OC$_7$H$_{15}$ | | D-4 |
| —OC$_8$H$_{17}$ | | D-5 |
| —OCH$_2$CH(CH$_3$)C$_4$H$_9$ | | D-6 |
| —O(CH$_2$)$_2$OCOCH=CH$_2$ | | D-7 |
| —O(CH$_2$)$_3$OCOCH=CH$_2$ | | D-8 |
| —O(CH$_2$)$_4$OCOCH=CH$_2$ | | D-9 |
| —O(CH$_2$)$_5$OCOCH=CH$_2$ | | D-10 |
| —O(CH$_2$)$_6$OCOCH=CH$_2$ | | D-11 |
| —O(CH$_2$)$_7$OCOCH=CH$_2$ | | D-12 |
| —O(CH$_2$)$_8$OCOCH=CH$_2$ | | D-13 |
| —O(CH$_2$)$_2$C(CH$_3$)OCOCH=CH$_2$ | | D-14 |
| —O(CH$_2$)$_3$C(CH$_3$)OCOCH=CH$_2$ | | D-15 |
| —O(CH$_2$CH$_2$O)$_2$COCH=CH$_2$ | | D-16 |
| —O(CH$_2$)$_4$OCOC(CH$_3$)=CH$_2$ | | D-17 |
| —O(CH$_2$)$_4$OCOCH=CHCH$_3$ | | D-18 |
| OCH=CH$_2$ | | D-19 |
| —O(CH$_2$)$_4$—CH—CH$_2$ (epoxide) | | D-20 |

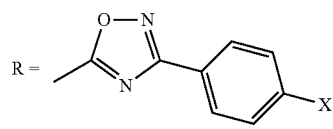

| X = | | |
|---|---|---|
| —OCOC$_4$H$_9$ | | D-21 |
| —OCOC$_5$H$_{11}$ | | D-22 |
| —OCOC$_6$H$_{13}$ | | D-23 |
| —OCO(CH$_2$)$_2$OCOCH=CH$_2$ | | D-24 |
| —OCO(CH$_2$)$_3$OCOCH=CH$_2$ | | D-25 |
| —OCO(CH$_2$)$_4$OCOCH=CH$_2$ | | D-26 |
| —OCO(CH$_2$)$_5$OCOCH=CH$_2$ | | D-27 |
| —OCO(CH$_2$)$_6$OCOCH=CH$_2$ | | D-28 |
| —OCO(CH$_2$)$_7$OCOCH=CH$_2$ | | D-29 |
| —OCO(CH$_2$)$_2$C(CH$_3$)OCOCH=CH$_2$ | | D-30 |
| —OCO(CH$_2$)$_2$OCOC(CH$_3$)=CH$_2$ | | D-31 |
| —OCO(CH$_2$)$_2$OCOCH=CHCH$_3$ | | D-32 |
| —OCO(CH$_2$)$_4$OCH=CH$_2$ | | D-33 |
| —OCO(CH$_2$)$_4$—CH—CH$_2$ (epoxide) | | D-34 |

-continued

R group structure: 1,3,5-trisubstituted benzene with three R groups; each R = 5-methyl-1,2,4-oxadiazol-3-yl connected to a para-X-phenyl group.

| X = | |
|---|---|
| —OCOOC$_4$H$_9$ | D-35 |
| —OCOOC$_5$H$_{11}$ | D-36 |
| —OCOOC$_6$H$_{13}$ | D-37 |
| —OCOO(CH$_2$)$_2$OCOCH=CH$_2$ | D-38 |
| —OCOO(CH$_2$)$_3$OCOCH=CH$_2$ | D-39 |
| —OCOO(CH$_2$)$_4$OCOCH=CH$_2$ | D-40 |
| —OCOO(CH$_2$)$_5$OCOCH=CH$_2$ | D-41 |
| —OCOO(CH$_2$)$_6$OCOCH=CH$_2$ | D-42 |
| —OCOO(CH$_2$)$_7$OCOCH=CH$_2$ | D-43 |
| —OCOOC(CH$_3$)CH$_2$CH$_2$OCOCH=CH$_2$ | D-44 |
| —OCOOC(CH$_2$CH$_2$O)$_2$COCH=CH$_2$ | D-45 |
| —OCOO(CH$_2$)$_2$OCOC(CH$_3$)=CH$_2$ | D-46 |
| —OCOO(CH$_2$)$_2$OCOCH=CHCH$_3$ | D-47 |
| —OCOO(CH$_2$)$_4$OCH=CH$_2$ | D-48 |
| —OCOO(CH$_2$)$_4$—CH(—O—)CH$_2$ (epoxide) | D-49 |

R group structure: 1,3,5-trisubstituted benzene with three R groups; each R = 5-methyl-1,2,4-oxadiazol-3-yl connected to a 2-fluoro-4-X-phenyl group.

| X = | |
|---|---|
| —OC$_4$H$_9$ | D-50 |
| —OC$_5$H$_{11}$ | D-51 |
| —OC$_6$H$_{13}$ | D-52 |
| —OC$_7$H$_{15}$ | D-53 |
| —OC$_8$H$_{17}$ | D-54 |
| —OCH$_2$CH(CH$_3$)C$_4$H$_9$ | D-55 |
| —O(CH$_2$)$_2$OCOCH=CH$_2$ | D-56 |
| —O(CH$_2$)$_3$OCOCH=CH$_2$ | D-57 |
| —O(CH$_2$)$_4$OCOCH=CH$_2$ | D-58 |
| —O(CH$_2$)$_5$OCOCH=CH$_2$ | D-59 |
| —O(CH$_2$)$_6$OCOCH=CH$_2$ | D-60 |
| —O(CH$_2$)$_7$OCOCH=CH$_2$ | D-61 |
| —O(CH$_2$)$_8$OCOCH=CH$_2$ | D-62 |
| —O(CH$_2$)$_2$C(CH$_3$)OCOCH=CH$_2$ | D-63 |
| —O(CH$_2$)$_3$C(CH$_3$)OCOCH=CH$_2$ | D-64 |
| —O(CH$_2$CH$_2$O)$_2$COCH=CH$_2$ | D-65 |
| —O(CH$_2$)$_4$OCOC(CH$_3$)=CH$_2$ | D-66 |
| —O(CH$_2$)$_4$OCOCH=CHCH$_3$ | D-67 |
| —O(CH$_2$)$_4$OCH=CH$_2$ | D-68 |
| —O(CH$_2$)$_4$—CH(—O—)CH$_2$ (epoxide) | D-69 |

R group structure: 1,3,5-trisubstituted benzene with three R groups; each R = 5-methyl-1,2,4-oxadiazol-3-yl connected to a 2-fluoro-4-X-phenyl group.

| X = | |
|---|---|
| —OCOC$_4$H$_9$ | D-70 |
| —OCOC$_5$H$_{11}$ | D-71 |
| —OCOC$_6$H$_{13}$ | D-72 |
| —OCO(CH$_2$)$_2$OCOCH=CH$_2$ | D-73 |
| —OCO(CH$_2$)$_3$OCOCH=CH$_2$ | D-74 |
| —OCO(CH$_2$)$_4$OCOCH=CH$_2$ | D-75 |
| —OCO(CH$_2$)$_5$OCOCH=CH$_2$ | D-76 |
| —OCO(CH$_2$)$_6$OCOCH=CH$_2$ | D-77 |
| —OCO(CH$_2$)$_7$OCOCH=CH$_2$ | D-78 |
| —OCO(CH$_2$)$_2$C(CH$_3$)OCOCH=CH$_2$ | D-79 |
| —OCO(CH$_2$)$_2$OCOC(CH$_3$)=CH$_2$ | D-80 |
| —OCO(CH$_2$)$_2$OCOCH=CHCH$_3$ | D-81 |
| —OCO(CH$_2$)$_4$OCH=CH$_2$ | D-82 |
| —OCO(CH$_2$)$_4$—CH(—O—)CH$_2$ (epoxide) | D-83 |

R group structure: 1,3,5-trisubstituted benzene with three R groups; each R = 5-methyl-1,2,4-oxadiazol-3-yl connected to a 2-fluoro-4-X-phenyl group.

| X = | |
|---|---|
| —OCOOC$_4$H$_9$ | D-84 |
| —OCOOC$_5$H$_{11}$ | D-85 |
| —OCOOC$_6$H$_{13}$ | D-86 |
| —OCOO(CH$_2$)$_2$OCOCH=CH$_2$ | D-87 |
| —OCOO(CH$_2$)$_3$OCOCH=CH$_2$ | D-88 |
| —OCOO(CH$_2$)$_4$OCOCH=CH$_2$ | D-89 |

-continued

| | |
|---|---|
| —OCOO(CH₂)₅OCOCH=CH₂ | D-90 |
| —OCOO(CH₂)₆OCOCH=CH₂ | D-91 |
| —OCOO(CH₂)₇OCOCH=CH₂ | D-92 |
| —OCOOC(CH₃)CH₂CH₂OCOCH=CH₂ | D-93 |
| —OCOOC(CH₂CH₂O)₂COCH=CH₂ | D-94 |
| —OCOO(CH₂)₂OCOC(CH₃)=CH₂ | D-95 |
| —OCOO(CH₂)₂OCOCH=CHCH₃ | D-96 |
| —OCOO(CH₂)₄OCH=CH₂ | D-97 |
| —OCOO(CH₂)₄—CH(O)CH₂ (epoxide) | D-98 |

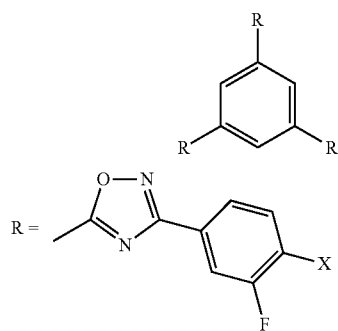

| X = | | |
|---|---|---|
| —OC₄H₉ | D-99 | |
| —OC₅H₁₁ | D-100 | |
| —OC₆H₁₃ | D-101 | |
| —OC₇H₁₅ | D-102 | |
| —OC₈H₁₇ | D-103 | |
| —OCH₂CH(CH₃)C₄H₉ | D-104 | |
| —O(CH₂)₂OCOCH=CH₂ | D-105 | |
| —O(CH₂)₃OCOCH=CH₂ | D-106 | |
| —O(CH₂)₄OCOCH=CH₂ | D-107 | |
| —O(CH₂)₅OCOCH=CH₂ | D-108 | |
| —O(CH₂)₆OCOCH=CH₂ | D-109 | |
| —O(CH₂)₇OCOCH=CH₂ | D-110 | |
| —O(CH₂)₈OCOCH=CH₂ | D-111 | |
| —O(CH₂)₂C(CH₃)OCOCH=CH₂ | D-112 | |
| —O(CH₂)₃C(CH₃)OCOCH=CH₂ | D-113 | |
| —O(CH₂CH₂O)₂COCH=CH₂ | D-114 | |
| —O(CH₂)₄OCOC(CH₃)=CH₂ | D-115 | |
| —O(CH₂)₄OCOCH=CHCH₃ | D-116 | |
| —O(CH₂)₄OCH=CH₂ | D-117 | |
| —O(CH₂)₄—CH(O)CH₂ (epoxide) | D-118 | |

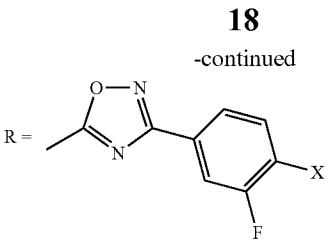

| X = | | |
|---|---|---|
| —OCOC₄H₉ | D-119 | |
| —OCOC₅H₁₁ | D-120 | |
| —OCOC₆H₁₃ | D-121 | |
| —OCO(CH₂)₂OCOCH=CH₂ | D-122 | |
| —OCO(CH₂)₃OCOCH=CH₂ | D-123 | |
| —OCO(CH₂)₄OCOCH=CH₂ | D-124 | |
| —OCO(CH₂)₅OCOCH=CH₂ | D-125 | |
| —OCO(CH₂)₆OCOCH=CH₂ | D-126 | |
| —OCO(CH₂)₇OCOCH=CH₂ | D-127 | |
| —OCO(CH₂)₂C(CH₃)OCOCH=CH₂ | D-128 | |
| —OCO(CH₂)₂OCOC(CH₃)=CH₂ | D-129 | |
| —OCO(CH₂)₂OCOCH=CHCH₃ | D-130 | |
| —OCO(CH₂)₄OCH=CH₂ | D-131 | |
| —OCO(CH₂)₄—CH(O)CH₂ (epoxide) | D-132 | |

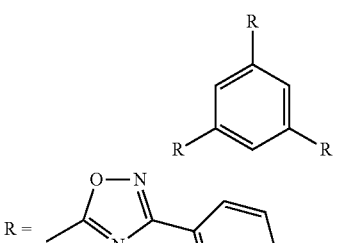

| X = | | |
|---|---|---|
| —OCOOC₄H₉ | D-133 | |
| —OCOOC₅H₁₁ | D-134 | |
| —OCOOC₆H₁₃ | D-135 | |
| —OCOO(CH₂)₂OCOCH=CH₂ | D-136 | |
| —OCOO(CH₂)₃OCOCH=CH₂ | D-137 | |
| —OCOO(CH₂)₄OCOCH=CH₂ | D-138 | |
| —OCOO(CH₂)₅OCOCH=CH₂ | D-139 | |
| —OCOO(CH₂)₆OCOCH=CH₂ | D-140 | |
| —OCOO(CH₂)₇OCOCH=CH₂ | D-141 | |
| —OCOOC(CH₃)CH₂CH₂OCOCH=CH₂ | D-142 | |
| —OCOOC(CH₂CH₂O)₂COCH=CH₂ | D-143 | |
| —OCOO(CH₂)₂OCOC(CH₃)=CH₂ | D-144 | |
| —OCOO(CH₂)₂OCOCH=CHCH₃ | D-145 | |
| —OCOO(CH₂)₄OCH=CH₂ | D-146 | |
| —OCOO(CH₂)₄—CH(O)CH₂ (epoxide) | D-147 | |

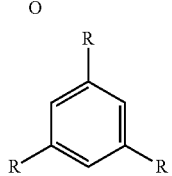

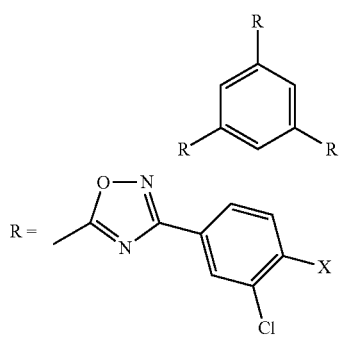

| X = | —OC₆H₁₃ | D-148 |
| --- | --- | --- |
| | —OCOC₅H₁₁ | D-149 |
| | —OCOOC₄H₉ | D-150 |
| | —O(CH₂)₄OCOCH=CH₂ | D-151 |
| | —O(CH₂)₆OCOCH=CH₂ | D-152 |
| | —OCO(CH₂)₃OCOCH=CH₂ | D-153 |
| | —OCO(CH₂)₄OCOCH=CH₂ | D-154 |
| | —OCOO(CH₂)₂OCOCH=CH₂ | D-155 |
| | —OCOO(CH₂)₄OCOCH=CH₂ | D-156 |

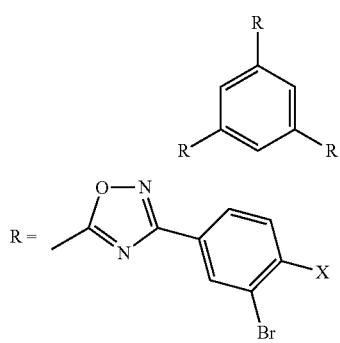

| X = | —OC₆H₁₃ | D-157 |
| --- | --- | --- |
| | —OCOC₅H₁₁ | D-158 |
| | —OCOOC₄H₉ | D-159 |
| | —O(CH₂)₄OCOCH=CH₂ | D-160 |
| | —O(CH₂)₆OCOCH=CH₂ | D-161 |
| | —OCO(CH₂)₃OCOCH=CH₂ | D-162 |
| | —OCO(CH₂)₄OCOCH=CH₂ | D-163 |
| | —OCOO(CH₂)₂OCOCH=CH₂ | D-164 |
| | —OCOO(CH₂)₄OCOCH=CH₂ | D-165 |

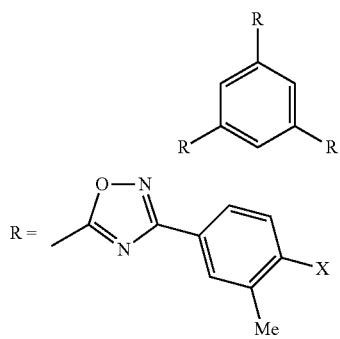

| X = | —OC₆H₁₃ | D-166 |
| --- | --- | --- |
| | —OCOC₅H₁₁ | D-167 |

| | —OCOOC₄H₉ | D-168 |
| --- | --- | --- |
| | —O(CH₂)₄OCOCH=CH₂ | D-169 |
| | —O(CH₂)₆OCOCH=CH₂ | D-170 |
| | —OCO(CH₂)₃OCOCH=CH₂ | D-171 |
| | —OCO(CH₂)₄OCOCH=CH₂ | D-172 |
| | —OCOO(CH₂)₂OCOCH=CH₂ | D-173 |
| | —OCOO(CH₂)₄OCOCH=CH₂ | D-174 |

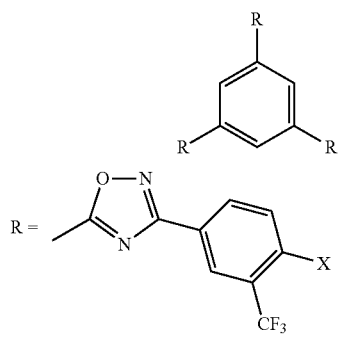

| X = | —OC₆H₁₃ | D-175 |
| --- | --- | --- |
| | —OCOC₅H₁₁ | D-176 |
| | —OCOOC₄H₉ | D-178 |
| | —O(CH₂)₄OCOCH=CH₂ | D-179 |
| | —O(CH₂)₆OCOCH=CH₂ | D-180 |
| | —OCO(CH₂)₃OCOCH=CH₂ | D-181 |
| | —OCO(CH₂)₄OCOCH=CH₂ | D-182 |
| | —OCOO(CH₂)₂OCOCH=CH₂ | D-183 |
| | —OCOO(CH₂)₄OCOCH=CH₂ | D-184 |

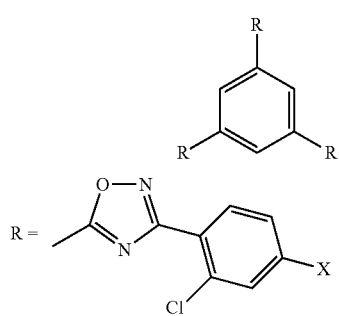

| X = | —OC₆H₁₃ | D-185 |
| --- | --- | --- |
| | —OCOC₅H₁₁ | D-186 |
| | —OCOOC₄H₉ | D-187 |
| | —O(CH₂)₄OCOCH=CH₂ | D-188 |
| | —O(CH₂)₆OCOCH=CH₂ | D-189 |
| | —OCO(CH₂)₃OCOCH=CH₂ | D-190 |
| | —OCO(CH₂)₄OCOCH=CH₂ | D-191 |
| | —OCOO(CH₂)₂OCOCH=CH₂ | D-192 |
| | —OCOO(CH₂)₄OCOCH=CH₂ | D-193 |

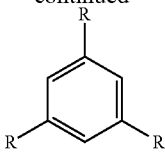

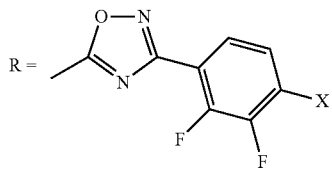

| X = | —OC₆H₁₃ | D-194 |
| --- | --- | --- |
| | —OCOC₅H₁₁ | D-195 |
| | —OCOOC₄H₉ | D-196 |
| | —O(CH₂)₄OCOCH=CH₂ | D-197 |
| | —O(CH₂)₆OCOCH=CH₂ | D-198 |
| | —OCO(CH₂)₃OCOCH=CH₂ | D-199 |
| | —OCO(CH₂)₄OCOCH=CH₂ | D-200 |
| | —OCOO(CH₂)₂OCOCH=CH₂ | D-201 |
| | —OCOO(CH₂)₄OCOCH=CH₂ | D-202 |

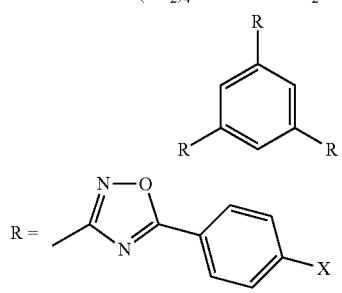

| X = | —OC₆H₁₃ | D-203 |
| --- | --- | --- |
| | —OCOC₅H₁₁ | D-204 |
| | —OCOOC₄H₉ | D-205 |
| | —O(CH₂)₄OCOCH=CH₂ | D-206 |
| | —O(CH₂)₆OCOCH=CH₂ | D-207 |
| | —OCO(CH₂)₃OCOCH=CH₂ | D-208 |
| | —OCO(CH₂)₄OCOCH=CH₂ | D-209 |
| | —OCOO(CH₂)₂OCOCH=CH₂ | D-210 |
| | —OCOO(CH₂)₄OCOCH=CH₂ | D-211 |

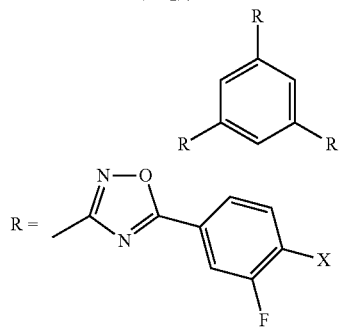

| X = | —OC₆H₁₃ | D-212 |
| --- | --- | --- |
| | —OCOC₅H₁₁ | D-213 |
| | —OCOOC₄H₉ | D-214 |
| | —O(CH₂)₄OCOCH=CH₂ | D-215 |
| | —O(CH₂)₆OCOCH=CH₂ | D-216 |

| —OCO(CH₂)₃OCOCH=CH₂ | D-217 |
| --- | --- |
| —OCO(CH₂)₄OCOCH=CH₂ | D-218 |
| —OCOO(CH₂)₂OCOCH=CH₂ | D-219 |
| —OCOO(CH₂)₄OCOCH=CH₂ | D-220 |

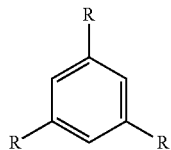

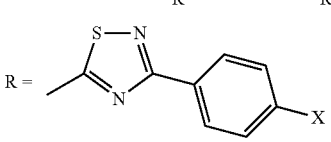

| X = | —OC₆H₁₃ | D-221 |
| --- | --- | --- |
| | —OCOC₅H₁₁ | D-222 |
| | —OCOOC₄H₉ | D-223 |
| | —O(CH₂)₆OCOCH=CH₂ | D-224 |
| | —OCO(CH₂)₃OCOCH=CH₂ | D-225 |
| | —OCOO(CH₂)₄OCOCH=CH₂ | D-226 |

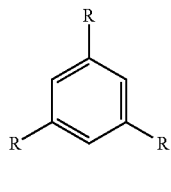

| X = | —OC₆H₁₃ | D-227 |
| --- | --- | --- |
| | —OCOC₅H₁₁ | D-228 |
| | —OCOOC₄H₉ | D-229 |
| | —O(CH₂)₆OCOCH=CH₂ | D-230 |
| | —OCO(CH₂)₃OCOCH=CH₂ | D-231 |
| | —OCOO(CH₂)₄OCOCH=CH₂ | D-232 |

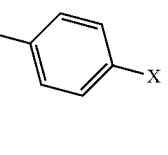

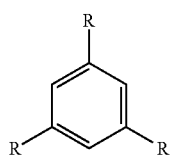

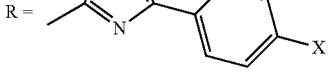

| X = | —OC₆H₁₃ | D-233 |
| --- | --- | --- |
| | —OCOC₅H₁₁ | D-234 |
| | —OCOOC₄H₉ | D-235 |
| | —O(CH₂)₆OCOCH=CH₂ | D-236 |
| | —OCO(CH₂)₃OCOCH=CH₂ | D-237 |
| | —OCOO(CH₂)₄OCOCH=CH₂ | D-238 |

-continued
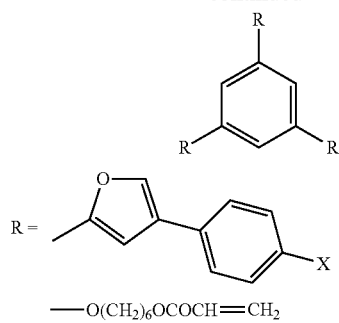
—O(CH₂)₆OCOCH=CH₂  D-239
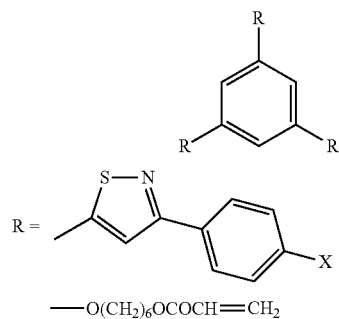
—O(CH₂)₆OCOCH=CH₂  D-240
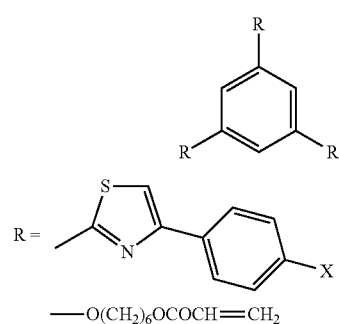
—O(CH₂)₆OCOCH=CH₂  D-241
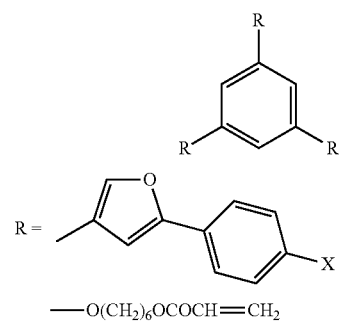
—O(CH₂)₆OCOCH=CH₂  D-242
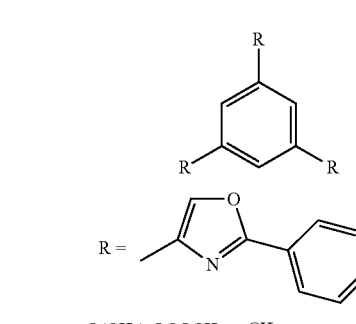
—O(CH₂)₆OCOCH=CH₂  D-243
-continued
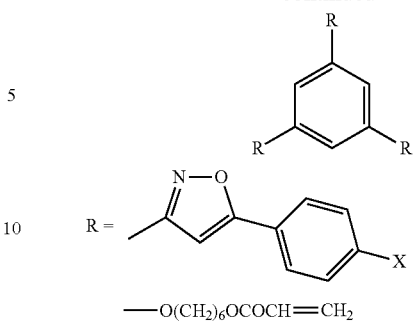
—O(CH₂)₆OCOCH=CH₂  D-244
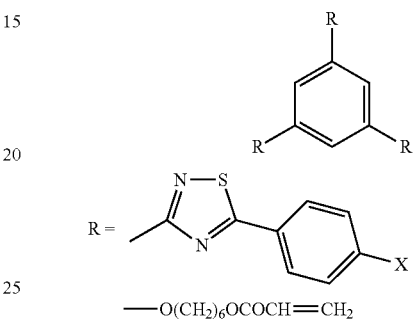
—O(CH₂)₆OCOCH=CH₂  D-245
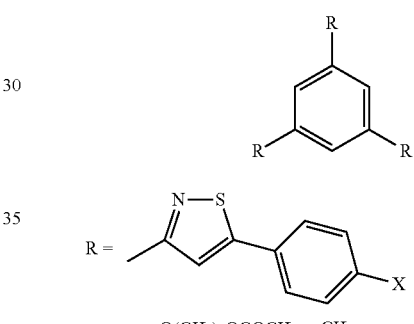
—O(CH₂)₆OCOCH=CH₂  D-246
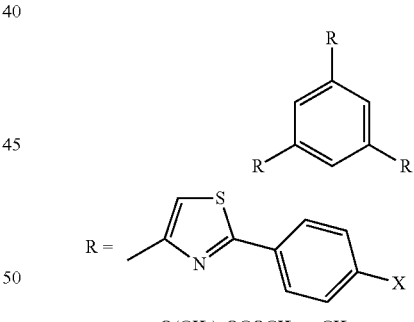
—O(CH₂)₆OCOCH=CH₂  D-247
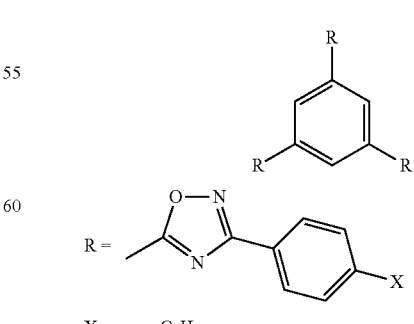
X = —C₈H₁₇  D-248

| Structure | ID |
|---|---|
| 4-methylphenyl-OC₈H₁₇ | D-249 |
| trans-cyclohexyl-C₅H₁₁ | D-250 |
| —COO—C₆H₄—OC₈H₁₇ | D-251 |
| —OCO—C₆H₄—OC₈H₁₇ | D-252 |
| —CH=CH—C₆H₄—OC₈H₁₇ | D-253 |
| —C≡C—C₆H₄—OC₈H₁₇ | D-254 |
| —OCO—CH=CH—C₆H₄—OC₈H₁₇ | D-255 |
| —(CH₂)₂OCOCH=CH₂ | D-256 |
| —COO(CH₂)₄OCOCH=CH₂ | D-257 |
| —C₆H₄—O(CH₂)₄OCOCH=CH₂ | D-258 |
| —COO—C₆H₄—O(CH₂)₄OCOCH=CH₂ | D-259 |
| —OCO—C₆H₄—O(CH₂)₄OCOCH=CH₂ | D-260 |
| —CH=CH—C₆H₄—O(CH₂)₄OCOCH=CH₂ | D-261 |
| —C≡C—C₆H₄—O(CH₂)₄OCOCH=CH₂ | D-262 |
| —OCO—CH=CH—C₆H₄—O(CH₂)₄OCOCH=CH₂ | D-263 |

D-264: tetramethylbenzene core with three R substituents; R = 5-methyl-1,2,4-oxadiazol-3-yl-phenyl-X; X = —O(CH₂)₂OCOCH=CH₂

D-265: 3,5-disubstituted benzene with three R; R = 5-methyl-1,2,4-oxadiazol-3-yl-phenyl bearing CH=CH₂ and X; X = —O(CH₂)₃OCOCH=CH₂

D-266: 3,5-disubstituted benzene with three R; R = 5-methyl-1,2,4-oxadiazol-3-yl-phenyl bearing OMe and X; X = —O(CH₂)₄OCOCH=CH₂

D-267: 3,5-disubstituted benzene with three R; R = 5-methyl-1,2,4-oxadiazol-3-yl-phenyl bearing CN and X; X = —O(CH₂)₄OCOCH=CH₂

D-268: 3,5-disubstituted benzene with three R; R = 5-methyl-1,2,4-oxadiazol-3-yl-phenyl bearing OCOMe and X; X = —O(CH₂)₃OCOCH=CH₂

D-269: 3,5-disubstituted benzene with three R; R = 5-methyl-1,2,4-oxadiazol-3-yl-phenyl bearing COOMe and X; X = —O(CH₂)₄OCOCH=CH₂

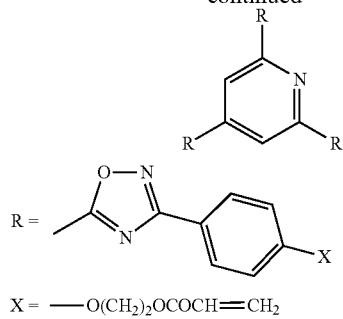
X = —O(CH₂)₂OCOCH=CH₂  D-270
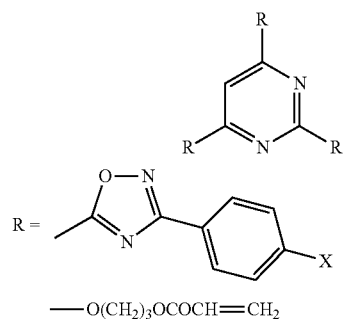
—O(CH₂)₃OCOCH=CH₂  D-271
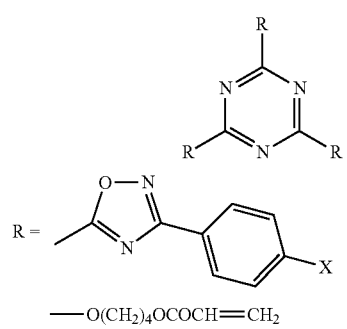
—O(CH₂)₄OCOCH=CH₂  D-272
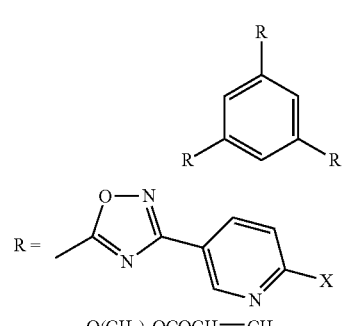
—O(CH₂)₂OCOCH=CH₂  D-273
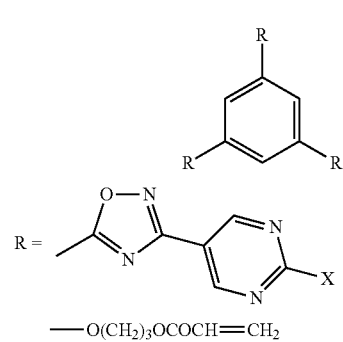
—O(CH₂)₃OCOCH=CH₂  D-274
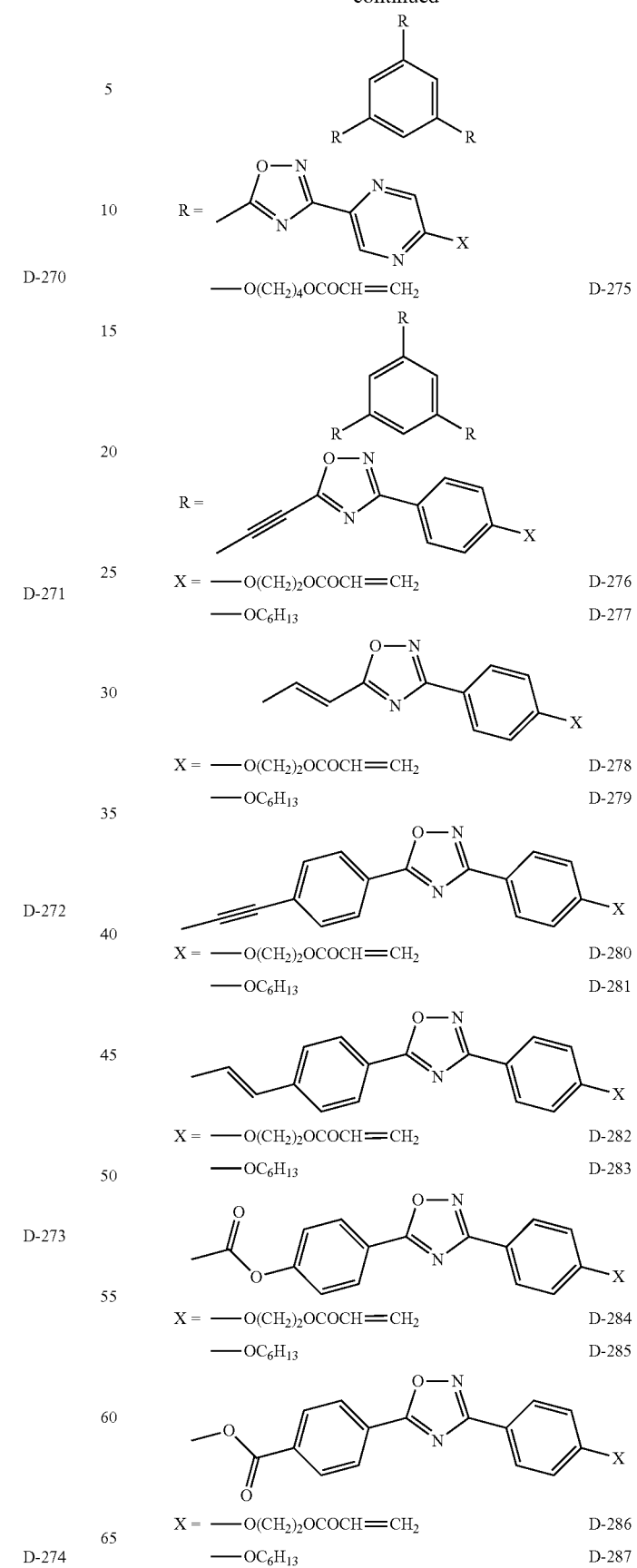

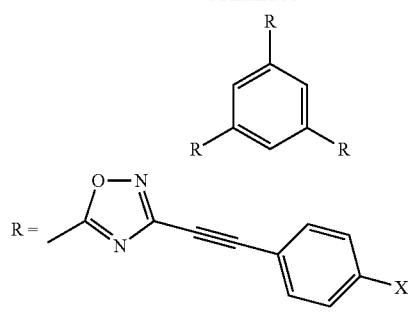
| X = | —O(CH$_2$)$_2$OCOCH=CH$_2$ | D-287-2 |
| | —OC$_6$H$_{13}$ | D-288 |
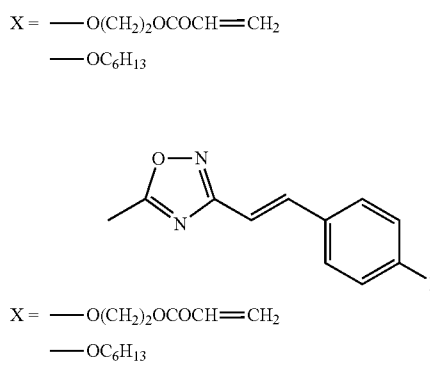
| X = | —O(CH$_2$)$_2$OCOCH=CH$_2$ | D-289 |
| | —OC$_6$H$_{13}$ | D-290 |
| X = | —O(CH$_2$)$_2$OCOCH=CH$_2$ | D-291 |
| | —OC$_6$H$_{13}$ | D-292 |
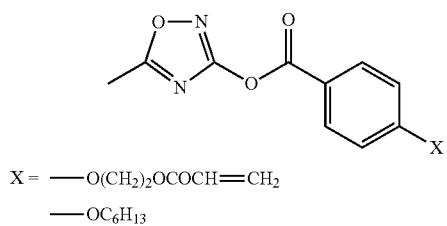
| X = | —O(CH$_2$)$_2$OCOCH=CH$_2$ | D-293 |
| | —OC$_6$H$_{13}$ | D-294 |
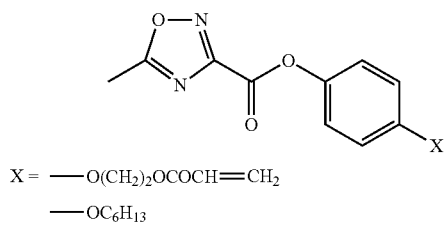
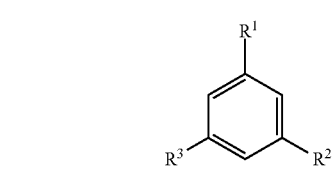
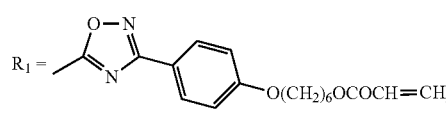
D-295
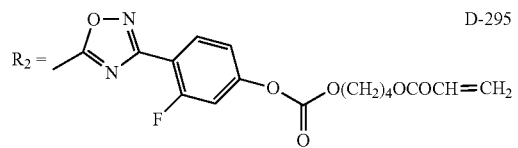
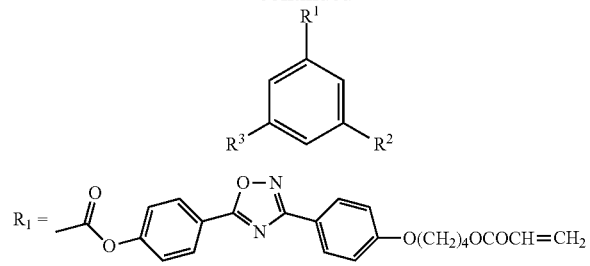
D-296
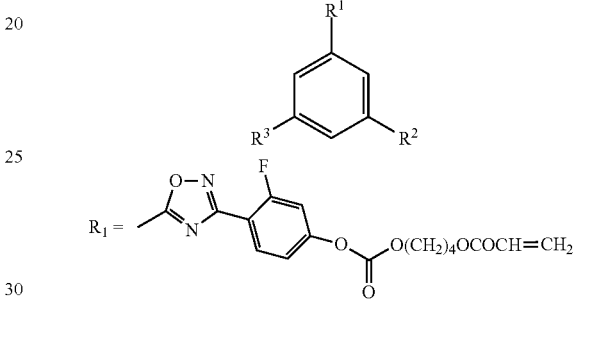
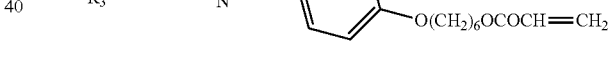
D-297
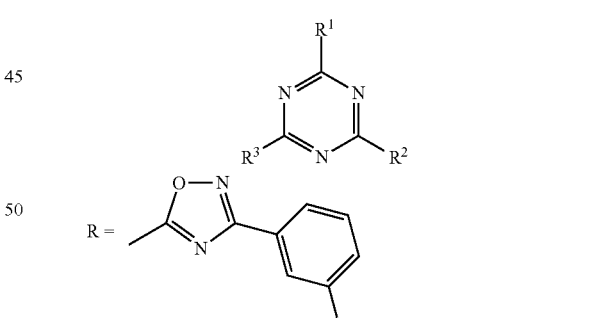
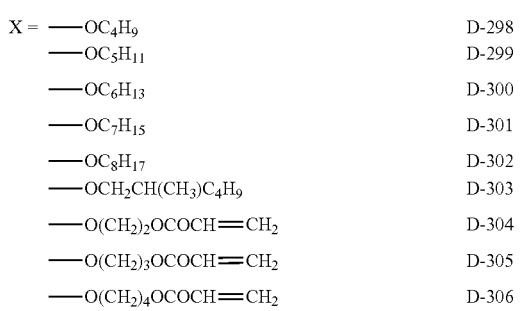
| X = | —OC$_4$H$_9$ | D-298 |
| | —OC$_5$H$_{11}$ | D-299 |
| | —OC$_6$H$_{13}$ | D-300 |
| | —OC$_7$H$_{15}$ | D-301 |
| | —OC$_8$H$_{17}$ | D-302 |
| | —OCH$_2$CH(CH$_3$)C$_4$H$_9$ | D-303 |
| | —O(CH$_2$)$_2$OCOCH=CH$_2$ | D-304 |
| | —O(CH$_2$)$_3$OCOCH=CH$_2$ | D-305 |
| | —O(CH$_2$)$_4$OCOCH=CH$_2$ | D-306 |

| | |
|---|---|
| —O(CH₂)₅OCOCH=CH₂ | D-307 |
| —O(CH₂)₆OCOCH=CH₂ | D-308 |
| —O(CH₂)₇OCOCH=CH₂ | D-309 |
| —O(CH₂)₈OCOCH=CH₂ | D-310 |
| —O(CH₂)₂C(CH₃)OCOCH=CH₂ | D-311 |
| —O(CH₂)₃C(CH₃)OCOCH=CH₂ | D-312 |
| —O(CH₂CH₂O)₂COCH=CH₂ | D-313 |
| —O(CH₂)₄OCOC(CH₃)=CH₂ | D-314 |
| —O(CH₂)₄OCOCH=CHCH₃ | D-315 |
| —O(CH₂)₄OCH=CH₂ | D-316 |
| —O(CH₂)₄—CH(O)CH₂ (epoxide) | D-317 |

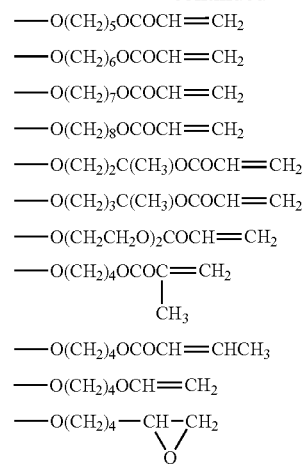

| | |
|---|---|
| X = —OCOC₄H₉ | D-318 |
| —OCOC₅H₁₁ | D-319 |
| —OCOC₆H₁₃ | D-320 |
| —OCO(CH₂)₂OCOCH=CH₂ | D-321 |
| —OCO(CH₂)₃OCOCH=CH₂ | D-322 |
| —OCO(CH₂)₄OCOCH=CH₂ | D-323 |
| —OCO(CH₂)₅OCOCH=CH₂ | D-324 |
| —OCO(CH₂)₆OCOCH=CH₂ | D-325 |
| —OCO(CH₂)₇OCOCH=CH₂ | D-326 |
| —OCO(CH₂)₂CH(CH₃)OCOCH=CH₂ | D-327 |
| —OCO(CH₂)₂OCOC(CH₃)=CH₂ | D-328 |
| —OCO(CH₂)₂OCOCH=CHCH₃ | D-329 |
| —OCO(CH₂)₄OCH=CH₂ | D-330 |
| —OCO(CH₂)₄—CH(O)CH₂ (epoxide) | D-331 |

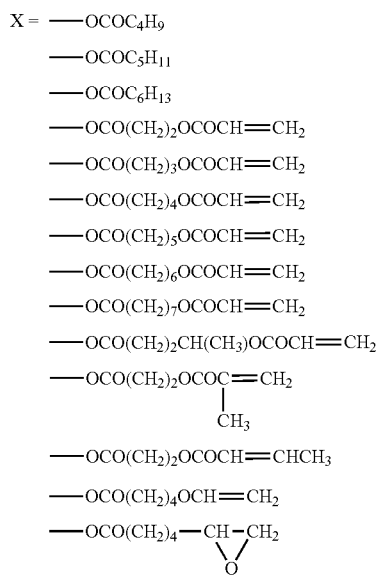

| | |
|---|---|
| X = —OCOOC₄H₉ | D-332 |
| —OCOOC₅H₁₁ | D-333 |
| —OCOOC₆H₁₃ | D-334 |
| —OCOO(CH₂)₂OCOCH=CH₂ | D-335 |
| —OCOO(CH₂)₃OCOCH=CH₂ | D-336 |
| —OCOO(CH₂)₄OCOCH=CH₂ | D-337 |
| —OCOO(CH₂)₅OCOCH=CH₂ | D-338 |
| —OCOO(CH₂)₆OCOCH=CH₂ | D-339 |
| —OCOO(CH₂)₇OCOCH=CH₂ | D-340 |
| —OCOOC(CH₃)CH₂CH₂OCOCH=CH₂ | D-341 |
| —OCOOC(CH₂CH₂O)₂COCH=CH₂ | D-342 |
| —OCOO(CH₂)₂OCOC(CH₃)=CH₂ | D-343 |
| —OCOO(CH₂)₂OCOCH=CHCH₃ | D-344 |
| —OCOO(CH₂)₄OCH=CH₂ | D-345 |
| —OCOO(CH₂)₄—CH(O)CH₂ (epoxide) | D-346 |

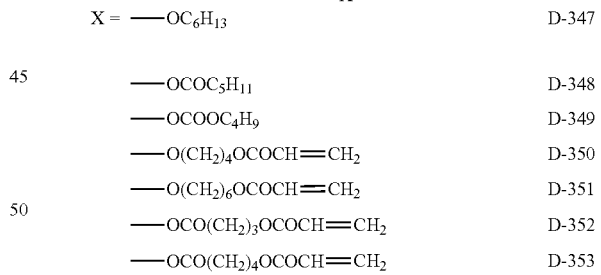

| | |
|---|---|
| X = —OC₆H₁₃ | D-347 |
| —OCOC₅H₁₁ | D-348 |
| —OCOOC₄H₉ | D-349 |
| —O(CH₂)₄OCOCH=CH₂ | D-350 |
| —O(CH₂)₆OCOCH=CH₂ | D-351 |
| —OCO(CH₂)₃OCOCH=CH₂ | D-352 |
| —OCO(CH₂)₄OCOCH=CH₂ | D-353 |
| —OCOO(CH₂)₂OCOCH=CH₂ | D-354 |
| —OCOO(CH₂)₄OCOCH=CH₂ | D-355 |
| —O(CH₂)₂OCOC(CH₃)=CH₂ | D-356 |
| —O(CH₂)₂OCOCH=CHCH₃ | D-357 |
| —O(CH₂)₄OCH=CH₂ | D-358 |
| —O(CH₂)₄—CH(O)CH₂ (epoxide) | D-359 |

33

-continued

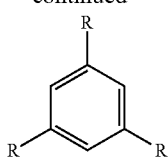

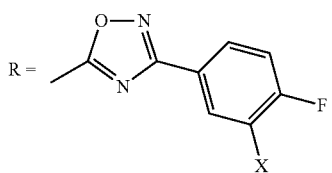

| X = | —OC$_6$H$_{13}$ | D-360 |
| | —OCOC$_5$H$_{11}$ | D-361 |
| | —OCOOC$_4$H$_9$ | D-362 |
| | —O(CH$_2$)$_4$OCOCH=CH$_2$ | D-363 |
| | —O(CH$_2$)$_6$OCOCH=CH$_2$ | D-364 |
| | —OCO(CH$_2$)$_3$OCOCH=CH$_2$ | D-365 |
| | —OCO(CH$_2$)$_4$OCOCH=CH$_2$ | D-366 |
| | —OCOO(CH$_2$)$_2$OCOCH=CH$_2$ | D-367 |
| | —OCOO(CH$_2$)$_4$OCOCH=CH$_2$ | D-368 |
| | —O(CH$_2$)$_2$OCOC(CH$_3$)=CH$_2$ | D-369 |
| | —O(CH$_2$)$_2$OCOCH=CHCH$_3$ | D-370 |
| | —O(CH$_2$)$_4$OCH=CH$_2$ | D-371 |
| | —O(CH$_2$)$_4$—CH—CH$_2$ (epoxide) | D-372 |

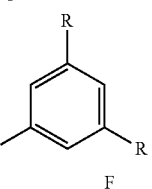

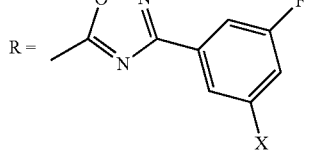

| X = | —OC$_6$H$_{13}$ | D-373 |
| | —OCOC$_5$H$_{11}$ | D-374 |
| | —OCOOC$_4$H$_9$ | D-375 |
| | —O(CH$_2$)$_4$OCOCH=CH$_2$ | D-376 |
| | —O(CH$_2$)$_6$OCOCH=CH$_2$ | D-377 |
| | —OCO(CH$_2$)$_3$OCOCH=CH$_2$ | D-378 |
| | —OCO(CH$_2$)$_4$OCOCH=CH$_2$ | D-379 |
| | —OCOO(CH$_2$)$_2$OCOCH=CH$_2$ | D-380 |
| | —OCOO(CH$_2$)$_4$OCOCH=CH$_2$ | D-381 |
| | —O(CH$_2$)$_2$OCOC(CH$_3$)=CH$_2$ | D-382 |
| | —O(CH$_2$)$_2$OCOCH=CHCH$_3$ | D-383 |
| | —O(CH$_2$)$_4$OCH=CH$_2$ | D-384 |
| | —O(CH$_2$)$_4$—CH—CH$_2$ (epoxide) | D-385 |

34

-continued

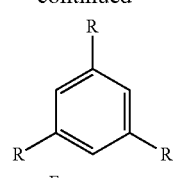

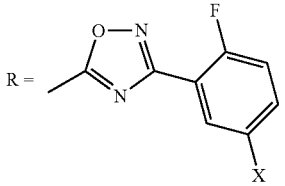

| X = | —OC$_6$H$_{13}$ | D-386 |
| | —OCOC$_5$H$_{11}$ | D-387 |
| | —OCOOC$_4$H$_9$ | D-388 |
| | —O(CH$_2$)$_4$OCOCH=CH$_2$ | D-389 |
| | —O(CH$_2$)$_6$OCOCH=CH$_2$ | D-390 |
| | —OCO(CH$_2$)$_3$OCOCH=CH$_2$ | D-391 |
| | —OCO(CH$_2$)$_4$OCOCH=CH$_2$ | D-392 |
| | —OCOO(CH$_2$)$_2$OCOCH=CH$_2$ | D-393 |
| | —OCOO(CH$_2$)$_4$OCOCH=CH$_2$ | D-394 |
| | —O(CH$_2$)$_2$OCOC(CH$_3$)=CH$_2$ | D-395 |
| | —O(CH$_2$)$_2$OCOCH=CHCH$_3$ | D-396 |
| | —O(CH$_2$)$_4$OCH=CH$_2$ | D-397 |
| | —O(CH$_2$)$_4$—CH—CH$_2$ (epoxide) | D-398 |

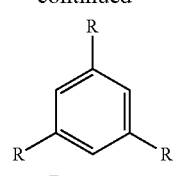

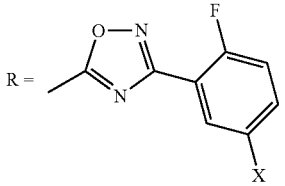

| X = | —OC$_6$H$_{13}$ | D-399 |
| | —OCOC$_5$H$_{11}$ | D-400 |
| | —OCOOC$_4$H$_9$ | D-401 |
| | —O(CH$_2$)$_4$OCOCH=CH$_2$ | D-402 |
| | —O(CH$_2$)$_6$OCOCH=CH$_2$ | D-403 |
| | —OCO(CH$_2$)$_3$OCOCH=CH$_2$ | D-404 |
| | —OCO(CH$_2$)$_4$OCOCH=CH$_2$ | D-405 |
| | —OCOO(CH$_2$)$_2$OCOCH=CH$_2$ | D-406 |
| | —OCOO(CH$_2$)$_4$OCOCH=CH$_2$ | D-407 |
| | —O(CH$_2$)$_2$OCOC(CH$_3$)=CH$_2$ | D-408 |
| | —O(CH$_2$)$_2$OCOCH=CHCH$_3$ | D-409 |

-continued

—O(CH₂)₄OCH=CH₂  D-410

—O(CH₂)₄—CH—CH₂ (epoxide)  D-411

R = 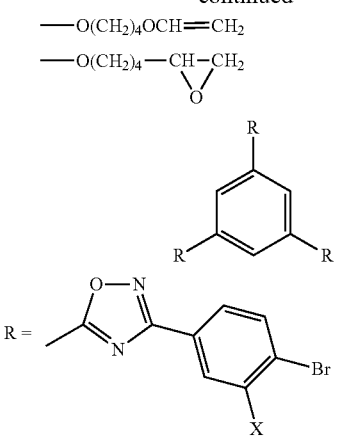

| X = | |
|---|---|
| —OC₆H₁₃ | D-412 |
| —OCOC₅H₁₁ | D-413 |
| —OCOOC₄H₉ | D-414 |
| —O(CH₂)₄OCOCH=CH₂ | D-415 |
| —O(CH₂)₆OCOCH=CH₂ | D-416 |
| —OCO(CH₂)₃OCOCH=CH₂ | D-417 |
| —OCO(CH₂)₄OCOCH=CH₂ | D-418 |
| —OCOO(CH₂)₂OCOCH=CH₂ | D-419 |
| —OCOO(CH₂)₄OCOCH=CH₂ | D-420 |
| —O(CH₂)₂OCOC(CH₃)=CH₂ | D-421 |
| —O(CH₂)₂OCOCH=CHCH₃ | D-422 |
| —O(CH₂)₄OCH=CH₂ | D-423 |
| —O(CH₂)₄—CH—CH₂ (epoxide) | D-424 |

R = 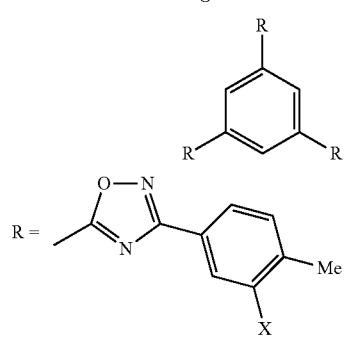

| X = | |
|---|---|
| —OC₆H₁₃ | D-425 |
| —OCOC₅H₁₁ | D-426 |
| —OCOOC₄H₉ | D-427 |
| —O(CH₂)₄OCOCH=CH₂ | D-428 |
| —O(CH₂)₆OCOCH=CH₂ | D-429 |
| —OCO(CH₂)₃OCOCH=CH₂ | D-430 |
| —OCO(CH₂)₄OCOCH=CH₂ | D-431 |
| —OCOO(CH₂)₂OCOCH=CH₂ | D-432 |
| —OCOO(CH₂)₄OCOCH=CH₂ | D-433 |
| —O(CH₂)₂OCOC(CH₃)=CH₂ | D-434 |
| —O(CH₂)₂OCOCH=CHCH₃ | D-435 |

-continued

—O(CH₂)₄OCH=CH₂  D-436

—O(CH₂)₄—CH—CH₂ (epoxide)  D-437

R = 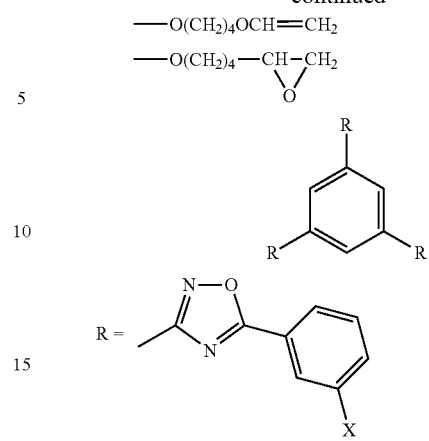

| X = | |
|---|---|
| —OC₆H₁₃ | D-438 |
| —OCOC₅H₁₁ | D-439 |
| —OCOOC₄H₉ | D-440 |
| —O(CH₂)₄OCOCH=CH₂ | D-441 |
| —O(CH₂)₆OCOCH=CH₂ | D-442 |
| —OCO(CH₂)₃OCOCH=CH₂ | D-443 |
| —OCO(CH₂)₄OCOCH=CH₂ | D-444 |
| —OCOO(CH₂)₂OCOCH=CH₂ | D-445 |
| —OCOO(CH₂)₄OCOCH=CH₂ | D-446 |
| —O(CH₂)₂OCOC(CH₃)=CH₂ | D-447 |
| —O(CH₂)₂OCOCH=CHCH₃ | D-448 |
| —O(CH₂)₄OCH=CH₂ | D-449 |
| —O(CH₂)₄—CH—CH₂ (epoxide) | D-450 |

R = 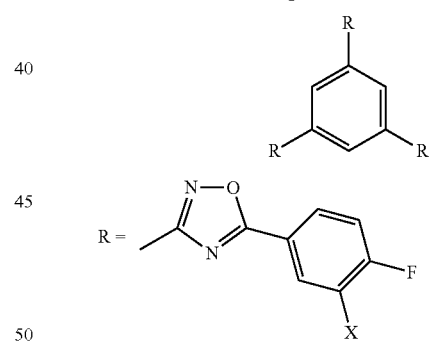

| X = | |
|---|---|
| —OC₆H₁₃ | D-451 |
| —OCOC₅H₁₁ | D-452 |
| —OCOOC₄H₉ | D-453 |
| —O(CH₂)₄OCOCH=CH₂ | D-454 |
| —O(CH₂)₆OCOCH=CH₂ | D-455 |
| —OCO(CH₂)₃OCOCH=CH₂ | D-456 |
| —OCO(CH₂)₄OCOCH=CH₂ | D-457 |
| —OCOO(CH₂)₂OCOCH=CH₂ | D-458 |
| —OCOO(CH₂)₄OCOCH=CH₂ | D-459 |
| —O(CH₂)₂OCOC(CH₃)=CH₂ | D-460 |
| —O(CH₂)₂OCOCH=CHCH₃ | D-461 |

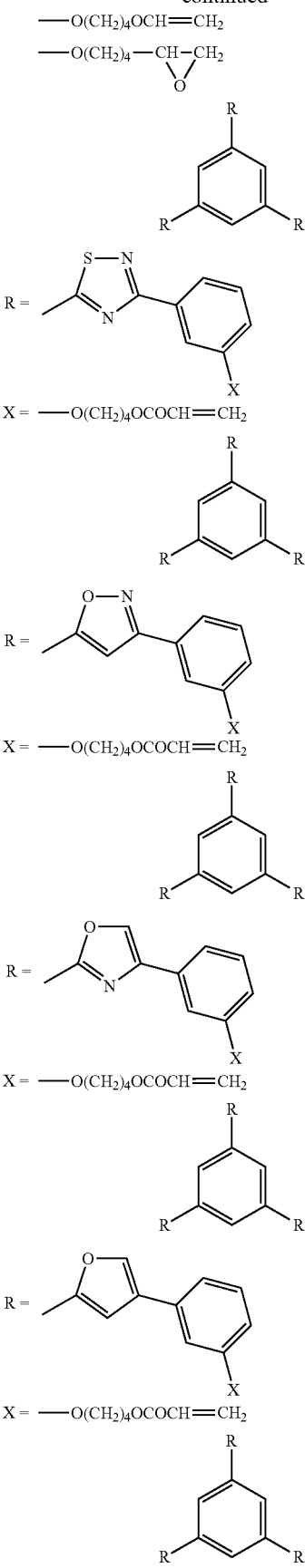
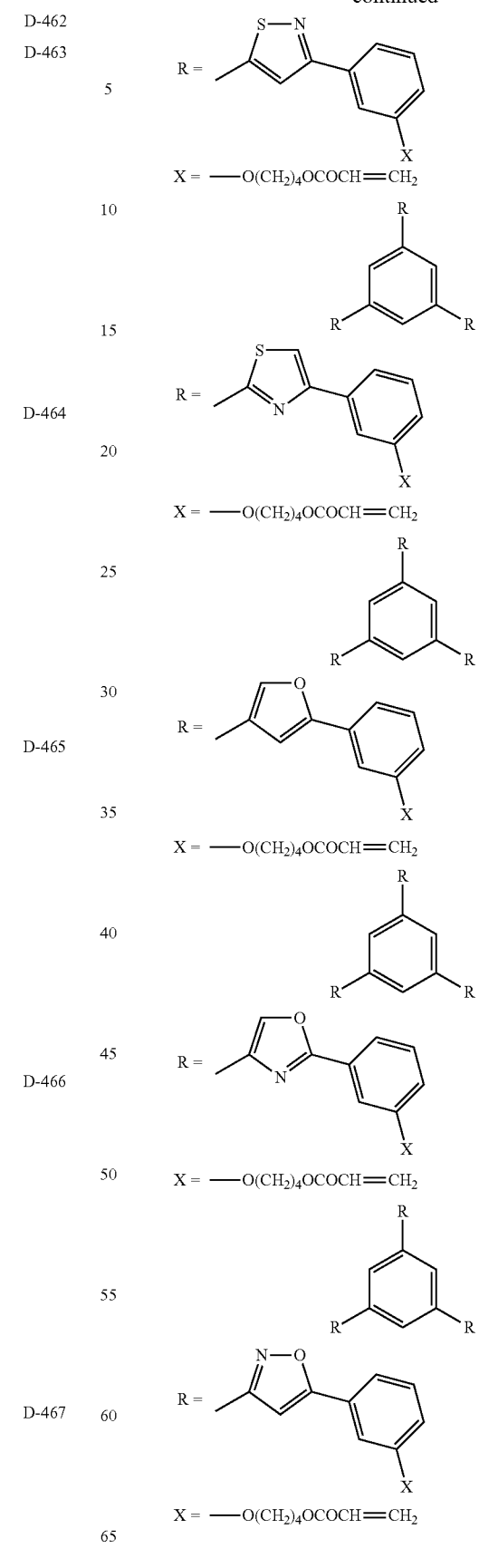

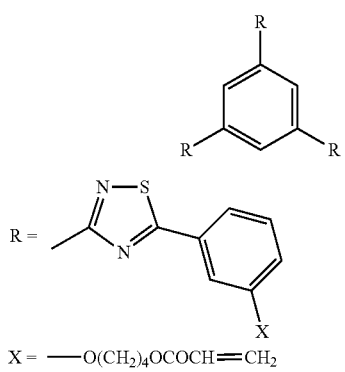 D-473
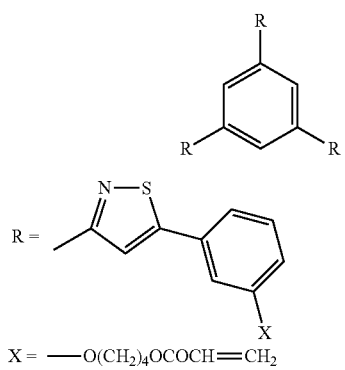 D-474
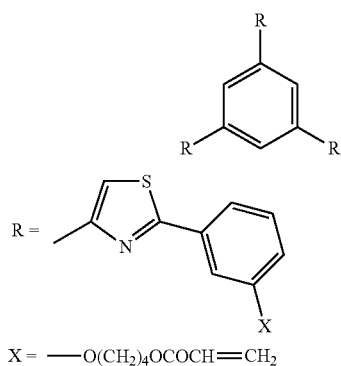 D-475
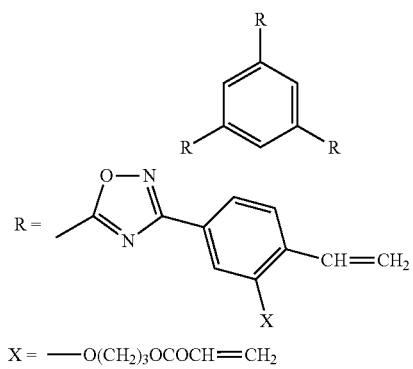 D-476
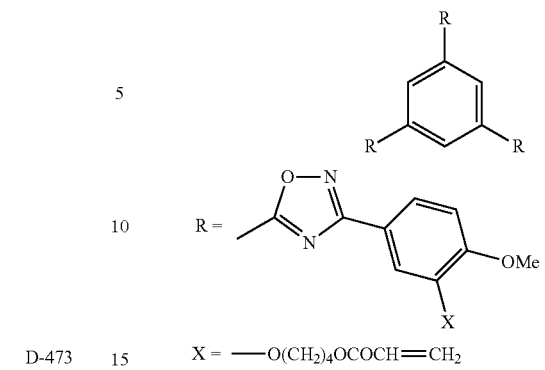 D-477
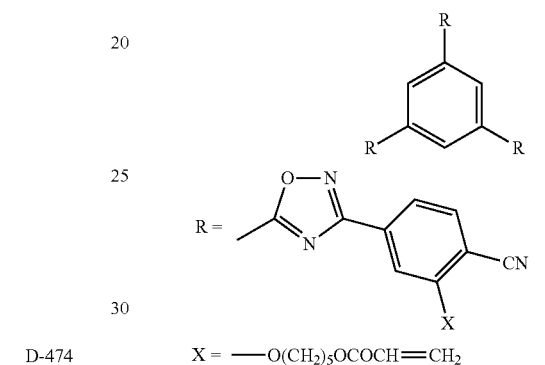 D-478
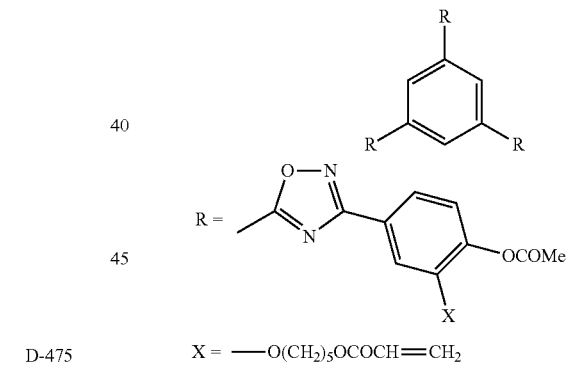 D-479
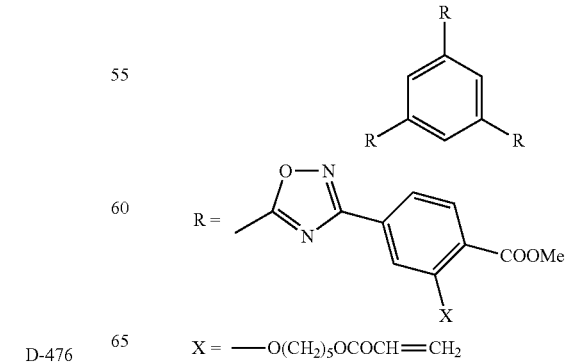 D-480

-continued

R = [2,6-R-pyridin-4-yl with R at 4-position]

R = methyl-1,2,4-oxadiazol-3-yl-phenyl-X (3-substituted)

| X = | |
|---|---|
| —O(CH₂)₄OCOCH=CH₂ | D-481 |

R = [2,4,6-R-pyrimidine]

R = methyl-1,2,4-oxadiazol-3-yl-phenyl-X

| X = | |
|---|---|
| —O(CH₂)₃OCOCH=CH₂ | D-482 |

R = [2,4,6-R-1,3,5-triazine]

R = methyl-1,2,4-oxadiazol-3-yl-phenyl-X

| X = | |
|---|---|
| —O(CH₂)₄OCOCH=CH₂ | D-483 |

R = [1,3,5-R-benzene]

R = methyl-1,2,4-oxadiazol-3-yl-pyridin-4-yl-X

| X = | |
|---|---|
| —O(CH₂)₃OCOCH=CH₂ | D-484 |

-continued

R = [1,3,5-R-benzene]

R = methyl-1,3,4-oxadiazol-2-yl-phenyl-X (3-substituted)

| X = —OC₆H₁₃ | D-485 |
|---|---|
| —OCOC₅H₁₁ | D-486 |
| —OCOOC₄H₉ | D-487 |
| —O(CH₂)₄OCOCH=CH₂ | D-488 |
| —O(CH₂)₆OCOCH=CH₂ | D-489 |
| —OCO(CH₂)₃OCOCH=CH₂ | D-490 |
| —OCO(CH₂)₄OCOCH=CH₂ | D-491 |
| —OCOO(CH₂)₂OCOCH=CH₂ | D-492 |
| —OCOO(CH₂)₄OCOCH=CH₂ | D-493 |
| —O(CH₂)₂OCOC(CH₃)=CH₂ | D-494 |
| —O(CH₂)₂OCOCH=CHCH₃ | D-495 |
| —O(CH₂)₄OCH=CH₂ | D-496 |
| —O(CH₂)₄—CH(—O—)CH₂ (epoxide) | D-497 |

R = [1,3,5-R-benzene]

R = methyl-1,3,4-oxadiazol-2-yl-(4-fluoro-3-X-phenyl)

| X = —OC₆H₁₃ | D-498 |
|---|---|
| —OCOC₅H₁₁ | D-499 |
| —OCOOC₄H₉ | D-500 |
| —O(CH₂)₄OCOCH=CH₂ | D-501 |
| —O(CH₂)₆OCOCH=CH₂ | D-502 |
| —OCO(CH₂)₃OCOCH=CH₂ | D-503 |
| —OCO(CH₂)₄OCOCH=CH₂ | D-504 |
| —OCOO(CH₂)₂OCOCH=CH₂ | D-505 |
| —OCOO(CH₂)₄OCOCH=CH₂ | D-506 |
| —O(CH₂)₂OCOC(CH₃)=CH₂ | D-507 |
| —O(CH₂)₂OCOCH=CHCH₃ | D-508 |
| —O(CH₂)₄OCH=CH₂ | D-509 |
| —O(CH₂)₄—CH(—O—)CH₂ (epoxide) | D-510 |

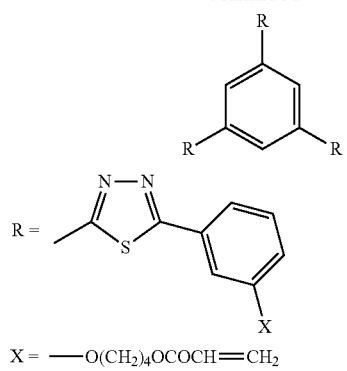
X = —O(CH₂)₄OCOCH=CH₂    D-511
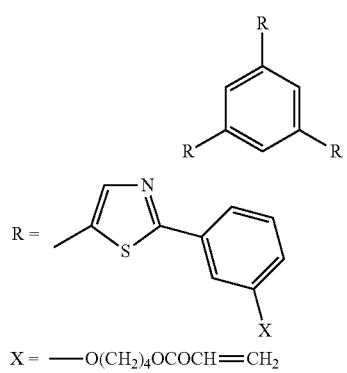
X = —O(CH₂)₄OCOCH=CH₂    D-512
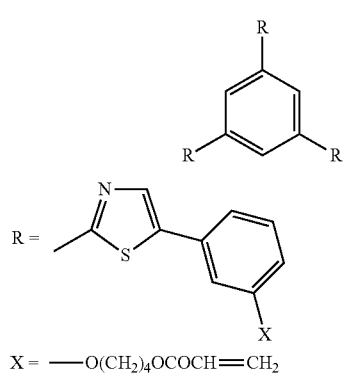
X = —O(CH₂)₄OCOCH=CH₂    D-513
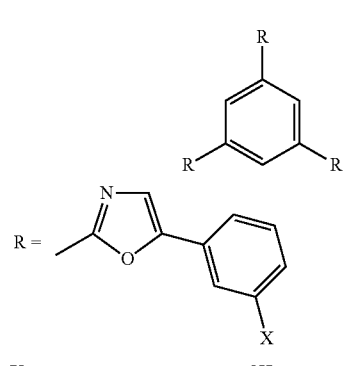
X = —O(CH₂)₄OCOCH=CH₂    D-514
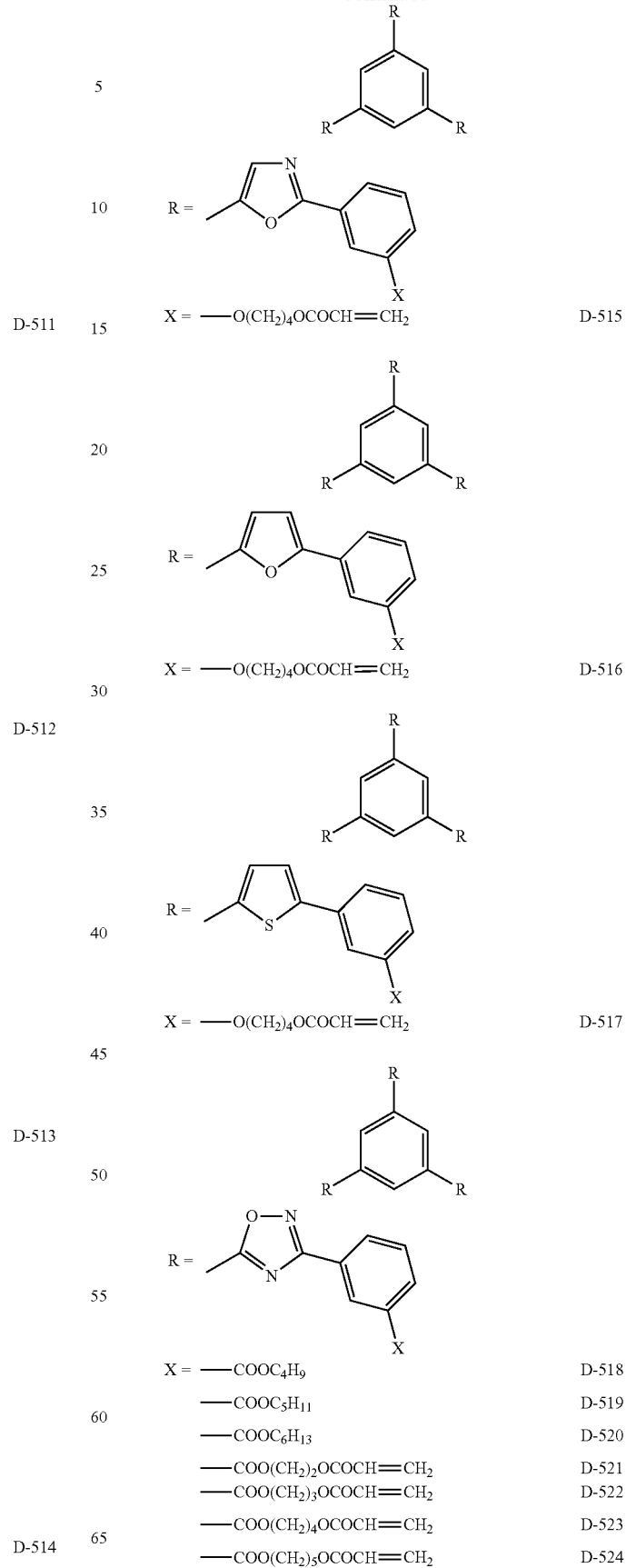

-continued

—COO(CH₂)₆OCOCH=CH₂  D-525
—COO(CH₂)₇OCOCH=CH₂  D-526
—COO(CH₂)₈OCOCH=CH₂  D-527
—COO(CH₂CH₂O)₂COCH=CH₂  D-528
—COO(CH₂)₂CH(CH₃)OCOCH=CH₂  D-529
—COO(CH₂)₃CH(CH₃)OCOCH=CH₂  D-530
—COO(CH₂)₄CH(CH₃)OCOCH=CH₂  D-531
—COOCH₂CH(CH₃)CH₂OCOCH=CH₂  D-532
—COO(CH₂)₂CH(CH₃)(CH₂)₂OCOCH=CH₂  D-533
—COOCH(CH₃)(CH₂)₂OCOCH=CH₂  D-534

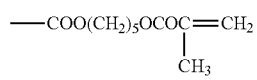  D-535

—COO(CH₂)₄OCH=CH₂  D-536
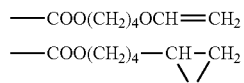  D-537

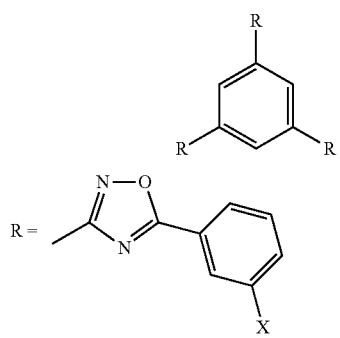

X = —COOC₄H₉  D-538
—COOC₅H₁₁  D-539
—COOC₆H₁₃  D-540
—COO(CH₂)₂OCOCH=CH₂  D-541
—COO(CH₂)₃OCOCH=CH₂  D-542
—COO(CH₂)₄OCOCH=CH₂  D-543
—COO(CH₂)₅OCOCH=CH₂  D-544
—COO(CH₂)₆OCOCH=CH₂  D-545
—COO(CH₂)₇OCOCH=CH₂  D-546
—COO(CH₂)₈OCOCH=CH₂  D-547
—COO(CH₂CH₂O)₂COCH=CH₂  D-548
—COO(CH₂)₂CH(CH₃)OCOCH=CH₂  D-549
—COO(CH₂)₃CH(CH₃)OCOCH=CH₂  D-550
—COO(CH₂)₄CH(CH₃)OCOCH=CH₂  D-551
—COOCH₂CH(CH₃)CH₂OCOCH=CH₂  D-552
—COO(CH₂)₂CH(CH₃)(CH₂)₂OCOCH=CH₂  D-553
—COOCH(CH₃)(CH₂)₂OCOCH=CH₂  D-554
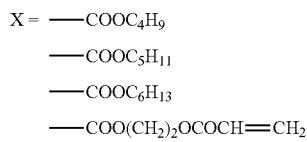  D-555

—COO(CH₂)₄OCH=CH₂  D-556
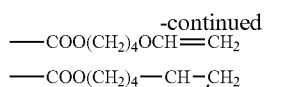  D-557

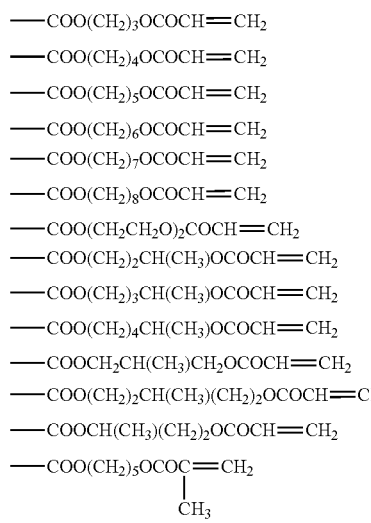

X = —COOC₄H₉  D-558
—COOC₅H₁₁  D-559
—COOC₆H₁₃  D-560
—COO(CH₂)₂OCOCH=CH₂  D-561
—COO(CH₂)₃OCOCH=CH₂  D-562
—COO(CH₂)₄OCOCH=CH₂  D-563
—COO(CH₂)₅OCOCH=CH₂  D-564
—COO(CH₂)₆OCOCH=CH₂  D-565
—COO(CH₂)₇OCOCH=CH₂  D-566
—COO(CH₂)₈OCOCH=CH₂  D-567
—COO(CH₂CH₂O)₂COCH=CH₂  D-568
—COO(CH₂)₂CH(CH₃)OCOCH=CH₂  D-569
—COO(CH₂)₃CH(CH₃)OCOCH=CH₂  D-570
—COO(CH₂)₄CH(CH₃)OCOCH=CH₂  D-571
—COOCH₂CH(CH₃)CH₂OCOCH=CH₂  D-572
—COO(CH₂)₂CH(CH₃)(CH₂)₂OCOCH=CH₂  D-573
—COOCH(CH₃)(CH₂)₂OCOCH=CH₂  D-574
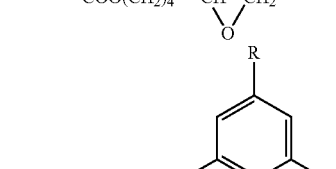  D-575

—COO(CH₂)₄OCH=CH₂  D-576
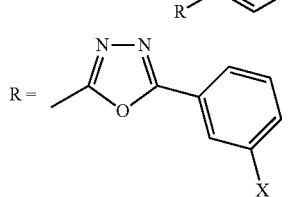  D-577

(Rod-shaped Liquid Crystal Compound)

In the invention, as the liquid crystal molecule there may be used a rod-shaped liquid crystal molecule.

As rod-shaped liquid crystal molecules there are preferably used azomethines, azoxys, cyanobiphenyls, cyanophenylesters, benzoic acid esters, cyclohexanecarboxylic acid phenylesters, cyanophenylcyclohexanes, cyano-substituted phenylpyrimidines, alkoxy-substituted phenylpyrimidines, phenyldioxanes, tolanes or alkenylcyclohexylbenzonitriles. Not only the aforementioned low molecular liquid crystal molecules but also polymer liquid crystal molecules can be used. It is preferred that the rod-shaped liquid crystal molecules be fixed aligned by polymerization. As polymerizable rod-shaped liquid crystal molecules there may be used compounds disclosed in "Makromol. Chem., vol. 190, page 2,255 (1989), "Advanced Materials", vol. 5, page 107 (1993), U.S. Pat. Nos. 4,683,327, 5,622,648 and 5,770,107, World Patent (WO) 95/22586, 95/24455, 97/00600, 98/23580 and 98/52905, JP-A-1-272551, JP-A-6-16616, JP-A-7-110469, JP-A-11-80081, and Japanese Patent Application No. 2001-64627.

More preferably, a compound represented by the following formula (I) is used.

$$Q1\text{-}L^1\text{-}Cy1\text{-}L2\text{-}(Cy2\text{-}L3)n\text{-}Cy3\text{-}L4\text{-}Q2 \quad (I)$$

wherein Q1 and Q2 each independently represents a polymerizable group; L1 and L4 each independently represents a divalent connecting group; $L^2$ and $L^3$ each independently represents a single bond or divalent connecting group; Cy1, Cy2 and Cy3 each represents a divalent cyclic group; and n represents 0, 1 or 2.

The polymerization reaction of the polymerizable group is preferably addition polymerization (including ring-opening polymerization) or condensation polymerization. In other words, the polymerizable group is preferably a functional group that can undergo addition polymerization or condensation polymerization reaction. Examples of these polymerizable groups will be given below.

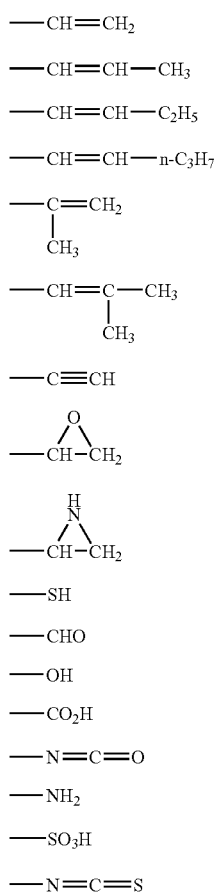

|     |        |
| --- | ------ |
| —CH═CH₂ | (Q-1) |
| —CH═CH—CH₃ | (Q-2) |
| —CH═CH—C₂H₅ | (Q-3) |
| —CH═CH—n-C₃H₇ | (Q-4) |
| —C(CH₃)═CH₂ | (Q-5) |
| —CH═C(CH₃)—CH₃ | (Q-6) |
| —C≡CH | (Q-7) |
| epoxide —CH–CH₂ | (Q-8) |
| aziridine —CH–CH₂ | (Q-9) |
| —SH | (Q-10) |
| —CHO | (Q-11) |
| —OH | (Q-12) |
| —CO₂H | (Q-13) |
| —N═C═O | (Q-14) |
| —NH₂ | (Q-15) |
| —SO₃H | (Q-16) |
| —N═C═S | (Q-17) |

The polymerizable groups (Q1 and Q2) each is an unsaturated polymerizable group (Q-1 to Q-7), epoxy group (Q-8) or azirinidyl group (Q-9), more preferably an unsaturated polymerizable group, most preferably an ethylenically unsaturated polymerizable group (Q-1 to Q-6).

L1 and L4 each independently represents a divalent connecting group. L1 and L4 each independently is a divalent connecting group selected from the group consisting of —O—, —S—, —CO—, —NR2-, divalent chainlike group, divalent cyclic group and combination thereof. $R^2$ is a $C_1$-$C_{20}$ alkyl group or hydrogen atom.

Examples of the divalent connecting group composed of the aforementioned combination will be given below. These divalent connecting groups each is connected to Q (Q1 or Q2) at the left side thereof and to Cy (Cy1 or Cy3) at the right side thereof.

L-1: —CO—O-divalent chainlike group-O—
L-2: —CO—O-divalent chainlike group-O—CO—
L-3: —CO—O-divalent chainlike group-O—CO—O—
L-4: —CO—O-divalent chainlike group-O-divalent cyclic group
L-5: —CO—O-divalent chainlike group-O-divalent cyclic group-CO—O—
L-6: —CO—O-divalent chainlike group-O-divalent cyclic group-O—CO—
L-7: —CO—O-divalent chainlike group-O-divalent cyclic group-divalent chainlike group-
L-8: —CO—O-divalent chainlike group-O-divalent cyclic group-divalent chainlike group-CO—O—
L-9: —CO—O-divalent chainlike group-O-divalent cyclic group-divalent chainlike group-O—CO—
L-10: —CO—O-divalent chainlike group-O—CO-divalent cyclic group-
L-11: —CO—O-divalent chainlike group-O—CO-divalent cyclic group-CO—O—
L-12: —CO—O-divalent chainlike group-O—CO-divalent cyclic group-O—CO—
L-13: —CO—O-divalent chainlike group-O—CO-divalent cyclic group-divalent chainlike group-
L-14: —CO—O-divalent chainlike group-O—CO-divalent cyclic group-divalent chainlike group-CO—O—
L-15: —CO—O-divalent chainlike group-O—CO-divalent cyclic group-divalent chainlike group-O—CO—
L-16: —CO—O-divalent chainlike group-O—CO—O-divalent cyclic group-
L-17: —CO—O-divalent chainlike group-O—CO—O-divalent cyclic group-CO—O—
L-18: —CO—O-divalent chainlike group-O—CO—O-divalent cyclic group-O—CO—
L-19: —CO—O-divalent chainlike group-O—CO—O-divalent cyclic group-divalent chainlike group-
L-20: —CO—O-divalent chainlike group-O—CO—O-divalent cyclic group-divalent chainlike group-CO—O—
L-21: —CO—O-divalent chainlike group-O—CO—O-divalent cyclic group-divalent chainlike group-O—CO—

The term "divalent chainlike group" as used herein is meant to indicate alkylene group, substituted alkylene group, alkenylene group, substituted alkenylene group, alkinylene group or substituted alkinylene group. Preferred among these divalent chainlike groups are alkylene group, substituted alkylene group, alkenylene group and substituted alkylene group. More desirable among these divalent chainlike groups are alkylene group and alkenylene group.

The alkylene group may be branched. The number of carbon atoms in the alkylene group is preferably from 1 to 12, more preferably from 2 to 10, even more preferably from 2 to 8.

The alkylene moiety of the substituted alkylene group is the same as in the aforementioned alkylene group. Examples of the substituents on the alkylene group include halogen atoms.

The alkenylene group may be branched. The number of carbon atoms in the alkenylene group is preferably from 2 to 12, more preferably from 2 to 10, even more preferably from 2 to 8.

The alkenylene moiety of the substituted alkenylene group is the same as in the aforementioned alkenylene group. Examples of the substituents on the alkenylene group include halogen atoms.

The alkinylene group may be branched. The number of carbon atoms in the alkinylene group is preferably from 2 to 12, more preferably from 2 to 10, even more preferably from 2 to 8.

The alkinylene moiety of the substituted alkinylene group is the same as in the aforementioned alkinylene group. Examples of the substituents on the alkinylene group include halogen atoms.

Specific examples of the divalent chainlike group include ethylene, trimethylene, propylene, tetramethylene, 1-methyltetramethylene, pentamethylene, hexamethylene, octamethylene, 2-butenylene, and 2-butinylene.

The definition and examples of the divalent cyclic group are the same as that of Cy1, Cy2 and Cy3 described later.

R2 is preferably a $C_1$-$C_4$ alkyl group or hydrogen atom, more preferably methyl group, ethyl group or hydrogen atom, even more preferably hydrogen atom.

L2 and L3 each independently represents a single bond or divalent connecting group. L2 and L3 each independently is preferably a divalent connecting group or single bond selected from the group consisting of —O—, —S—, —CO—, —NR2-, divalent chainlike group, divalent cyclic group and combination thereof. R2 is a $C_1$-$C_7$ alkyl group or hydrogen atom, preferably a $C_1$-$C_4$ alkyl group or hydrogen atom, even more preferably methyl group, ethyl group or hydrogen atom, most preferably hydrogen atom. The divalent chainlike group and divalent cyclic group are as defined above with reference to L1 and L4.

In the formula (I), n represents 0, 1 or 2. When n is 2, the two L3's may be the same or different and the two Cy2's may be the same or different. The suffix n is preferably 1 or 2, more preferably 1.

In the formula (I), Cy1, Cy2 and Cy3 each independently is a divalent cyclic group. The ring contained in the cyclic group is preferably a 5-membered ring, 6-membered ring or 7-membered ring, more preferably a 5-membered ring or 6-membered ring, even more preferably a 6-membered ring.

The groups contained in the cyclic group may be condensed rings. However, monocyclic groups are preferred to condensed rings.

The rings contained in the cyclic group may be any of aromatic ring, aliphatic ring and heterocycle. Examples of the aromatic ring include benzene ring, and naphthalene ring. Examples of the aliphatic ring include cyclohexane ring, and bicyclooctane ring. Examples of the heterocycle include pyridine ring, pyrimidine ring, and thiophene ring.

Preferred examples of the cyclic group include 1,4-phenylene, naphthalene-1,5-diil, naphthalene-2,6-diil, pyridine-2,5-diil, pyrimidine-2,5-diil, thiophene-2,5-diil, 1,4-cyclohexylene, and [2,2,2] bicyclooctane-1,4-diil. Particularly preferred among these cyclic groups are 1,4-phenylene and 1,4-cyclohexylene.

The aforementioned cyclic group may have substituents. Examples of the substituents on the cyclic group include halogen atoms, cyano groups, nitro groups, $C_1$-$C_5$ alkyl groups, $C_1$-$C_5$ halogen-substituted alkyl groups, $C_1$-$C_5$ alkoxy groups, $C_1$-$C_5$ alkylthio groups, $C_1$-$C_5$ acyl groups, $C_2$-$C_6$ acyloxy groups, $C_2$-$C_6$ alkoxycarbonyl groups, carbamoyl groups, $C_2$-$C_6$ alkyl-substituted carbamoyl groups, and $C_1$-$C_6$ amide groups.

The liquid crystal compound to be used in the invention preferably develops a liquid crystal phase that shows good mono-domain properties. By providing good mono-domain properties, a polydomain structure can be obtained to effectively prevent the occurrence of alignment defects on the border of domains that cause light scattering. Further, when good mono-domain properties are provided, the retarder plate has a higher light transmission to advantage.

Examples of the liquid crystal phase developed in the liquid crystal compound to be used include columnar phase and nematic phase. Most desirable among these liquid crystal phases is nematic phase, which exhibits good mono-domain properties and can be hybrid-aligned.

In the invention, the wavelength dispersion properties of the liquid crystal molecules to be used in the liquid crystal cell of the liquid crystal display device and the wavelength dispersion properties of the optical film are allowed to coincide with each other to enhance the display properties of the liquid crystal display device. In order to control the wavelength dispersion properties of the optical film, a plurality of liquid crystal compounds having different structures are used in combination. The term "different structures" as used herein is meant to indicate different absorption wavelengths. In some detail, a liquid crystal compound having a maximum absorption wavelength of preferably from 200 nm to 260 nm, more preferably from 200 nm to 250 nm, and a liquid crystal compound having an absorption wavelength of preferably from 260 nm to 320 nm, more preferably from 270 nm to 320 nm are preferably used in admixture. For the measurement of the absorption wavelength of a compound, a type UV3150 spectrophotometer (produced by Shimadzu Corporation) can be used.

Supposing that the retardation of the optically anisotropic layer 1 formed by a plurality of liquid crystal compounds is Re($\lambda$), Re (450)/Re (650) is preferably 1.25 or less, more preferably 1.22 or less, even more preferably 1.20 or less.

When Re (450)/Re (650) falls within the above defined range, an effect can be exerted of increasing the width of control over the gap between the pixels or the applied voltage during the design of the liquid crystal panel.

In hybrid alignment, the angle of the physically symmetrical axis of the liquid crystal compound of the invention with respect to the surface of the optically anisotropic layer 2, i.e., tilt angle increases or decreases with the rise of the distance from the surface of the polarizing film in the thickness direction of the optically anisotropic layer (i.e., perpendicular to the optically anisotropic layer 2). The tilt angle preferably decreases with the rise of the distance. The change of tilt angle may include continuous increase, continuous decrease, intermittent increase, intermittent decrease, change involving continuous increase and continuous decrease, and intermittent change involving increase and decrease. The intermittent change contains a region in the course in the thickness direction where the tilt angle shows no change. Even when a region having no change of tilt angle is included, it suffices if the tilt angle changes as a whole. However, the tilt angle preferably shows a continuous change.

In general, the average of physically symmetrical axis of discotic liquid crystal compound can be adjusted by properly selecting the material of discotic liquid crystal compound or alignment film or by properly selecting the rubbing method. Further, the physically symmetrical axis of the discotic liquid crystal compound on the surface side (air side) can be adjusted by properly selecting the kind of the discotic liquid crystal compound or the additives to be used therewith.

Examples of the additives to be used with the discotic liquid crystal compound include plasticizers, surface active agents, polymerizable monomers, polymers, and low molecular compounds. The degree of change of alignment direction of major axis can be adjusted by selecting the liquid crystal compound and the additives as mentioned above.

As the plasticizer and polymerizable monomer to be used with the liquid crystal compound of the invention there are used materials which are compatible with the liquid crystal compound of the invention and can provide the discotic liquid crystal compound with a change of tilt angle or doesn't impair the alignment of the discotic liquid crystal compound.

The liquid crystal compound to be used in the invention preferably develops a liquid crystal phase at a temperature of from 20° C. to 300° C., more preferably from 40° C. to 280° C., most preferably from 60° C. to 250° C. The term "to develop a liquid crystal phase at a temperature of from 20° C. to 300° C." as used herein is meant to indicate that the liquid crystal temperature extends across 20° C. (specifically, 10° C. to 22° C.) or across 300° C. (specifically, 298° C. to 310° C.). This applies also to the temperature range of from 40° C. to 280° C. and from 60° C. to 250° C.

The surface active agent is preferably a fluorine-based compound. For the details of surface active agents, reference can be made to JP-A-2001-330725.

The polymer and low molecular compound preferably provide the tilt angle of the discotic compound with a change.

The polymer is preferably a cellulose ester. For the details of cellulose esters, reference can be made to JP-A-2000-155216, paragraph [0178]. In order that the alignment of the discotic compound might not be impaired, the added amount of the polymer is preferably from 0.1 to 10% by mass, more preferably from 0.1 to 8% by mass based on the discotic compound. (In this specification, mass ratio is equal to weight ratio.)

The optically anisotropic layer 1 can be formed by spreading a coating solution containing a liquid crystal compound and optionally a polymerization initiator described later and arbitrary components over the alignment film.

As the solvent to be used in the preparation of the coating solution there is preferably used an organic solvent. Examples of the organic solvent employable herein include amides (e.g., N,N-dimethylformamide), sulfoxides (e.g., dimethyl sulfoxide), heterocyclic compounds (e.g., pyridine), hydrocarbons (e.g., benzene, hexane), alkyl halides (e.g., chloroform, dichloromethane, tetrachloroethane), esters (e.g., methyl acetate, butyl acetate), ketones (e.g., acetone, methyl ethyl ketone), and ethers (e.g., tetrahydrofurane, 1,2-dimethoxyethane). Preferred among these solvents are alkyl halides and ketones. Two or more organic solvents may be used in combination.

The spreading of the coating solution is accomplished by any known method (e.g., wire bar coating method, extrusion coating method, direct gravure coating method, reverse gravure coating method, die coating method).

The thickness of the optically anisotropic layer 1 is preferably from 0.1 µm to 20 µm, more preferably from 0.3 µm to 10 µm, most preferably from 0.5 µm to 5 µm.

The liquid crystal compound thus aligned can then be fixed aligned. The fixing of alignment is preferably accomplished by polymerization reaction. As the polymerization reaction there may be used heat polymerization reaction involving the use of a heat polymerization initiator or photopolymerization reaction involving the use of a photopolymerization initiator. The photopolymerization reaction is preferred.

Examples of the photopolymerization initiator employable herein include α-carbonyl compounds (as disclosed in U.S. Pat. Nos. 2,367,661 and 2,367,670), acyloin ethers (as disclosed in U.S. Pat. No. 2,448,828), α-hydrocarbon-substituted aromatic acyloin compounds (as disclosed in U.S. Pat. No. 2,722,512), polynucleus quinone compounds (as disclosed in U.S. Pat. Nos. 3,046,127 and 2,951,758), combination of triaryl imidazole dimer and p-aminophenyl ketone (as disclosed in U.S. Pat. No. 3,549,367), acrydine and phenazine compounds (as disclosed in JP-A-60-105667 and U.S. Pat. No. 4,239,850), and oxadiazole compounds (as disclosed in U.S. Pat. No. 4,212,970).

The amount of the photopolymerization initiator to be used is preferably from 0.01 to 20% by mass, more preferably from 0.5 to 5% by mass based on the solid content in the coating solution.

As the light with which the liquid crystal molecules are irradiated to undergo polymerization there is preferably used ultraviolet ray.

The radiation energy is preferably from 20 mJ/cm$^2$ to 50 J/cm$^2$, more preferably from 20 mJ/cm$^2$ to 5,000 J/cm$^2$, most preferably from 100 mJ/cm$^2$ to 800 mJ/cm$^2$. In order to accelerate photopolymerization reaction, the irradiation with light may be effected under heating.

A protective layer may be provided on the optically anisotropic layer 1.

(Optically Anisotropic Layer 2)

The optically anisotropic layer 2 is composed of at least one sheet of polymer film. A plurality of polymer films may be used to form an optically anisotropic layer 2 having the optical anisotropy defined herein. However, the optical anisotropy defined herein can be realized with one sheet of polymer film. Accordingly, the optically anisotropic layer 2 is particularly preferably composed of one sheet of polymer film.

Specifically, the optically anisotropic layer 2 preferably exhibits an Rth retardation value of from 100 nm to 300 nm, more preferably from 150 nm to 200 nm at a wavelength of 550 nm. The optically anisotropic layer 2 preferably exhibits an Re retardation value of from 30 nm to 60 nm, more preferably from 35 nm to 50 mm.

The polymer constituting the optically anisotropic layer 2 is preferably a cellulose-based polymer, more preferably a cellulose ester, even more preferably a lower aliphatic ester of cellulose. The term "lower aliphatic acid" as used herein is meant to indicate an aliphatic acid having 6 or less carbon atoms. The polymer is preferably a $C_2$-$C_4$ cellulose acylate, particularly preferably a cellulose acetate. A mixed aliphatic acid ester such as cellulose acetate propionate and cellulose acetate butyrate may be used.

The viscosity-average polymerization degree (DP) of the cellulose acetate is preferably 250 or more, more preferably 290 or more. The cellulose acetate preferably has a sharp molecular mass distribution Mw/Mn (in Mw represents mass-average molecular mass and Mn represents a number-average molecular mass) as determined by gel permeation chromatography. In some detail, Mw/Mn is preferably from 1.00 to 1.70, more preferably from 1.30 to 1.65, most preferably from 1.40 to 1.60.

The percent acetylation of cellulose acetate is preferably from 55.0% to 62.5%, more preferably from 57.0% to 62.0%. The term "percent acetylation" as used herein is meant to indicate the mass of acetic acid bonded per mass of glucopyranose unit. The percent acetylation is determined by the measurement and calculation of acylation degree according to ASTM: D-817-91 (testing method on cellulose acylate, etc.).

A cellulose acylate tends to have hydroxyl group substituted less in the 6-position rather than uniformly in the 2-position, 3-position and 6-position. The cellulose acylate to be used in the invention preferably has a cellulose substitution degree in the 6-position which is the same as or greater that that in the 2-and 3-positions.

The proportion of the substitution degree in the 6-position in the sum of the substitution degree in the 2-, 3-and 6-positions is preferably from 30% to 40%, more preferably from 31% to 40%, most preferably from 32% to 40%. The substitution degree in the 6-position is preferably 0.88 or more.

For the details of cellulose acylate and its synthesis method, reference can be made to Kokai Giho No. 2001-1745, page 9, Japan Institute of Invention and Innovation.

In order to adjust the retardation value of cellulose acetate, it is normally practiced to apply an external force such as stretching to the cellulose acetate. A retardation developer may be added to adjust the optical anisotropy of the cellulose acetate. As the retardation developer there is preferably used an aromatic compound having at least two aromatic rings. The aromatic compound is preferably used in an amount of from 0.01 to 20 parts by mass based on 100 parts by mass of the polymer. Two or more aromatic compounds may be used in combination. Examples of the aromatic ring in the aromatic compound include aromatic heterocycles in addition to aromatic hydrocarbon rings.

For the details of retardation developer, reference can be made to European Patent Application Disclosure No. 0911656, JP-A-2000-111914 and JP-A-2000-275434.

The cellulose acetate film preferably exhibits a moisture expansion coefficient of $30 \times 10^{-5}$/% RH or less, more preferably $15 \times 10^{-5}$/% RH or less, most preferably $10 \times 10^{-5}$/% RH or less.

The moisture expansion coefficient of the cellulose acetate film is preferably as small as possible but is normally $1.0 \times 10^{-5}$/% RH or less. The term "moisture expansion coefficient" as used herein is meant to indicate the change of length of the sample developed when the relative humidity is changed at a constant temperature. By adjusting the moisture expansion coefficient of the cellulose acetate film, the frame-shaped rise of the transmission (light leakage due to strain) can be prevented while keeping the optically-compensatory sheet capable of optically compensating.

For the measurement of moisture expansion coefficient, the polymer film is cut into a sample having a width of 5 mm and a length of 20 mm. The sample is then suspended in an atmosphere of 25° C. and 20% RH (R0) with one end fixed and the other end having a mass of 0.5 g suspended therefrom for 10 minutes. The length (L0) of the sample is then measured. Subsequently, the sample is suspended in an atmosphere of 25° C. and 80% RH (R1) for 10 minutes. The length ($L^1$) of the sample is then measured. The moisture expansion coefficient is calculated by the following equation. The measurement is made on 10 specimens for each sample. The measurements are then averaged.

$$\text{Moisture expansion coefficient } [\%\,RH] = \{(L^1 - L0)/L0\}/(R1 - R0)$$

In order to reduce the dimensional change of the cellulose acetate film with moisture, it is preferred that the cellulose acetate film have a hydrophilic compound incorporated therein. The hydrophobic compound may be in particulate form. The hydrophobic compound is preferably selected from the group consisting of plasticizers and deterioration inhibitors. The hydrophobic compound preferably has a hydrocarbon group (aliphatic group, aromatic group) as a hydrophobic group. The added amount of the hydrophobic compound is preferably from 0.01% to 10% by mass based on the amount of the polymer solution (dope) to be prepared.

In order to reduce the dimensional change of the polymer film with moisture, it is also effective to reduce the free volume in the polymer film. For example, the residual solvent content in the solvent casting method described later can be reduced to reduce the free volume. The polymer film is preferably dried under the conditions that the residual solvent content in the polymer film reaches a range of from 0.01% to 1.00% by mass.

Examples of the additives to be incorporated in the polymer film include ultraviolet inhibitors, release agents, antistatic agents, deterioration inhibitors (e.g., oxidation inhibitor, peroxide decomposer, radical inhibitor, metal inactivator, acid scavenger, amine), and infrared absorbers.

In the case where the polymer film is composed of a number of layers, the kind and added amount of additives may differ from layer to layer. For the details of the additives, reference can be made to Japan Institute of Invention and Innovation's Kokai Giho 2001-1745, pp. 16-22. The amount of the additives to be incorporated in the polymer film is normally from 0.001% to 25% by mass based on the amount of the polymer film.

The cellulose acetate film is preferably produced by a solvent casting method. In the solvent casting method, a solution of a polymer material in an organic solvent (dope) is used to produce a film.

Preferred examples of the organic solvent include $C_3$-$C_{12}$ ethers, $C_3$-$C_{12}$ ketones, $C_3$-$C_{12}$ esters, and $C_1$-$C_6$ halogenated hydrocarbons. These ethers, ketones and esters may have a cyclic structure. A compound having two or more of etheric, ketonic and esteric functional groups (i.e., —O—, —CO— and —COO—) may be used as an organic solvent. The organic solvent may have other functional groups such as alcoholic hydroxyl group. The number of carbon atoms in the organic solvent having two or more functional groups, if used, may be arbitrary so far as it satisfies the requirements for compound having any of these functional groups.

Examples of the $C_3$-$C_{12}$ ethers employable herein include diisopropyl ether, dimethoxymethane, dimethoxy ethane, 1,4-dioxane, 1,3-dioxolane, tetrahydrofurane, anisole, and phenethol. Examples of the $C_3$-$C_{12}$ ketones employable herein include acetone, methyl ethyl ketone, diethyl ketone, diisobutyl ketone, cyclohexanone, and methyl cyclohexanone. Examples of the $C_3$-$C_{12}$ esters employable herein include ethyl formate, propyl formate, pentyl formate, methyl acetate, ethyl acetate, and pentyl acetate. Examples of the organic solvent having two or more functional groups include 2-methoxyethyl acetate, 2-methoxyethanol, and 2-butoxyethanol. The number of carbon atoms in the halogenated hydrocarbon is preferably 1 or 2, most preferably 1. The halogen atom in the halogenated hydrocarbon is preferably chlorine. The proportion of hydrogen atoms substituted by halogen in the halogenated hydrocarbon is preferably from 25 mol-% to 75 mol-%, more preferably from 30 mol-% to 70 mol-%, even more preferably from 35 mol-% to 65 mol-%, most preferably from 40 mol-% to 60 mol-%. Methylene chloride is a representative example of halogenated hydrocarbon. Two or more organic solvents may be used in admixture.

An ordinary method may be used to prepare a cellulose acetate solution. The term "ordinary method" as used herein is meant to indicate that treatment is effected at a temperature of not lower than 0° C. (ordinary temperature or high temperature). The preparation of the solution can be carried out by a method and apparatus for the preparation of a dope in ordinary solvent casting methods. In ordinary methods, as an organic solvent there is preferably used a halogenated hydrocarbon (particularly methylene chloride). The content of cellulose acetate is adjusted such that cellulose acetate is incorporated in the resulting solution in an amount of from 10 to 40% by mass. The content of cellulose acetate is more preferably from 10 to 30% by mass. The organic solvent (main solvent) may have arbitrary additives described later incorporated therein. The cellulose acetate solution may be prepared by stirring the cellulose acetate and the organic solvent at ordinary temperature (0° C. to 40° C.). A high concentration solution may be stirred under pressure and heating. In some detail, the cellulose acetate and the organic solvent are put in a pressure vessel which is then sealed. The mixture is then heated to a temperature of from not lower than the boiling point of the solvent within ordinary temperature range to the temperature at which the solvent is not boiled with stirring under pressure. The heating temperature is normally not lower than 40° C., preferably from 60° C. to 200° C., more preferably from 80° C. to 110° C.

The various components may be roughly stirred before being put in the vessel. Alternatively, these components may be sequentially put in the vessel. The vessel needs to be arranged to allow agitation. An inert gas such as nitrogen gas may be injected into the vessel to press the interior of the vessel. Alternatively, the rise in the vapor pressure of the solvent by heating may be utilized. Alternatively, the various components may be added under pressure after sealing the vessel. In the case where the components are heated, the vessel may be externally heated. For example, a jacket type heating device may be used. Alternatively, a plate heater may be provided outside the vessel so that the heated liquid is circulated through a piping provided on the vessel to heat the entire vessel. The mixture is preferably stirred by an agitating blade provided inside the vessel. The agitating blade preferably has a length such that it reaches near the wall of the vessel. The agitating blade is preferably terminated by a scraper blade to renew the liquid layer on the wall of the vessel. The vessel may have instruments such as pressure gauge and thermometer provided therein. The various components are dissolved in a solvent in the vessel. The dope thus prepared is cooled, and then withdrawn from the vessel. Alternatively, the dope thus prepared is withdrawn from the vessel, and then cooled by a heat exchanger or the like.

The solution may be prepared by a cold dissolution method. In the cold dissolution method, the cellulose acetate can be dissolved even in an organic solvent in which the cellulose acetate can be difficultly dissolved by ordinary dissolution methods. Even if a solvent in which the cellulose acetate can be dissolved by ordinary methods is used, the cold dissolution method can exert an effect of rapidly obtaining a uniform solution. In the cold dissolution method, the cellulose acetate is gradually added to the organic solvent at room temperature with stirring. The content of the cellulose acetate is preferably adjusted such that the cellulose acetate is incorporated in the mixture in an amount of from 10 to 40% by mass, preferably from 10 to 30% by mass. The mixture may further comprise arbitrary additives described later incorporated therein.

Subsequently, the mixture is cooled to a temperature of from −100° C. to −10° C. (preferably from −80° C. to −10° C., more preferably from −50° C. to −20° C., most preferably from −50° C. to −30° C.). The cooling of the mixture may be effected in a dry ice-methanol bath (−75° C.) or a chilled diethylene glycol solution (−30° C. to −20° C.). In this manner, the mixture of cellulose acetate and organic solvent is solidified. The cooling rate is preferably 4° C./min or more, more preferably 8° C./min or more, most preferably 12° C./min or more. The cooling rate is preferably as high as possible. However, the theoretical upper limit of the cooling rate is 10,000° C./sec. The technical upper limit of the cooling rate is 1,000° C./sec. The practical upper limit of the cooling rate is 100° C./sec. The cooling rate is obtained by dividing the difference between the temperature at which cooling begins and the final cooling temperature by the duration between the time at which cooling begins and the time at which the final cooling temperature is reached.

Further, when the mixture thus solidified is heated to a temperature of from 0° C. to 200° C. (preferably from 0° C. to 150° C., more preferably from 0° C. to 120° C., most preferably from 0° C. to 50° C.), the cellulose acetate is dissolved in the organic solvent. The temperature rise may be carried out by allowing the mixture to stand at room temperature or by heating the mixture over a hot bath. The heating rate is preferably 4° C./min or more, more preferably 8° C./min or more, most preferably 12° C./min or more. The heating rate is preferably as high as possible. The theoretical upper limit of the heating rate is 10,000° C./sec. The technical upper limit of the heating rate is 1,000° C./sec. The practical upper limit of the heating rate is 100° C./sec. The heating rate is obtained by dividing the difference between the temperature at which heating begins and the final heating temperature by the duration between the time at which heating begins and the time at which the final heating temperature is reached. In this manner, a uniform solution is obtained. In the case where dissolution has been insufficiently made, cooling and heating may be repeated. Whether or not dissolution has been insufficiently made can be judged merely by visually observing the external appearance of the solution.

In the cold dissolution method, a sealable vessel is preferably used to avoid the entrance of water content due to moisture condensation. By effecting cooling step under pressure and heating step under reduced pressure, the dissolution time can be reduced. In order to raise and reduce the pressure, a pressure-resistant vessel is preferably used. The 20 mass % solution having a cellulose acetate (acetylation degree: 60.9%; viscosity-average polymerization degree: 299) dissolved in methyl acetate by a cold dissolution method shows a quasi-phase transition point between sol and gel at around 33° C. and becomes uniform gel at a temperature of not higher than 33° C. Accordingly, this solution needs to be stored at a temperature of not lower than the quasi-phase transition temperature, preferably a temperature of about 10° C. higher than the gel phase transition temperature. However, the quasi-phase transition temperature varies with the acylation degree and viscosity-average polymerization degree of cellulose acetate, the concentration of the solution or the organic solvent used.

The cellulose acetate solution (dope) thus prepared can be then subjected to solvent casting to produce a cellulose acylate film. The dope thus prepared is casted over a drum or band so that the solvent is evaporated to form a film. The dope to be casted is preferably adjusted in its concentration such that the solid content is from 18 to 35% by mass. The surface of the drum or band is preferably previously mirror-like finished. For the details of casting and drying in the solvent casting method, reference can be made to U.S. Pat. Nos. 2,336,310, 2,367,603, 2,492,078, 2,492,977, 2,492,978, 2,607,704, 2,739,069, 2,739,070, British Patent 640,731, British Patent 736,892, JP-B-45-4554, JP-A-49-5614, JP-A-60-176834, JP-A-60-203430, and JP-A-62-115035. The dope is preferably casted onto a drum or band having a surface temperature of 10° C. or less. The dope thus casted is preferably dried with an air wind for 2 or more seconds. The film thus obtained is peeled off the drum or band, and then optionally dried with a hot air wind having a successive temperature change from 100° C. to 160° C. so that the residual solvent is evaporated. For the details of this method, reference can be made to JP-B-5-17844. In this manner, the time between casting and peeling can be reduced. In order to execute this method, it is necessary that the dope undergo gelation at the surface temperature of the drum or band during casting.

The cellulose acylate solution (dope) thus prepared may be casted into two or more layers to form a film. In this case, a solvent casting method is preferably employed to prepare a cellulose acylate film. In some detail, the dope is casted over a drum or band where the solvent is then evaporated to form a film. The dope which is ready to be casted is preferably adjusted in its concentration such that the solid content reaches a range of from 10% to 40%. The drum or band is preferably mirror-finished.

In order to cast two or more cellulose acylate solutions, a solution containing a cellulose acylate may be discharged and casted from a plurality of casting nozzles capable of casting a plurality of cellulose acylate solutions provided apart from each other at an interval along the movement of the support so that they are laminated to prepare a film. For example, methods as disclosed in JP-A-61-158414, JP-A-1-122419 and JP-A-11-198285 can be applied. Alternatively, a cellulose acylate solution may be casted from two casting nozzles to form a film. For example, methods as disclosed in JP-B-60-27562, JP-A-61-94724, JP-A-61-947245, JP-A-61-104813, JP-A-61-158413 and JP-A-6-134933 can be applied. Further, a cellulose acylate film casting method which comprises wrapping a high viscosity cellulose acylate solution flow with a low viscosity cellulose acylate, and then extruding the high and low viscosity cellulose acylate solutions at the same time as disclosed in JP-A-56-162617 may be used.

Alternatively, two casting nozzles may be used such that a film formed on a support from a first casting nozzle is peeled off the support and a cellulose acylate solution is then casted over the film on the side thereof in contact with the surface of the metallic support to form a film as disclosed in JP-B-44-20235. The cellulose acylate solutions to be casted may be the same or different and are not specifically limited. In order to functionalize the plurality of cellulose acylate layers, cellulose acylate solutions corresponding to respective functions may be extruded from respective casting nozzles. The cellulose acylate solution of the invention may be casted at the same time with other functional layers (e.g., adhesive layer, dye layer, antistatic layer, antihalation layer, UV absorption layer, polarizing layer).

In order to form a film having a desired thickness from the related art single layer solution, it is necessary that a cellulose acylate solution having a high concentration and a high viscosity be extruded. In this case, a problem often arises that the cellulose acylate solution exhibits a poor stability and thus forms a solid material that causes the generation of granular structure or poor planarity. In order to solve these problems, a plurality of cellulose acylate solutions can be casted through casting ports, making it possible to extrude high viscosity solutions onto the metallic support at the same time. In this manner, a film having an improved planarity and hence excellent surface conditions can be prepared. Further, the use of a highly concentrated cellulose acylate solution makes it possible to attain the reduction of the drying load that can enhance the production speed of film.

The cellulose acetate film may comprise a plasticizer incorporated therein to improve the mechanical physical properties or enhance the drying speed. As the plasticizer there may be used a phosphoric acid ester or carboxylic acid ester. Examples of the phosphoric acid ester include triphenyl phosphate (TPP) and tricresyl phosphate (TCP). Representative examples of the carboxylic acid ester include phthalic acid ester and citric acid ester. Examples of the phthalic acid ester include dimethyl phthalate (DMP), diethyl phthalate (DEP), dibutyl phthalate (DBP), dioctyl phthalate (DOP), diphenyl phthalate (DPP), and diethylhexyl phthalate (DEHP). Examples of the citric acid ester include O-acetylcitric acid triethyl (OACTE) and O-acetyltricitric acid tributyl (OACTB). Other examples of carboxylic acid ester include butyl oleate, methyl acetyl ricinoleate, dibutyl sebacate, and various trimellitic acid esters. Phthalic acid ester-based plasticizers (DMP, DEP, DBP, DOP, DPP, DEHP) are preferably used. DEP and DPP are particularly preferred. The added amount of the plasticizer is preferably from 0.1% to 25% by mass, more preferably from 1% to 20% by mass, most preferably from 3% to 15% by mass based on the amount of the cellulose ester.

The cellulose acylate film is preferably subjected to surface treatment. Examples of the surface treatment include corona discharge treatment, glow discharge treatment, flame treatment, acid treatment, alkaline saponification, and ultraviolet irradiation. For the details of surface treatment, reference can be made to Japan Institute of Invention and Innovation's Kokai Giho 2001-1745, pp. 30-32.

The alkaline saponification is carried out by dipping the cellulose acylate film in a saponifying solution or spreading the saponifying solution over the cellulose acylate film. The spreading method is preferably used. Examples of the spreading method include dip coating method, curtain coating method, extrusion coating method, bar coating method, and E type coating method. The alkali to be used herein is preferably a hydroxide of alkaline metal (e.g., potassium, sodium). In other words, the alkaline treatment solution is preferably a solution of a hydroxide of an alkaline metal. The concentration of hydroxide ions in the solution is preferably from 0.1 N to 3.0 N.

A solvent having good wetting properties with respect to film, a surface active agent and a wetting agent (e.g., diol, glycerin) may be incorporated in the alkaline treatment solution to improve the wetting properties of the alkaline treatment solution with respect to the second optically anisotropic layer and the stability of the alkaline treatment solution. Preferred examples of the solvent having good wetting properties with respect to film include alcohols (e.g., isopropyl alcohol, n-butanol, methanol, ethanol). For the details of additives for alkaline treatment solution, reference can be made to JP-A-2002-82226 and International Patent Application 02/46809 (pamphlet).

An undercoat layer (as disclosed in JP-A-7-333433) may be provided in place of or in addition to surface treatment. A plurality of undercoat layers may be provided. For example, a polymer layer containing both hydrophobic and hydrophilic groups may be provided as a first undercoat layer. A hydrophilic polymer layer which can be fairly adhered to the alignment film may be provided on the first undercoat layer as a second undercoat layer (as disclosed in JP-A-11-248940).

(Alignment Film)

The alignment film can be provided by any method such as method involving rubbing of an organic compound (preferably polymer), method involving oblique vacuum deposition of an inorganic compound, method involving formation of a layer having microgrooves and method involving accumulation of an organic compound (e.g., (1-tricosanic acid, dioctadecylmethyl ammonium chloride, methyl stearate) by Langmure-Blodgett method (LB film). Also known is an alignment capable of aligning when given an electric field or magnetic field or irradiated with light.

The alignment film is preferably formed by rubbing a polymer. Principally speaking, the polymer to be used in the alignment film has a molecular structure capable of aligning liquid crystal molecules. The polymer to be used in the alignment film preferably is also capable of fixing the alignment of the liquid crystal molecules in addition to capability of aligning the liquid crystal molecules. For example, side chains having a crosslinkable functional group (e.g., double bond) are preferably bonded to the main chain of the polymer. Alternatively, a crosslinkable functional group capable of aligning the liquid crystal molecules is preferably incorporated in the side chains of the polymer.

The polymer to be used in the alignment film is preferably crosslinkable itself or is preferably rendered crosslinkable in the presence of a crosslinking agent. For the details of the crosslinkable polymer, reference can be made to JP-A-8-338913, paragraph [0022]. Examples of the crosslinkable polymer include polymethacrylates, polystyrenes, polyolefins, polyvinyl alcohols, modified polyvinyl alcohols, poly (N-methylolacrylamide), polyesters, polyimides, polyvinyl acetates, carboxymethyl celluloses, polycarbonates, and copolymers thereof. Water-soluble polymers (e.g., poly(N-methylolacrylamide), carboxymethyl cellulose, gelatin, polyvinyl alcohol, modified polyvinyl alcohol) are preferably used. More desirable among these water-soluble polymers are gelatin, polyvinyl alcohol, and modified polyvinyl alcohol. Most desirable among these water-soluble polymers are polyvinyl alcohol and modified polyvinyl alcohol. It is particularly preferred that two or more polyvinyl alcohols or modified polyvinyl alcohols having different polymerization degrees be used in combination.

The percent saponification of the polyvinyl alcohol is preferably from 70% to 100%, more preferably from 80% to 100%. The polymerization degree of the polyvinyl alcohol is preferably from 100 to 5,000.

The side chains capable of aligning the liquid crystal molecules normally have a hydrophobic group as a functional group. The kind of specific functional groups to be used herein is determined depending on the kind of the liquid crystal molecules and the required alignment.

The modifying group in the modified polyvinyl alcohol can be introduced by copolymerization modification, chain transfer modification or block polymerization modification. Examples of the modifying group include hydrophilic groups (e.g., carboxylic acid group, sulfonic acid group, phosphonic acid group, amino, ammonio, amide, thiol), $C_{10}$-$C_{100}$ hydrocarbons, fluorine-substituted hydrocarbon groups, alkylthio groups, polymerizable groups (e.g., unsaturated polymerizable group, epoxy group, azirinidyl group), and alkoxysilyl groups (trialkoxysilyl, dialkoxysilyl, monoalkoxysilyl).

For the details of modified polyvinyl alcohols, reference can be made to JP-A-2000-155216 and JP-A-2002-62426.

By bonding side chains having a crosslinkable functional group to the main chain of the polymer of the alignment film or introducing a crosslinkable functional group into the side chains capable of aligning the liquid crystal molecules, the polymer of the alignment film and the polyfunctional monomers contained in the first optically anisotropic layer 1 can be copolymerized with each other. As a result, not only the polyfunctional monomers but also the alignment film polymers and the polyfunctional monomer and the alignment film polymer can be firmly bonded to each other. Accordingly, by introducing a crosslinkable functional group into the polymer of the alignment film, the strength of the optically-compensatory sheet can be remarkably enhanced.

For the details of crosslinkable functional group having preferred polymerizable group to be used in the alignment film, reference can be made to JP-A-2000-155216, paragraphs [0080]-[0100] as in the polyfunctional monomer.

The polymer of the alignment film can be crosslinked with a crosslinking agent separately of the crosslinkable functional group. Examples of the crosslinking agent employable herein include aldehydes, N-methylol compounds, dioxane derivatives, compounds which activate carboxyl group to act, active vinyl compounds, active halogen compounds, isooxazole, and dialdehyde starch. Two or more crosslinking agents may be used in combination. For the details of crosslinking agent, reference can be made to JP-A-2002-62426. Aldehydes having a high reaction activity, particularly glutaraldehyde, are preferably used.

The added amount of crosslinking agent is preferably from 0.1% to 20% by mass, more preferably from 0.5% to 15% by mass based on the mass of polymer. The amount of unreacted crosslinking agent left in the alignment film is preferably 1.0% by mass or less, more preferably 0.5% by mass or less. By reducing the residual amount of crosslinking agent, a sufficient durability free from reticulation can be obtained against prolonged use of liquid crystal display device even in high temperature and humidity atmosphere.

The alignment film can be formed by spreading a coating solution containing the aforementioned polymer and crosslinking agent over the optically anisotropic layer 2, heating and drying (crosslinking) the coated material, and then subjecting the coated material to rubbing. The crosslinking reaction is effected after the spreading of the coating solution over the optically anisotropic layer 2. In the case where a water-soluble polymer such as polyvinyl alcohol is used as an alignment film-forming material, the coating solution is preferably composed of a mixture of an anti-foaming organic solvent (e.g., methanol) and water. In the case of a mixture of water and methanol, the content of methanol in the total amount of solvents is preferably 1% by mass or more, more preferably 9% by mass or more. By adding an organic solvent, foaming is suppressed, making it possible to remarkably reduce surface defects of the alignment film and the first optically anisotropic layer.

Preferred examples of the method of spreading the alignment film coating solution include spin coating method, dip coating method, curtain coating method, extrusion coating method, rod coating method, and roll coating method. The rod coating method is particularly preferred.

The dry thickness of the coat layer is preferably from 0.1 μm to 10 μm.

The heating/drying step can be effected at a temperature of from 20° C. to 110° C. In order to attain sufficient crosslinking, the heating/drying step is effected at a temperature of from 60° C. to 100° C., more preferably from 80° C. to 100° C. The drying time may be from 1 minute to 36 hours, preferably from 1 to 30 minutes. The pH value is preferably predetermined to a value optimum for the crosslinking agent used. If glutaraldehyde is used, the pH value is preferably from 4.5 to 5.5.

The alignment film can be obtained by subjecting the polymer to surface rubbing.

The rubbing treatment is the same as that widely employed at LCD liquid crystal alignment step. In other words, by rubbing the surface of the alignment film with paper, gauze, felt, rubber, nylon fiber or polyester fiber in a predetermined direction, alignment can be established. In general, rubbing is effected by several times with a cloth obtained by uniformly plating fibers having uniform length and thickness.

(Polarizing Plate)

The optical film of the invention is stuck to a polarizing film to form a polarizing plate.

Examples of the polarizing film include aligned polarizing film and coated polarizing film (produced by Optiva Inc.). The aligned polarizing film is composed of a binder and iodine or dichroic dye. Iodine and dichroic dye are aligned in the binder to perform polarizing properties. Iodine and dichroic dye are preferably aligned along the binder molecules.

Alternatively, dichroic dye is preferably aligned in one direction by self-structuring as performed in liquid crystal.

Commercially available aligned polarizing films are prepared by dipping a stretched polymer in an iodine or dichroic dye solution in a tank so that the binder is impregnated with iodine or dichroic dye. A commercially available polarizing film has iodine or dichroic dye distributed therein over the region extending from the surface of the polymer to a depth of about 4 μm (about 8 μm in total on both sides). In order to obtain sufficient polarizing properties, at least 10 μm thickness is needed. The penetration of iodine and dichroic dye can be controlled by the concentration of the iodine and dichroic dye solution, the tank temperature and the dipping time.

The thickness of the polarizing film is preferably not greater than that of commercially available polarizing plates (about 30 μm), more preferably 25 μm or less, most preferably 20 μm or less. When the thickness of the polarizing plate is 20 μm or less, light leakage can be no longer observed with 17-inch liquid crystal display devices.

The binder in the polarizing film may be crosslinked. As the polarizing film binder there may be used a polymer which is crosslinkable itself. A polymer having a functional group or a polymer having a functional group incorporated therein can be irradiated with light or given heat or pH change, the functional group is reacted so that the polymers are crosslinked to form a polarizing film. Alternatively, a crosslinking agent may be used to introduce a crosslinked structure into the polymer. A crosslinking agent which is a compound having a high reaction activity may be used to introduce a linkage group derived from crosslinking agent between the binders so that the binder molecules are crosslinked to form a polarizing film.

Crosslinking can be normally effected by spreading a coating solution containing a crosslinkable polymer or a mixture thereof with a crosslinking agent over a transparent support, and then heating the coated material. Since it suffices if the desired durability of the final commercial product is assured, the crosslinking treatment may be effected at any step up to the point at which the final polarizing plate product is obtained.

As the binder of the polarizing film there may be used a polymer which is crosslinkable itself or a polymer which is crosslinked with a crosslinking agent. Examples of the polymer employable herein include polymethyl methacrylates, polyacrylic acids, polymethacrylic acids, polystyrenes, polyvinyl alcohols, modified polyvinyl alcohols, poly(N-methylol acrylamide), polyvinyl toluenes, chlorosulfonated polyethylenes, nitrocelluloses, chlorinated polyolefins (e.g., polyvinyl chloride), polyesters, polyimides, polyvinyl acetates, polyethylenes, carboxymethyl celluloses, polypropylenes, polycarbonates, and copolymers thereof (e.g., acrylic acid/methacrylic acid copolymer, styrene/maleimide copolymer, styrene/vinyl toluene copolymer, vinyl acetate/vinyl chloride copolymer, ethylene/vinyl acetate copolymer). Water-soluble polymers (e.g., poly (N-methylolacrylamide), carboxymethyl cellulose, gelatin, polyvinyl alcohol, polyvinyl alcohol, modified polyvinyl alcohol) are preferably used. Gelatin, polyvinyl alcohols and modified polyvinyl alcohols are more preferably used. Polyvinyl alcohols and modified polyvinyl alcohols are most preferably used.

The percent saponification of the polyvinyl alcohol and modified polyvinyl alcohol is preferably from 70% to 100%, more preferably from 80% to 100%, most preferably from 95% to 100%. The polymerization degree of the polyvinyl alcohol is preferably from 100 to 5,000.

The modified polyvinyl alcohol is obtained by introducing a modifying group into a polyvinyl alcohol by copolymerization modification, chain transfer modification or block polymerization modification. Examples of the modifying group to be introduced in copolymerization include —COONa, —Si(OX)$_3$ (in which X represents a hydrogen atom or alkyl group), —N(CH$_3$)$_3$.Cl, —C$_9$H$_{19}$, —COO, —SO$_3$Na, and —C$_{12}$H$_{25}$. Examples of the modifying group to be introduced in chain transfer modification include —COONa, —SH, —SC$_{12}$H$_{25}$. The polymerization degree of the modified polyvinyl alcohol is preferably from 100 to 3,000. For the details of modified polyvinyl alcohols, reference can be made to JP-A-8-338913, JP-A-9-152509 and JP-A-9-316127.

An unmodified polyvinyl alcohol and an alkylthio-modified polyvinyl alcohol having a percent saponification of from 85% to 95% are particularly preferred.

Two or more polyvinyl alcohols and modified polyvinyl alcohols may be used in combination.

For the details of crosslinking agents, reference can be made to U.S. Reissued Pat. 23,297. Boron compounds (e.g., boric acid, borax) may be used as crosslinking agent.

When the binder crosslinking agent is added in a large amount, the heat moisture resistance of the polarizing film can be enhanced. However, when the crosslinking agent is added in an amount of 50% by mass or more based on the mass of binder, the alignability of iodine or dichroic dye is deteriorated. The added amount of the crosslinking agent is preferably from 0.1 to 20% by mass, more preferably from 0.5 to 15% by mass based on the binder. The binder contains unreacted crosslinking agent in some amount even after the termination of the crosslinking reaction. However, the amount of remaining crosslinking agent is preferably 1.0 parts by mass or less, more preferably 0.5% by mass or less based on the binder. When the crosslinking agent is incorporated in the binder in an amount of more than 1.0% by mass, there are some cases where durability problem arises. In other words, when a liquid crystal display device comprising a polarizing film having a large residual amount of a crosslinking agent incorporated therein is used or allowed to stand in a high temperature and humidity atmosphere over an extended period of time, the deterioration of polarization can occur.

Examples of dichroic dye employable herein include azo-based dyes, stilbene-based dyes, pyrazolone-based dyes, triphenylmethane-based dyes, quinoline-based dyes, oxazine-based dyes, thiazine-based dyes, and anthraquinone-based dyes. The dichroic dye is preferably water-soluble. The dichroic dye preferably has a hydrophilic substituent (e.g., sulfo, amino, hydroxyl). Specific examples of the dichroic dye include C.I. Direct Yellow 12, C.I. Direct Orange 39, C.I. Direct Orange 72, C.I. Direct Red 39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I. Direct Green 59, and C.I. Acid Red 37. For the details of dichroic dyes, reference can be made to JP-A-1-161202, JP-A-1-172906, JP-A-1-172907, JP-A-1-183602, JP-A-1-248105, JP-A-1-265205, and JP-A-7-261024.

The dichroic dye is used in the form of free acid or salt (e.g., alkaline metal salt, ammonium salt, amine salt). A polarizing film having various hues can be produced by blending two or more dichroic dyes. A polarizing film comprising a compound (dye) which assumes black when the polarizing axes cross each other or a polarizing film having various dichroic dyes blended so as to assume black is excellent in single plate transmission and percent polarization.

In the polarizing film, the binder is stretched in the longitudinal direction (MD direction) of the polarizing film (stretching method). Alternatively, the binder thus rubbed is dyed with iodine and dichroic dye (rubbing method).

In the case of stretching method, the draw ratio is preferably from 2.5 to 30.0, more preferably from 3.0 to 10.0. Stretching may be effected in the air in a dry process. Alternatively, wet stretching may be effected in water. The draw ratio during dry stretching is preferably from 2.5 to 5.0. The draw ratio during wet stretching is preferably from 3.0 to 10.0. Stretching may be effected batchwise in several portions. By stretching the binder batchwise in several portions, the binder can be uniformly stretched even if the draw ratio is high. Before the full stretching, the binder may be somewhat crosswise or longitudinally stretched (to an extent such that the crosswise shrinkage can be prevented).

From the standpoint of yield, the binder is preferably stretched at an angle of from 10° to 80° with respect to longitudinal direction. In this case, stretching can be accomplished by effecting tenter stretching in biaxial stretching at steps which differ from right edge to left edge. The aforementioned biaxial stretching is the same as the stretching to be effected in ordinary film forming. In the biaxial stretching process, stretching is effected at a rate which differs from right edge to left edge. It is thus necessary that the thickness of the unstretched binder film differ from right edge to left edge. In the cast film-forming method, the die can be tapered to make the flow rate of the binder solution different from right to left.

Stretching is preferably effected such that the tilt angle coincides with the angle of the transmission axis of the two sheets of polarizing plates laminated on the respective side of the liquid crystal cell constituting the liquid crystal display device with respect to the longitudinal or crosswise direction of the liquid crystal cell. The tilt angle is normally 45°. However, transmission type, reflection type and semi-transmission type liquid crystal display devices the tilt angle of which is not necessarily 45° have been recently developed. It is thus preferred that the stretching direction be arbitrarily adjusted according to the design of the liquid crystal display device.

In this manner, a binder film which is stretched obliquely at an angle of from 10° to 80° with respect to MD direction of the polarizing film is produced.

As the rubbing method there may be applied a rubbing method which is widely used as step of aligning liquid crystal molecules in liquid crystal display devices. In some detail, the surface of the film is rubbed with paper, gauze, felt, rubber or nylon or polyester fiber in a predetermined direction to attain alignment. In general, rubbing is carried out by rubbing the material several times with a cloth woven uniformly by fibers having a uniform length and thickness. A rubbing roll having a roundness, cylindricalness and deflection (eccentricity) of 30 μm is preferably used to perform rubbing. The lapping angle of the film on the rubbing roll is preferably from 0.1° to 90°. As disclosed in JP-A-8-160430, the film can be wound up for 360° or on the rubbing roll to attain stable rubbing.

In order to subject a film of continuous length to rubbing, the film is preferably conveyed with a constant tension at a rate of from 1 to 100 m/min over a conveying device. The rubbing roll is preferably arranged so as to freely rotate parallel to the moving direction of the film to attain arbitrary predetermination of rubbing angle. The rubbing angle is preferably predetermined within a range of from 0° to 60°. When the polarizing film is incorporated in a liquid crystal display device, the rubbing angle is preferably from 40° to 50°, particularly preferably 45°.

A protective film is preferably provided on the both sides of the polarizing film. As one of the protective film there is preferably used a part of a rolled optical film of the invention. For example, a laminate obtained by superposing a protective film, a polarizing film, an optically anisotropic layer 2 and an optically anisotropic layer 1 in this order or a protective film, a polarizing film, an optically anisotropic layer 2, an alignment layer and an optically anisotropic layer 1 in this order is preferably used. The polarizing film may be stuck to the front surface of the optically anisotropic layer 1. Sticking may be made with an adhesive. As such an adhesive there may be used a polyvinyl alcohol-based resin (including acetoacetyl group-, sulfonic acid group-, carboxyl group- or oxyalkylene group-modified polyvinyl alcohol) or an aqueous solution of boron compound. A polyvinyl alcohol-based resin is preferably used.

As the protective film to be provided on the side of the polarizing film opposed to the optical film of the invention there may be used a triacetyl cellulose film (Fujitac (TD-80UF): produced by FUJIFILM Corporation).

The dried thickness of the adhesive layer is preferably from 0.01 μm to 10 μm, more preferably from 0.05 μm to 5 μm.

A light-diffusion film or anti-glare film may be stuck to the surface of the polarizing plate.

(Light-diffusion or Anti-glare Film)

Figure 4:
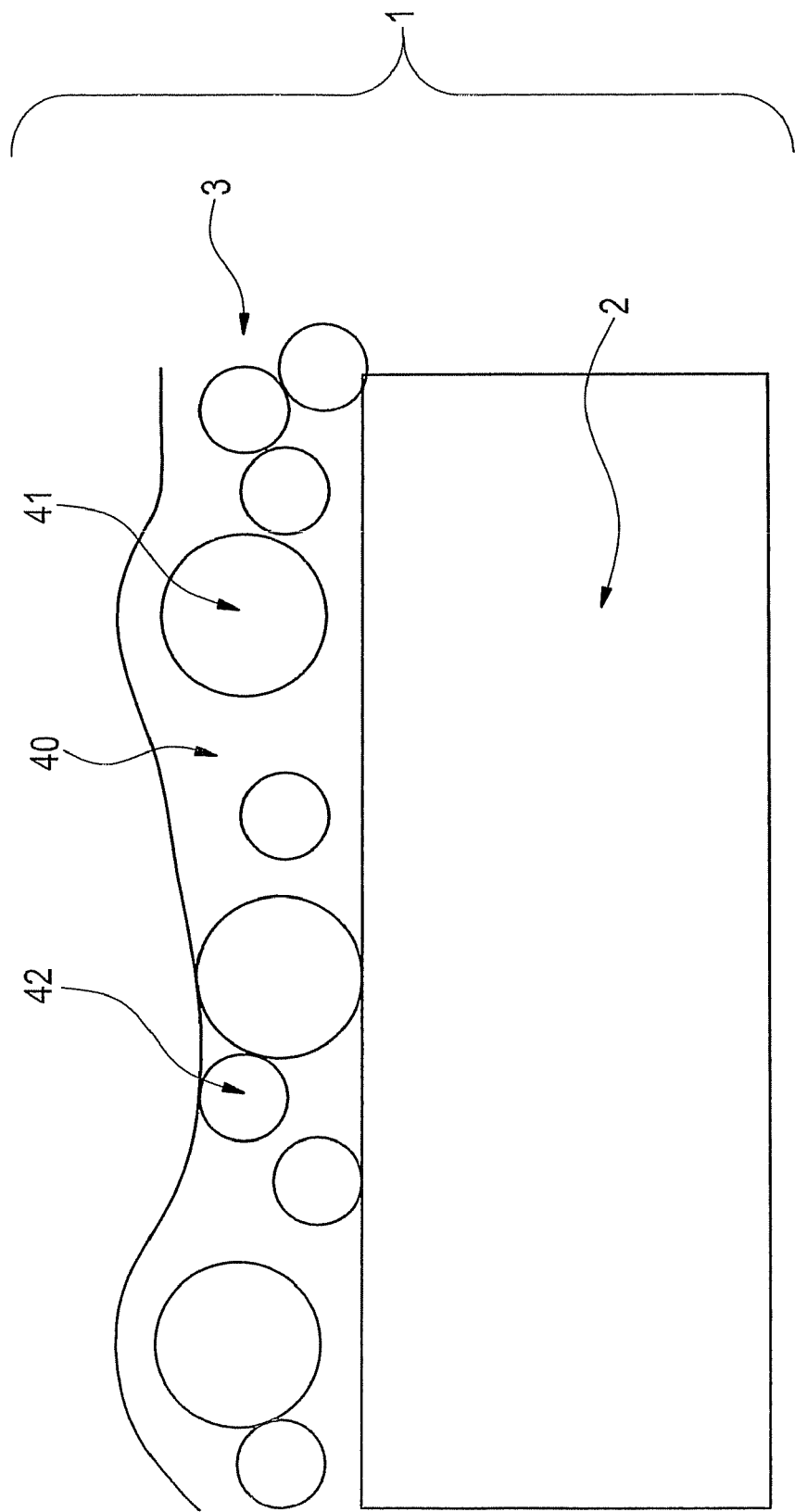
FIG. 4 is a diagrammatic sectional view illustrating a representative embodiment of light-diffusion film, wherein 10 denotes bend-aligned liquid crystal cell; 11 denotes liquid crystal compound; 11a-11j denote rod-shaped liquid crystal molecule; 12a and 12b denote alignment film; 13a and 13b denote electrode layer; 14a denotes upper substrate; 14b denotes lower substrate; 31, 31A and 31B denote first optically anisotropic layer 1; 31a-31e denote discotic compound; 32 denotes alignment film; 33, 33A and 33B denote second optically anisotropic layer 2; 34, 34A and 34B denote polarizing film; 35 denotes optical film; NL denotes normal line of disc surface of discotic compound; PL denotes direction of normal line of disc surface regularly projected on surface of second optically anisotropic layer 2; RD, RD1, RD2, RD3 and RD4 denote rubbing direction; SA, SA1 and SA2 denote in-plane slow axis; TA, TA1 and TA2 denote in-plane transmission axis; BL, denotes back light; θ denotes angle of the rubbing direction (RD) of alignment film with respect to the in-plane slow axis (SA) of optically anisotropic layer 2; 1 denotes light-diffusion film; 2 denotes transparent substrate film; 3 denotes light-diffusion layer; 40 denotes light-transmitting resin; 41 denotes first light-transmitting particulate material; and 42 denotes second light-transmitting particulate material.

FIG. 4 is a diagrammatic sectional view illustrating a representative embodiment of the light-diffusion film.

A light-diffusion film (1) shown in FIG. 4 comprises a transparent substrate film (2) and a light-diffusion layer (3) laminated therein, the light-diffusion layer (3) having a first light-transmitting particulate material (41) and a second light-transmitting particulate material (42) incorporated in a light-transmitting resin (40). While the present embodiment is described with reference to two light-transmitting particulate materials (having different refractive indexes) having two peaks of particle diameter distribution, the same light-transmitting particulate material (having the same refractive index) having two peaks of particle diameter distribution may be used or one light-transmitting particulate material may be used.

The first light-transmitting particulate material (41) is composed of a light-transmitting resin such as particulate silica (average particle diameter: 1.0 μm; refractive index: 1.51). The second light-transmitting particulate material (42) is composed of a light-transmitting resin such as styrene bead (average particle diameter: 3.5 μm; refractive index: 1.61). The light-diffusion capacity can be obtained by the difference in refractive index between the light-transmitting particulate material (41 and 42) and the light-transmitting resin (40). The difference in refractive index between the light-transmitting particulate material (41 and 42) and the light-transmitting resin (40) is preferably from not smaller than 0.02 to not greater than 0.15. When the difference in refractive index falls below 0.02, the desired light-diffusing effect cannot be obtained. When the difference in refractive index exceeds 0.15, the resulting light-diffusing effect is too high, occasionally causing the whitening of the entire film. The difference in refractive index is more preferably from not smaller than 0.03 to not greater than 0.13, most preferably from not smaller than 0.04 to not greater than 0.10.

In the case where a polarizing film is used in a liquid crystal display device, an anti-reflection layer is preferably provided on the viewing side surface thereof. The anti-reflection layer may act also as a protective layer for the viewing side of the polarizing film. In order to suppress the change of tint of the liquid crystal display device with viewing angle, the inner haze of the anti-reflection layer is preferably predetermined to be 50% or more. For the details of anti-reflection layer, reference can be made to JP-A-2001-33783, JP-A-2001-343646 and JP-A-2002-328228.

The optical film of the invention can be used in liquid crystal display devices of various modes, and particularly useful in an OCB mode liquid crystal display device.

(OCB Mode Liquid Crystal Display Device)

An OCB mode liquid crystal cell is a liquid crystal cell of bend alignment mode wherein rod-shaped liquid crystal molecules are oriented in substantially opposing directions (symmetrically) from the upper part to the lower part of the liquid crystal cell. For the details of liquid crystal display device comprising a bend alignment mode liquid crystal cell, reference can be made to U.S. Pat. Nos. 4,583,825 and 5,410,422. In the OCB mode liquid crystal cell, rod-shaped liquid crystal molecules are aligned symmetrically with each other from the upper part to the lower part of the liquid crystal cell. Therefore, the bend alignment mode liquid crystal cell has a self optical compensation capacity. Accordingly, this liquid crystal mode is also called OCB (optically compensated bend) liquid crystal mode.

Similarly to TN mode liquid crystal cell, OCB mode liquid crystal cell has rod-shaped liquid crystal molecules aligned erected in the central portion thereof and aligned lying in the vicinity of the substrate during black display.

The value Δn×d of the liquid crystal cell is preferably from 50 nm to 1,000 nm, more preferably from 500 nm to 1,000 nm.

The evaluation of tint of the liquid crystal display device was made on CIE1976 (u'v') chromaticity diagram in the invention. In some detail, the measurement of tit in black state is effected using a Type SR-3 spectral brightness meter (produced by TOPCON Co., Ltd.). Calculation is made in the spectral brightness meter to calculate u'v'. The value v' which represents blue when the black state developed by an ordinary polarizing plate is evaluated is close to 0.45. Thus, the closer to this value v' of the liquid crystal display device during black display is, the less is black display problem.

The invention will be further described in the following examples. The materials, reagents, amount and proportion of materials, procedure and other factors defined hereinafter may be properly changed unless they depart from the spirit of the invention. Accordingly, the scope of the invention is not specifically limited to the following examples.

EXAMPLE

Example 1

Preparation of Cellulose Acetate Solution

The following components were charged in a mixing tank where they were then heated with stirring to prepare a cellulose acetate solution.

| Formulation of cellulose acetate solution | |
|---|---|
| Cellulose acetate having a percent acetylation of 60.9% | 100 parts by mass |
| Triphenyl phosphate | 7.8 parts by mass |
| Biphenyl diphenyl phosphate | 3.9 parts by mass |
| Methylene chloride | 300 parts by mass |
| Methanol | 45 parts by mass |

(Preparation of Retardation Raising Agent Solution)

Into a separate mixing tank were charged 4 parts by mass of a cellulose acetate (linter) having a percent acetylation of 60.9%, 25 parts by mass of the following retardation developer, 0.5 parts by mass of a particulate silica (average particle diameter: 20 nm), 80 parts by mass of methylene chloride and 20 parts by mass of methanol which were then heated with stirring to prepare a retardation developer solution.

Retardation developer

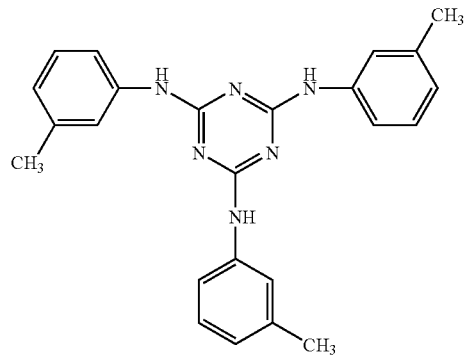

(Preparation of Optically Anisotropic Layer 2)

470 parts by mass of a cellulose acetate solution were mixed with 18.5 parts by mass of the retardation developer solution. The mixture was then thoroughly stirred to prepare a dope. The mass ratio of the retardation developer to cellulose acetate was 3.5%. The film having a residual solvent content of 35% by mass was peeled off the band, crosswise stretched at a temperature of 140° C. and a draw ratio of 38% using a film tenter, and then dried at 130° C. with the clip detached therefrom for 45 seconds to prepare a cellulose acetate film as optically anisotropic layer 2. The optically anisotropic layer 2 thus produced had a residual solvent content of 0.2% by mass and a thickness of 88 μm.

(Measurement of Optical Properties)

The optically anisotropic layer 2 thus prepared was then measured for $Re_2$ (550) at a wavelength of 550 nm using a Type KOBRA 21ADH ellipsometer (produced by Ouji Scientific Instruments Co., Ltd.). The result was 45 nm. The optically anisotropic layer 2 was also measured for retardation values $Re_2$ (40°) and $Re_2$ (−40°) developed when swing of ±40° was made with the in-plane slow axis as a swing axis. From these measurements was then calculated $Rth_2$ (550) by the ellipsometer. The result was 175 nm.

(Saponification of Second Optically Anisotropic Layer 2)

A 1.5 mol/L isopropyl alcohol solution of potassium hydroxide was spread over one side of the optically anisotropic layer 2 thus prepared at a rate of 25 ml/m². The coated optically anisotropic layer was allowed to stand at 25° C. for 5 seconds, washed with flowing water for 10 seconds, and then blown with 25° C. air so that the surface of the film was dried. In this manner, the optically anisotropic layer 2 was saponified only on one side thereof.

(Formation of Alignment Film)

An alignment film coating solution having the following formulation was then spread over the optically anisotropic layer 2 on the saponified surface thereof at a rate of 24 ml/m² using a #14 wire bar coater. The coated optically anisotropic layer was dried with 60° C. hot air for 60 seconds and then with 90° C. hot air for 150 seconds.

Subsequently, the film thus formed was subjected to rubbing in the direction of 45° with respect to the stretching direction of the optically anisotropic layer 2 (substantially the same as the slow axis).

(Formulation of alignment film coating solution)

| | |
|---|---|
| Modified polyvinyl alcohol shown below | 10 parts by mass |
| Water | 371 parts by mass |
| Methanol | 119 parts by mass |
| Glutaraldehyde (crosslinking agent) | 0.5 parts by mass |

Modified Polyvinyl Alcohol

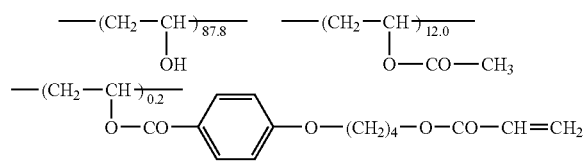

(Preparation of Optically Anisotropic Layer 1)

In 400.0 parts by mass of methyl ethyl ketone were dissolved 80 parts by mass of a discotic compound shown in D-524, 20 parts by mass of the following discotic compound (A), 0.4 parts by mass of the following air interface alignment controller, 3 parts by mass of a photopolymerization initiator (IRGACURE 907™, produced by Ciba-Geigy Inc.) and 1 part by mass of a sensitizer (KAYACURE DETX™, produced by Nippon Kayaku Corporation) to prepare a coating solution. The coating solution thus prepared was then spread over the alignment film using a #3.0 wire bar. The alignment film was attached to a metallic frame which was then heated in a 110° C. constant temperature tank for 2 minutes so that the discotic liquid crystal compound was aligned. Subsequently, the coated material was irradiated with ultraviolet rays from a 120 W/cm high pressure mercury vapor lamp at 80° C. for 1 minute so that the discotic liquid crystal compound was polymerized. Thereafter, the material was allowed to cool to room temperature. In this manner, an optically anisotropic layer 1 was formed to prepare an optically-compensatory sheet.

Air Interface Alignment Controller V-(1)

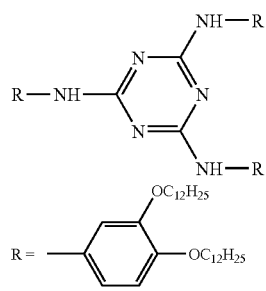

Discotic Liquid Crystal Compound (A)

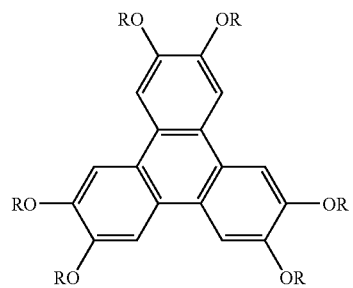

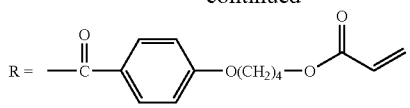

(Measurement of Optical Properties)

In the same manner as mentioned above, an alignment film was formed on a glass sheet. The optically anisotropic layer 1 was then formed on the alignment film. The optically anisotropic layer 1 thus formed was then measured for Re (550) at a wavelength of 550 nm using a Type KOBRA 21ADH ellipsometer. The result was 31.1 nm. Using a Type KOBRA 21ADH ellipsometer, the optically anisotropic layer 1 was also measured for retardation at a wavelength of 450 nm and 650 nm. As a result, Re (450)/Re (650) was 1.17. The optically anisotropic layer 1 was also measured for thickness. The result was 0.9 μm. The maximum absorption wavelength of D-524 was measured with a type UV3150 spectrophotometer (produced by Shimadzu Corporation), and was 245 nm. The maximum absorption wavelength of the above discotic liquid crystal compound (A) was 285 nm.

(Preparation of Elliptical Polarizing Plate)

A stretched polyvinyl alcohol film was allowed to adsorb iodine to prepare a polarizing film. Subsequently, the optically-compensatory sheet thus prepared was stuck to one side of the polarizing film with a polyvinyl alcohol-based adhesive on the optically anisotropic layer 2 side thereof. The two components were disposed such that the slow axis of the optically anisotropic layer 2 and the transmission axis of the polarizing film were parallel to each other.

A commercially available cellulose acetate film (FUJITAC TD80UF™, produced by FUJIFILM Corporation) was saponified in the same manner as mentioned above, and then stuck to the other side (side opposite the optically-compensatory sheet) of the polarizing film with a polyvinyl alcohol-based adhesive. In this manner, an elliptical polarizing plate was prepared.

(Preparation of Bend-aligned Liquid Crystal Cell)

A polyimide film was provided on a glass substrate with ITO electrode as an alignment film. The alignment film thus prepared was then subjected to rubbing. Two sheets of glass substrates thus obtained were laminated in such an arrangement that the rubbing directions thereof were parallel to each other. The cell gap was then predetermined to 4.1 μm. The cell gap was then filled with a liquid crystal compound having Δn (550) of 0.1396 (ZLI1132, produced by Merck Ltd.) to prepare a bend-aligned liquid crystal cell.

(Preparation and Evaluation of Liquid Crystal Display Device)

The liquid crystal cell and two sheets of polarizing plates prepared above were combined to prepare a liquid crystal display device. The liquid crystal cell and the two sheets of polarizing plates were disposed such that the optically anisotropic layer 1 of the polarizing plates and the substrate of the liquid crystal cell were opposed to each other and the rubbing direction of the liquid crystal cell and the rubbing direction of the optically anisotropic layer 1 opposed to the liquid crystal cell were not parallel to each other.

The liquid crystal display device thus prepared was disposed above a back light. A 55 Hz rectangular wave voltage was then applied to the bend-aligned liquid crystal cell in the liquid crystal display device. Using a type BM-5 brightness meter (produced by TOPCON Co., Ltd.), the liquid crystal display device was then measured for voltage at which the black brightness (front brightness) reaches minimum while adjusting the voltage.

Subsequently, using the same brightness meter (BM-5, produced by TOPCON Co., Ltd.), the liquid crystal display device was measured for black brightness and white brightness (front brightness) at the center of the screen. From the measurements was then calculated front contrast.

Using a type BM-5 brightness meter (produced by TOPCON Co., Ltd.), the liquid crystal display device was then measured for brightness in the upper, lower, right and left directions with the applied voltage varied. From the measurements, an angle of occurrence of gradation inversion (vertical inversion view angle and horizontal inversion view angle) was then measured. Using a Type SR-3 spectral brightness meter (produced by TOPCON Co., Ltd.), the liquid crystal display device was then measured for tint in black state. Using a Type EZ-CONTRAST measuring instrument, the liquid crystal display device was then measured for contrast view angle (vertical contrast view angle and horizontal contrast view angle). The term "contrast view angle" as used herein is meant to indicate the angle at which the ratio of brightness during white display to brightness during black display is 10 or more.

The results are set forth in Table 1.

Using SR-3 (manufactured by TOPCON Co., Ltd.), two sheets of commercially available linear polarizing plates disposed above a back light and arranged such that the transmission axis thereof were perpendicular to each other were measured for tint in black state. As a result, v' was 0.45.

Example 2

An optically anisotropic layer 2 and an alignment film were prepared in the same manner as in Example 1.
(Preparation of Optically Anisotropic Layer 1)

In 400.0 parts by mass of methyl ethyl ketone were dissolved 85 parts by mass of a discotic liquid crystal compound exemplified as D-524, 15 parts by mass of a discotic liquid crystal compound exemplified as D-89, 0.4 parts by mass of the air interface alignment controller V-(1), 3 parts by mass of a photopolymerization initiator (IRGACURE 907™, produced by Ciba-Geigy Inc.) and 1 part by mass of a sensitizer (KAYACURE DETX™ produced by Nippon Kayaku Corporation) to prepare a coating solution. The coating solution thus prepared was then spread over the alignment film using a #3.0 wire bar. The alignment film was attached to a metallic frame which was then heated in a 110° C. constant temperature tank for 2 minutes so that the discotic liquid crystal compound was aligned. Subsequently, the coated material was irradiated with ultraviolet rays from a 120 W/cm high pressure mercury vapor lamp at 80° C. for 1 minute so that the discotic liquid crystal compound was polymerized. Thereafter, the material was allowed to cool to room temperature. In this manner, an optically anisotropic layer 1 was formed to prepare an optically-compensatory sheet.
(Measurement of Optical Properties)

In the same manner as mentioned above, an alignment film was formed on a glass sheet. The optically anisotropic layer 1 was then formed on the alignment film. The optically anisotropic layer 1 thus formed was then measured for Re (550) at a wavelength of 550 nm using a Type KOBRA 21ADH ellipsometer. The result was 30.9 nm. Using a Type KOBRA 21ADH ellipsometer, the optically anisotropic layer 1 was also measured for retardation at a wavelength of 450 nm and 650 nm. As a result, Re (450)/Re (650) was 1.15. The optically anisotropic layer 1 was also measured for thickness. The result was 0.9 μm. The maximum absorption wavelength of D-89 was measured, and was 261 nm.
(Preparation of Elliptical Polarizing Plate)

An elliptical polarizing plate was prepared in the same manner as in Example 1.
(Preparation of Bend-aligned Liquid Crystal Cell)

A bend-aligned liquid crystal cell ad a liquid crystal display device were prepared in the same manner as in Example 1. Thus, a liquid crystal display device of Example 2 was prepared. The results of evaluation of the liquid crystal display device are set forth in Table 1.

Example 3

An optically anisotropic layer 2 and an alignment film were prepared in the same manner as in Example 1.
(Preparation of Optically Anisotropic Layer 1)

In 300.0 parts by mass of methyl ethyl ketone were dissolved 90 parts by mass of a discotic liquid crystal compound (B) exemplified below, 10 parts by mass of the above discotic liquid crystal compound (A), 0.4 parts by mass of the air interface alignment controller V-(1), 3 parts by mass of a photopolymerization initiator (IRGACURE 907™, produced by Ciba-Geigy Inc.) and 1 part by mass of a sensitizer (KAYACURE DETX™, produced by Nippon Kayaku Corporation) to prepare a coating solution. The coating solution thus prepared was then spread over the alignment film using a #3.0 wire bar. The alignment film was attached to a metallic frame which was then heated in a 100° C. constant temperature tank for 2 minutes so that the discotic liquid crystal compound was aligned. Subsequently, the coated material was irradiated with ultraviolet rays from a 120 W/cm high pressure mercury vapor lamp at 80° C. for 1 minute so that the discotic liquid crystal compound was polymerized. Thereafter, the material was allowed to cool to room temperature. In this manner, an optically anisotropic layer 1 was formed to prepare an optically-compensatory sheet.
Discotic Liquid Crystal Compound (B)

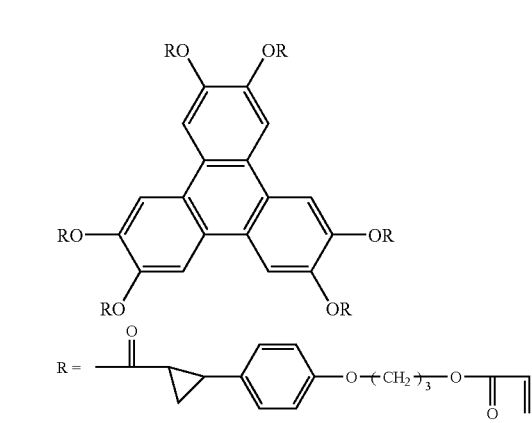

(Measurement of Optical Properties)

In the same manner as mentioned above, an alignment film was formed on a glass sheet. The optically anisotropic layer 1 was then formed on the alignment film. The optically anisotropic layer 1 thus formed was then measured for Re (550) at a wavelength of 550 nm using a Type KOBRA 21ADH ellipsometer. The result was 30.6 nm. Using a Type KOBRA 21ADH ellipsometer, the optically anisotropic layer 1 was also measured for retardation at a wavelength of 450 nm and 650 mm. As a result, Re (450)/Re (650) was 1.20. The optically anisotropic layer 1 was also measured for thickness. The result was 1.5 μm. The maximum absorption wavelength of the discotic liquid crystal compound (B) was measured, and was 260 nm.

(Preparation of Elliptical Polarizing Plate)

An elliptical polarizing plate was prepared in the same manner as in Example 1.

(Preparation of Bend-aligned Liquid Crystal Cell)

A bend-aligned liquid crystal cell ad a liquid crystal display device were prepared in the same manner as in Example 1. Thus, a liquid crystal display device of Example 3 was prepared. The evaluated result was shown in Table 1.

Example 4

An optically anisotropic layer 2 and an alignment film were prepared in the same manner as in Example 1.

(Preparation of Optically Anisotropic Layer 1)

In 400.0 parts by mass of methyl ethyl ketone were dissolved 80 parts by mass of a rod-shaped liquid crystal compound (A) exemplified below, 20 parts by mass of a rod-shaped liquid crystal compound (B) exemplified below, 0.4 parts by mass of the air interface alignment controller V-(1), 3 parts by mass of a photopolymerization initiator (IRGACURE 907™, produced by Ciba-Geigy Inc.) and 1 part by mass of a sensitizer (KAYACURE DETX™, produced by Nippon Kayaku Corporation) to prepare a coating solution. The coating solution thus prepared was then spread over the alignment film using a #3.0 wire bar. The alignment film was attached to a metallic frame which was then heated in a 90° C. constant temperature tank for 2 minutes so that the rod-shaped liquid crystal compound was aligned. Subsequently, the coated material was irradiated with ultraviolet rays from a 120 W/cm high pressure mercury vapor lamp at 60° C. for 1 minute so that the rod-shaped liquid crystal compound was polymerized. Thereafter, the material was allowed to cool to room temperature. In this manner, an optically anisotropic layer 1 was formed to prepare an optically-compensatory sheet.

Rod-shaped Liquid Crystal Compound (A)

(Measurement of Optical Properties)

In the same manner as mentioned above, an alignment film was formed on a glass sheet. The optically anisotropic layer 1 was then formed on the alignment film. The optically anisotropic layer 1 thus formed was then measured for Re (550) at a wavelength of 550 nm using a Type KOBRA 21ADH ellipsometer. The result was 31.6 nm. Using a Type KOBRA 21ADH ellipsometer, the optically anisotropic layer 1 was also measured for retardation at a wavelength of 450 nm and 650 nm. As a result, Re (450)/Re (650) was 1.20. The optically anisotropic layer 1 was also measured for thickness. The result was 1.0 μm. The maximum absorption wavelength of the rod-shaped liquid crystal compound (A) was measured, and was 270 nm. The maximum absorption wavelength of the rod-shaped liquid crystal compound (B) was 236 nm.

(Preparation of Elliptical Polarizing Plate)

An elliptical polarizing plate was prepared in the same manner as in Example 1.

(Preparation of Bend-aligned Liquid Crystal Cell)

A bend-aligned liquid crystal cell ad a liquid crystal display device were prepared in the same manner as in Example 1. Thus, a liquid crystal display device of Example 4 was prepared. The results of evaluation of the liquid crystal display device are set forth in Table 1.

Example 5

An optically anisotropic layer 2 and an alignment film were prepared in the same manner as in Example 1.

(Preparation of Optically Anisotropic Layer 1)

In 400.0 parts by mass of methyl ethyl ketone were dissolved 40 parts by mass of a rod-shaped liquid crystal compound (C) exemplified below, 60 parts by mass of a rod-shaped liquid crystal compound (D) exemplified below, 0.4 parts by mass of the air interface alignment controller V-(1), 3 parts by mass of a photopolymerization initiator (IRGACURE 907™, produced by Ciba-Geigy Inc.) and 1 part by mass of a sensitizer (KAYACURE DETX™, produced by Nippon Kayaku Corporation) to prepare a coating solution. The coating solution thus prepared was then spread over the alignment film using a #3.0 wire bar. The alignment film was attached to a metallic frame which was then heated in a 80° C. constant temperature tank for 3 minutes so that the rod-shaped liquid crystal compound was aligned. Subsequently, the coated material was irradiated with ultraviolet rays from a 120 W/cm high pressure mercury vapor lamp at 50° C. for 1 minute so that the rod-shaped liquid crystal compound was polymerized. Thereafter, the material was allowed to cool to room temperature. In this manner, an optically anisotropic layer 1 was formed to prepare an optically-compensatory sheet.

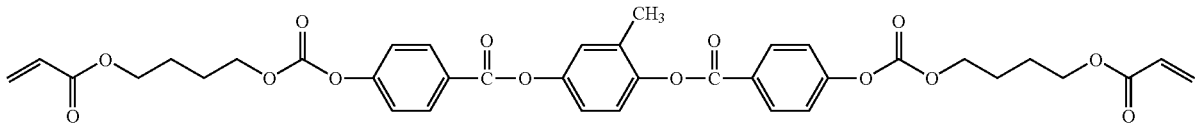

Rod-shaped Liquid Crystal Compound (B)

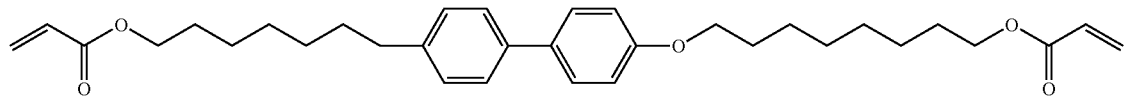

Rod-shaped Liquid Crystal Compound (C)

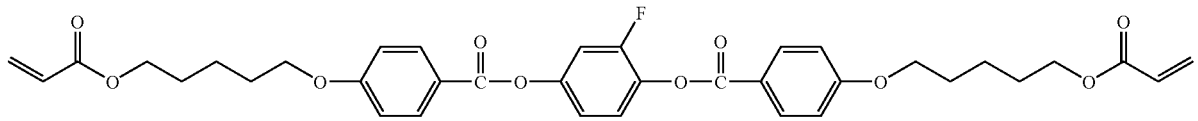

Rod-shaped Liquid Crystal Compound (D)

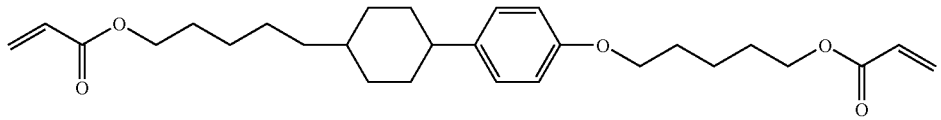

(Measurement of Optical Properties)

In the same manner as mentioned above, an alignment film was formed on a glass sheet. The optically anisotropic layer 1 was then formed on the alignment film. The optically anisotropic layer 1 thus formed was then measured for Re (550) at a wavelength of 550 nm using a Type KOBRA 21ADH ellipsometer. The result was 31.3 nm. Using a Type KOBRA 21ADH ellipsometer, the optically anisotropic layer 1 was also measured for retardation at a wavelength of 450 nm and 650 nm. As a result, Re (450)/Re (650) was 1.10. The optically anisotropic layer 1 was also measured for thickness. The result was 0.9 μm. The maximum absorption wavelength of the rod-shaped liquid crystal compound (C) was measured, and was 260 nm. The maximum absorption wavelength of the rod-shaped liquid crystal compound (D) was 220 nm.

(Preparation of Elliptical Polarizing Plate)

An elliptical polarizing plate was prepared in the same manner as in Example 1.

(Preparation of Bend-aligned Liquid Crystal Cell)

A bend-aligned liquid crystal cell and a liquid crystal display device were prepared in the same manner as in Example 1. Thus, a liquid crystal display device of Example 5 was prepared. The results of evaluation of the liquid crystal display device are set forth in Table 1.

Comparative Example 1

An optically anisotropic layer 2 and an alignment film were prepared in the same manner as in Example 1.

(Preparation of Optically Anisotropic Layer 1)

In 204.0 parts by mass of methyl ethyl ketone were dissolved 91 parts by mass of the discotic compound (A) shown above, 9 parts by mass of an ethylene oxide-modified trimethylolpropane triacrylate (V#360) (produced by OSAKA ORGANIC CHEMICAL INDUSTRY LTD.), 0.4 parts by mass of the air interface alignment controller as used in Example 1, 1 part by mass of a cellulose acetate butyrate (CAB531-1, produced by Eastman Chemical Inc.), 3 parts by mass of a photopolymerization initiator (IRGACURE 907™, produced by Ciba-Geigy Inc.) and 1 part by mass of a sensitizer (KAYACURE DETX™, produced by Nippon Kayaku Corporation) to prepare a coating solution. The coating solution thus prepared was then spread over the alignment film using a #3.4 wire bar. The alignment film was attached to a metallic frame which was then heated in a 120° C. constant temperature tank for 150 seconds. Subsequently, the coated material was irradiated with ultraviolet rays from a 120 W/cm high pressure mercury vapor lamp at 110° C. for 1 minute so that the discotic compound was polymerized. Thereafter, the material was allowed to cool to room temperature. In this manner, an optically anisotropic layer 1 was formed to prepare an optically-compensatory sheet.

(Measurement of Optical Properties)

In the same manner as mentioned above, an alignment film was formed on a glass sheet. The optically anisotropic layer 1 was then formed on the alignment film. The optically anisotropic layer 1 thus formed was then measured for retardation value Re (550) with light having a wavelength of 550 nm using a Type KOBRA 21ADH ellipsometer. The result was 30.5 nm. Using a Type KOBRA 21ADH ellipsometer, the optically anisotropic layer 1 was also measured for retardation at a wavelength of 450 nm and 650 nm. As a result, Re (450)/Re (650) was 1.27. The optically anisotropic layer 1 was also measured for thickness. The result was 1.6 μm.

(Preparation of Ellipsoidal Polarizing Plate)

An ellipsoidal polarizing plate was prepared in the same manner as in Example 1.

(Preparation of Bend-aligned Mode Liquid Crystal Display Device)

A bend-aligned liquid crystal cell was prepared in the same manner as in Example 1. A liquid crystal display device was then prepared from the bend-aligned liquid crystal cell in the same manner as in Example 1 to provide a liquid crystal display device of Comparative Example 1. The results of evaluation of the liquid crystal display device are set forth in Table 1.

TABLE 1

|  | Example 1 | Example 2 | Example 3 | Example 4 | Example 5 | Comparative Example 1 |
|---|---|---|---|---|---|---|
| Re(450)/Re(650) | 1.17 | 1.15 | 1.20 | 1.20 | 1.10 | 1.27 |
| Front contrast | 450 | 440 | 420 | 415 | 440 | 300 |
| v' | 0.43 | 0.42 | 0.40 | 0.40 | 0.40 | 0.37 |
| Vertical contrast view angle | 160 | 160 | 160 | 160 | 160 | 155 |
| Horizontal contrast view angle | 160 | 160 | 160 | 160 | 160 | 160 |
| Vertical inversion view angle | 160 | 160 | 155 | 155 | 155 | 155 |
| Horizontal inversion view angle | 140 | 140 | 140 | 145 | 140 | 140 |

Conclusion

As can be seen in the results of Table 1, the liquid crystal display device of the invention exhibits a high front contrast, wide vertical and horizontal contrast view angles and vertical and horizontal inversion view angles and little bluish tint during black display.

On the contrary, Comparative Example 1, which doesn't contain a plurality of liquid crystal compounds in the optically anisotropic layer 1 and satisfy the requirement that Re (450)/Re (650) be 1.25 or less, exhibits a low front contrast and a high bluish tint during black display.

INDUSTRIAL APPLICABILITY

In accordance with the invention, an optically anisotropic layer contained in the optically compensatory sheet is formed by mixing discotic liquid crystal compounds having different structures with each other. As a result, an optical film (optically compensatory film) having a wavelength dispersion adapted for the wavelength dispersion of liquid crystal molecules to be used in liquid crystal cells, particularly of bend-aligned mode can be provided.

In accordance with the invention, a liquid crystal display device can be provided having remarkably lowered transmittance in front ways and at horizontal and vertical polar angles during black display and excellent viewing angle properties capable of giving a good image having a high contrast, no tint problems during black display and no gradation inversion.

The entire disclosure of each and every foreign patent application from which the benefit of foreign priority has been claimed in the present application is incorporated herein by reference, as if fully set forth.

The invention claimed is:

1. An optical film, which comprises:
    at least two optically anisotropic layers comprising a first optically anisotropic layer and a second optically anisotropic layer,
    wherein the first optically anisotropic layer is formed from a mixture which comprises two or more liquid crystal compounds having different structures from each other, wherein each of the two or more liquid crystal compounds has a polymerizable group,
    wherein each of the two or more liquid crystal compounds is a discotic liquid crystal compound,
    wherein at least one of the two or more liquid crystal compounds is a trisubstituted benzene skeleton discotic liquid crystal compound of the formula (D1):

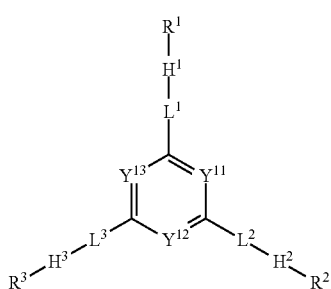

Formula (D1)

wherein $Y^{11}$, $Y^{12}$ and $Y^{13}$ each independently represents a methine or nitrogen atom; $L^1$, $L^2$ and $L^3$ each independently represents a single bond or a divalent connecting group; $H^1$, $H^2$ and $H^3$ each independently represents one of formula (DI-A) or (DI-B):

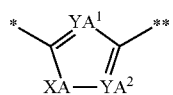

Formula (DI-A)

wherein in the formula (DI-A), $YA^1$ and $YA^2$ each independently represents a methine or nitrogen atom; wherein XA represents an oxygen atom, sulfur atom, methylene or imino; wherein the symbol * indicates the position at which the moiety is connected to $L^1$ to $L^3$ in the formula (DI); wherein the symbol ** indicates the position at which the moiety is connected to $R^1$ to $R^3$ in the formula (DI);

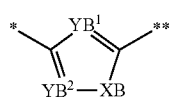

Formula (DI-B)

wherein in the formula (DI-B), $YB^1$ and $YB^2$ each independently represents a methine or nitrogen atom; wherein XB represents an oxygen atom, sulfur atom, methylene or imino; wherein the symbol * indicates the position at which the moiety is connected to $L^1$ to $L^3$ in the formula (DI); wherein the symbol ** indicates the position at which the moiety is connected to $R^1$ to $R^3$ in the formula (DI);

wherein $R^1$, $R^2$ and $R^3$ each independently represents one represented by the following formula (DI-R):

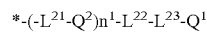

*-(-$L^{21}$-$Q^2$)n$^1$-$L^{22}$-$L^{23}$-$Q^1$  Formula (DI-R)

wherein in the formula (DI-R), * indicates the position at which the moiety is connected to $H^1$ to $H^3$ in the formula (DI); $L^{21}$ represents a single bond or divalent connecting group; $Q^2$ represents a divalent group having at least one cyclic structure; $n^1$ represents an integer of from 0 to 4; $L^{22}$ represents —O—, —O—CO—, —CO—O—, —O—CO—O—, —S—, —N(R)—, —CH$_2$—, —CH=CH— or —C≡C—, in which the symbol  indicates the position at which the moiety is connected to $Q^2$; $L^{23}$ represents a divalent connecting group selected from the group consisting of —O—, —S—, —C(=O)—, —NH—, —CH$_2$—, —CH=CH—, —C≡C— and a combination thereof, wherein a hydrogen atom in —NH—, —CH$_2$— and —CH=CH— may be substituted; $Q^1$ represents a polymerizable group or hydrogen atom.

2. The optical film according to claim 1, wherein $H^1$, $H^2$ and $H^3$ each independently represents one of formula (DI-A) or (DI-B); wherein in the formula (DI-A), $YA^1$ and $YA^2$ each independently represents a nitrogen atom, and XA represents an oxygen atom; wherein in the formula (DI-B), $YB^1$ and $YB^2$ each independently represents a nitrogen atom, and XB represents an oxygen atom.

3. The optical film according to claim 1, wherein the two or more liquid crystal compounds having different structures from each other include a compound having a maximum absorption wavelength of from 200 to 250 nm, and a compound having a maximum absorption wavelength of from 270 to 320 nm.

* * * * *